(12) United States Patent
Choi et al.

(10) Patent No.: US 12,426,670 B2
(45) Date of Patent: Sep. 30, 2025

(54) MIDSOLE STRUCTURE OF AN ARTICLE OF FOOTWEAR INCLUDING MESH

(71) Applicant: NIKE, Inc., Beaverton, OR (US)

(72) Inventors: Yoon Jeong Choi, Portland, OR (US); Tory M. Cross, Portland, OR (US); Christian Alexander Steinbeck, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/438,577

(22) Filed: Feb. 12, 2024

(65) Prior Publication Data
US 2024/0251909 A1 Aug. 1, 2024

Related U.S. Application Data

(63) Continuation of application No. 16/535,899, filed on Aug. 8, 2019, now Pat. No. 11,930,882.
(Continued)

(51) Int. Cl.
*A43B 13/12* (2006.01)
*A43B 13/04* (2006.01)
(Continued)

(52) U.S. Cl.
CPC .......... *A43B 13/127* (2013.01); *A43B 13/125* (2013.01); *A43B 13/187* (2013.01);
(Continued)

(58) Field of Classification Search
CPC ... A43B 13/127; A43B 13/125; A43B 13/187; A43B 13/04
See application file for complete search history.

(56) References Cited

U.S. PATENT DOCUMENTS

| 1,659,339 A | | 2/1928 | Vetterling |
| 1,701,611 A | * | 2/1929 | Glidden ................. A43B 13/12 |
| | | | 36/73 |

(Continued)

FOREIGN PATENT DOCUMENTS

| DE | 1881914 U | 10/1963 |
| DE | 8305716 U1 | 6/1983 |

(Continued)

OTHER PUBLICATIONS

Kim Hui Gyeong, "Lower STucture of Functional Footwear (translation)," 2017, Clarivate Analytics (Year: 2017).*
(Continued)

*Primary Examiner* — Haley A Smith
(74) *Attorney, Agent, or Firm* — Honigman LLP; Matthew H. Szalach; Jonathan P. O'Brien

(57) ABSTRACT

A sole structure for an article of footwear is described. In one example, the sole structure includes first and second foam components and one or more mesh components, e.g., a mesh textile component. The first foam component includes first and second opposing sides, and the second foam component includes first and second opposing sides. The first and second foam components form a stack in the sole structure. The mesh components, e.g., a mesh textile component, are positioned in the stack between and bonded to the second side of the first foam component and the first side of the second foam component. This abstract is intended as a scanning tool for purposes of searching in the particular art and is not intended to be limiting of the present disclosure.

11 Claims, 17 Drawing Sheets

Related U.S. Application Data

(60) Provisional application No. 62/716,167, filed on Aug. 8, 2018.

(51) Int. Cl.
*A43B 13/18* (2006.01)
*B32B 5/22* (2006.01)

(52) U.S. Cl.
CPC ................ *B32B 5/22* (2013.01); *A43B 13/04* (2013.01); *B32B 2437/02* (2013.01)

(56) References Cited

U.S. PATENT DOCUMENTS

| | | |
|---|---|---|
| 1,704,187 A | 3/1929 | Glidden |
| 1,811,803 A * | 6/1931 | Oakley .................. A43B 13/04 36/59 B |
| 2,333,303 A | 11/1943 | Enos |
| 2,669,036 A | 2/1954 | Israel |
| 3,345,664 A | 10/1967 | Ludwig |
| 3,812,604 A | 5/1974 | Sato |
| 3,878,626 A | 4/1975 | Isman |
| 3,925,914 A | 12/1975 | Marcoux |
| 4,005,532 A | 2/1977 | Giese |
| 4,073,072 A | 2/1978 | Gross |
| 4,241,523 A | 12/1980 | Daswick |
| 4,561,195 A * | 12/1985 | Onoda .................. A43B 13/10 36/31 |
| 4,608,768 A | 9/1986 | Cavanagh |
| 4,653,206 A | 3/1987 | Tane |
| 4,798,010 A | 1/1989 | Sugiyama |
| 4,896,440 A | 1/1990 | Salaverria |
| 5,022,168 A | 6/1991 | Jeppson, III |
| 5,025,573 A | 6/1991 | Giese et al. |
| 5,075,984 A | 12/1991 | Shiew |
| 5,561,920 A | 10/1996 | Graham |
| 5,572,805 A | 11/1996 | Giese |
| 5,575,089 A | 11/1996 | Giese |
| 5,664,343 A | 9/1997 | Byrne |
| 5,720,118 A | 2/1998 | Mayer |
| 5,926,974 A | 7/1999 | Friton |
| 5,930,916 A | 8/1999 | Connor |
| 6,021,585 A | 2/2000 | Cole |
| 6,154,983 A | 12/2000 | Austin |
| 6,167,639 B1 | 1/2001 | Ventura |
| 6,205,683 B1 | 3/2001 | Clark |
| 6,389,713 B1 | 5/2002 | Kita |
| 6,401,366 B2 | 6/2002 | Foxen |
| 7,197,840 B2 | 4/2007 | Nakano |
| 7,401,421 B2 | 7/2008 | Brennan |
| 7,627,963 B2 * | 12/2009 | Kilgore .................. A43B 3/26 36/43 |
| 7,814,686 B2 | 10/2010 | Becker |
| 9,794,958 B2 | 10/2017 | Earnshaw et al. |
| 10,342,292 B2 | 7/2019 | Del Biondi |
| 10,448,703 B2 | 10/2019 | Schiller |
| 10,674,791 B2 * | 6/2020 | Bruce ...................... D04C 1/06 |
| 11,350,695 B2 * | 6/2022 | Luedecke ................. B32B 5/18 |
| 2001/0007177 A1 | 7/2001 | Brown |
| 2002/0162246 A1 | 11/2002 | Mayer et al. |
| 2003/0093920 A1 | 5/2003 | Greene et al. |
| 2005/0172513 A1 * | 8/2005 | Lechhart ................ A43B 7/125 36/3 R |
| 2005/0217148 A1 | 10/2005 | Connolly et al. |
| 2005/0229431 A1 | 10/2005 | Gerlin |
| 2007/0186446 A1 * | 8/2007 | Lafortune .............. A43B 17/18 36/43 |
| 2007/0240331 A1 | 10/2007 | Borel |
| 2008/0098616 A1 | 5/2008 | Leedy |
| 2009/0172971 A1 | 7/2009 | Peikert |
| 2010/0287795 A1 | 11/2010 | Van Niekerk |
| 2011/0016748 A1 | 1/2011 | Soler |
| 2011/0146104 A1 * | 6/2011 | Lafortune ............ A43B 23/042 36/43 |
| 2011/0225852 A1 | 9/2011 | Mahoney |
| 2012/0030972 A1 | 2/2012 | Arnone et al. |
| 2013/0167402 A1 | 7/2013 | Christensen et al. |
| 2014/0013617 A1 | 1/2014 | Montross et al. |
| 2014/0283412 A1 | 9/2014 | Elder et al. |
| 2015/0068063 A1 | 3/2015 | Farris |
| 2015/0250259 A1 | 9/2015 | Attey |
| 2015/0289591 A1 | 10/2015 | Jones |
| 2016/0095384 A1 | 4/2016 | Kraft |
| 2016/0166007 A1 * | 6/2016 | Bruce .................. A43D 11/006 36/31 |
| 2016/0219973 A1 | 8/2016 | Cheney |
| 2016/0353834 A1 | 12/2016 | Luedecke |
| 2017/0119094 A1 | 5/2017 | Vontorcik, Jr. et al. |
| 2017/0238652 A1 | 8/2017 | Langvin |
| 2017/0267850 A1 | 9/2017 | Baghdadi |
| 2018/0116336 A1 | 5/2018 | Dallas |
| 2018/0192736 A1 * | 7/2018 | Luedecke .......... A43B 23/0255 |
| 2018/0213884 A1 | 8/2018 | Kim |
| 2018/0352895 A1 | 12/2018 | Chang |
| 2019/0125028 A1 | 5/2019 | Bartel et al. |
| 2020/0046068 A1 | 2/2020 | Choi |
| 2020/0253326 A1 | 8/2020 | Choi et al. |
| 2021/0059349 A1 * | 3/2021 | Luedecke ................. B32B 5/14 |
| 2021/0186149 A9 * | 6/2021 | Luedecke ............ A43B 13/186 |

FOREIGN PATENT DOCUMENTS

| | | | |
|---|---|---|---|
| DE | 102010046278 A1 | 2/2011 | |
| DE | 102012110573 A1 | 5/2014 | |
| EP | 0130816 A2 | 1/1985 | |
| EP | 0922400 A1 | 6/1999 | |
| EP | 2975962 A2 | 1/2016 | |
| EP | 3001924 A1 | 4/2016 | |
| EP | 2975962 B1 | 5/2018 | |
| GB | 1433481 A | 4/1976 | |
| KR | 20070093375 A | 9/2007 | |
| KR | 101638304 B1 | 7/2016 | |
| KR | 20170006620 * | 1/2017 | ............... A43B 7/32 |
| WO | WO-2016165734 A1 | 10/2016 | |
| WO | WO-2017058419 A1 | 4/2017 | |
| WO | WO-2018175734 A1 | 9/2018 | |
| WO | WO-2019046438 A1 | 3/2019 | |

OTHER PUBLICATIONS

European Patent Office as ISA, International Search Report and Written Opinion for PCT Application No. PCT/US2018/048562, mailed Feb. 13, 2019.

European Patent Office as IPEA, Written Opinion of the International Preliminary Examining Authority for PCT Application No. PCT/US2018/048562, mailed Jul. 18, 2019.

European Office Action, Application No. 18 811 090.2, mailed Jun. 7, 2021.

European Patent Office, Communication Pursuant to Article 94(3) EPC dated Oct. 20, 2021 for application No. 18811089.4.

USPTO, Final Office Action for U.S. Appl. No. 16/642,991, mailed Oct. 6, 2022.

European Patent Office as IPEA, International Preliminary Report of Patentability for PCT Application No. PCT/US2018/048553, mailed Jul. 23, 2019.

European Patent Office as ISA, International Search Report and Written Opinion for PCT Application No. PCT/US2018/048553, mailed Feb. 13, 2019.

European Patent Office, Communication pursuant to Article 94(3) EPC for App. No. 18 811 089.4, mailed Jun. 7, 2021.

International Search Report for PCT/US2019/045757 mailed on Nov. 19, 2019.

International Search Report and Written Opinion for Application No. PCT/US2021/024544 dated Jul. 13, 2021.

USPTO, Non-Final Office Action for U.S. Appl. No. 17/214,887, mailed Aug. 23, 2022.

European Patent Office as ISA, International Search Report and Written Opinion for PCT Application No. PCT/US2020/025594, mailed Jun. 23, 2020.

(56) References Cited

OTHER PUBLICATIONS

USPTO, Final Office Action for U.S. Appl. No. 16/833,617, mailed Sep. 26, 2022.
USPTO, Final Office Action for U.S. Appl. No. 17/214,887, mailed Jan. 18, 2023.
USPTO, Non-Final Office Action for U.S. Appl. No. 16/833,617, mailed Feb. 8, 2022.
USPTO, Non-Final Office Action for U.S. Appl. No. 16/833,617, mailed Dec. 21, 2022.

* cited by examiner

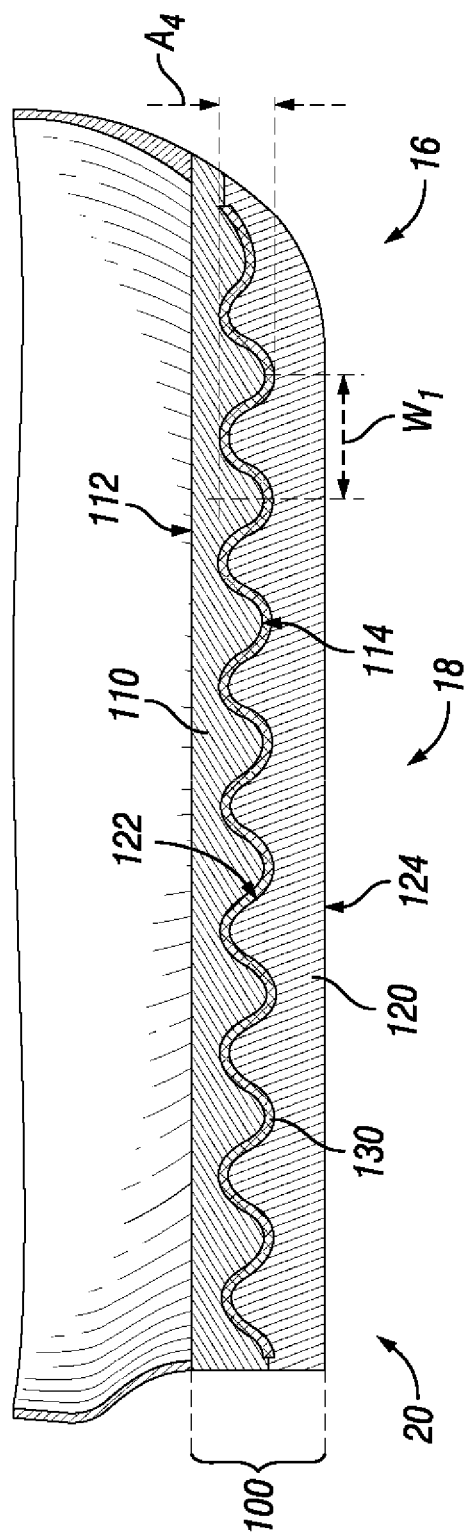

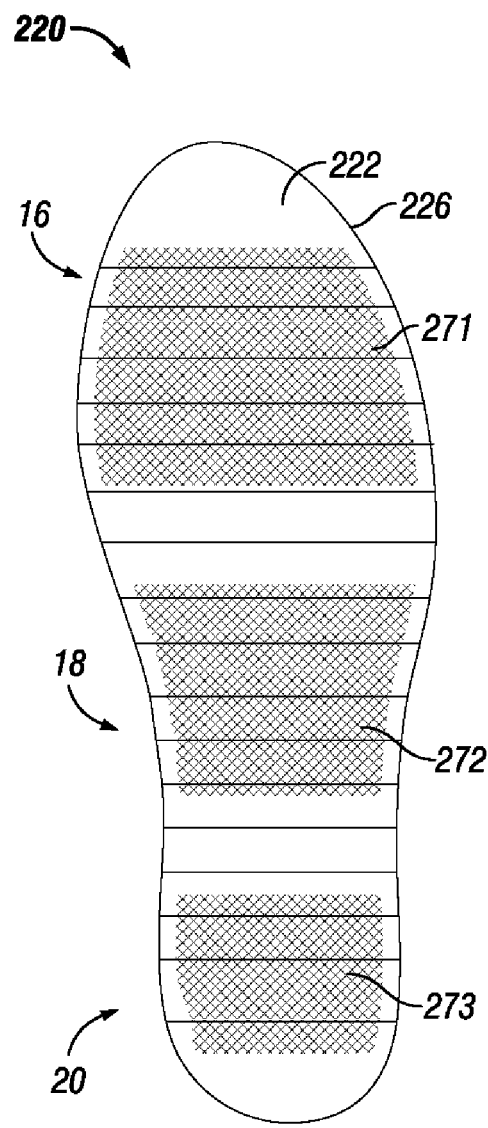
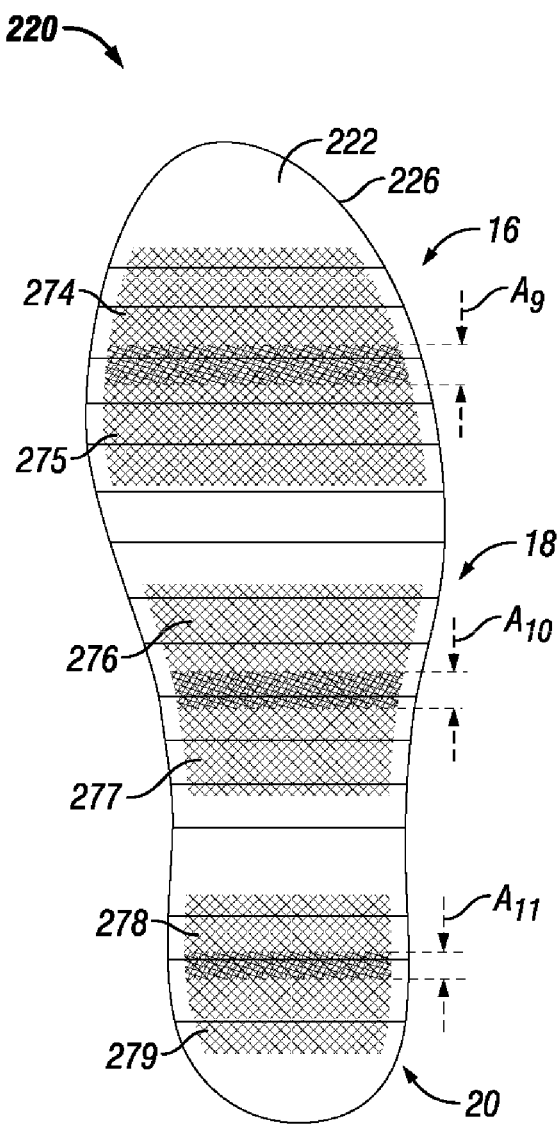
FIG. 12A  FIG. 12B

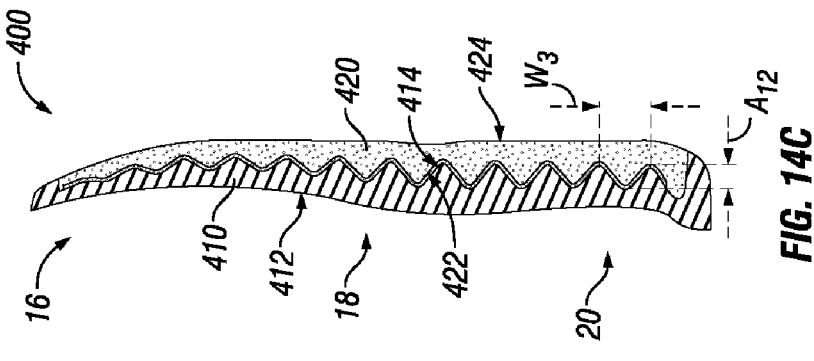
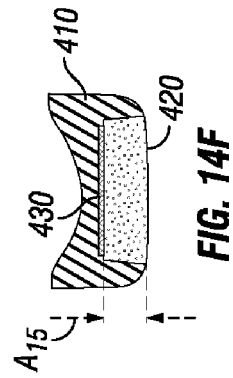
FIG. 14C        FIG. 14F
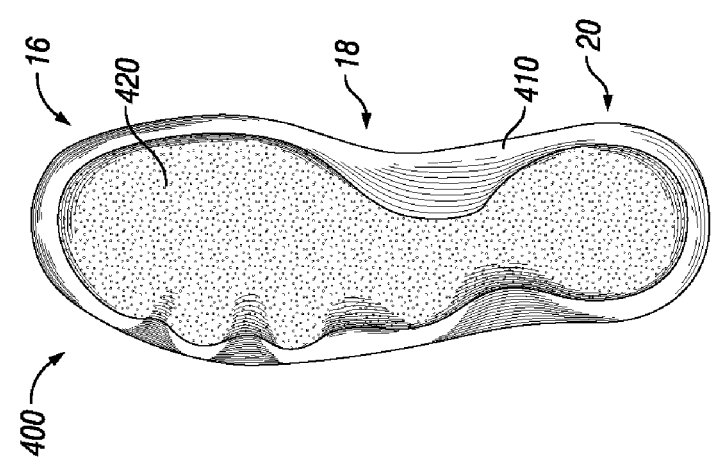
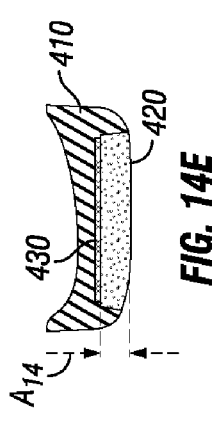
FIG. 14B        FIG. 14E
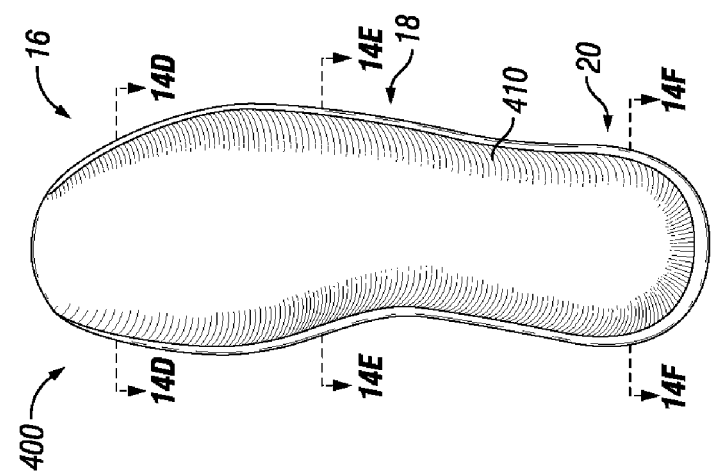
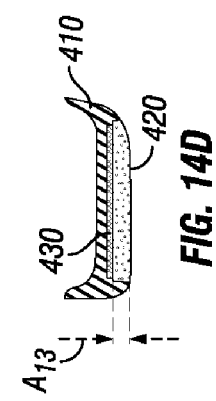
FIG. 14A        FIG. 14D

MIDSOLE STRUCTURE OF AN ARTICLE OF FOOTWEAR INCLUDING MESH

CROSS-REFERENCE TO RELATED APPLICATIONS

This Application is a Continuation of U.S. application Ser. No. 16/535,899, filed on Aug. 8, 2019, which claims the benefit of U.S. Provisional Application No. 62/716,167, filed on Aug. 8, 2018, the contents of which are incorporated herein by reference in their entirety.

BACKGROUND

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear.

BRIEF DESCRIPTION OF THE DRAWINGS

Further aspects of the present disclosure will be readily appreciated upon review of the detailed description, described below, when taken in conjunction with the accompanying drawings.

FIG. 8 illustrates a cross-sectional side view of the example midsole structure shown in FIG. 7 according to aspects of the present disclosure.

FIGS. 12A-12B illustrate top-down views of example aspects each including different mesh components and a foam component in various arrangements according to aspects of the present disclosure.

FIGS. 14A-14F illustrate views of another example midsole structure, including a first foam component having an undulating surface in a cavity and a second foam component having a corresponding undulating surface that fits into the cavity according to aspects of the present disclosure.

FIG. 16A shows a representative test sample used to determine tensile strength and/or elongation along the indicated angles. FIG. 16B shows the orientation of the test angles in a test sample relative to a representative mesh component.

DETAILED DESCRIPTION

A sole structure for an article of footwear is described in the following paragraphs. In one example, the sole structure includes first and second foam components and one or more mesh components. The first foam component includes first and second opposing sides, and the second foam component includes first and second opposing sides. The first and second foam components form a stack in the sole structure. The mesh components are positioned in the stack between and bonded to the second side of the first foam component and the first side of the second foam component. In one aspect, the mesh components stretch by first and second percentages in first and second directions, respectively. Depending upon the number and orientation of the mesh components, one or both of a compression strength and a shear strength of the sole structure may be increased in certain regions of the sole structure.

Example aspects will now be described more fully with reference to the accompanying drawings. Example aspects are provided so that this disclosure will be thorough, and will fully convey the scope of those who are skilled in the art. Numerous specific details are set forth such as examples of specific components, devices, and methods, to provide a thorough understanding of aspects of the present disclosure. It will be apparent to those skilled in the art that specific details need not be employed, that example aspects may be embodied in many different forms and that neither should be construed to limit the scope of the disclosure. In some example aspects, well-known processes, well-known device structures, and well known technologies are not described in detail.

Sole Structures.

Figure 1:
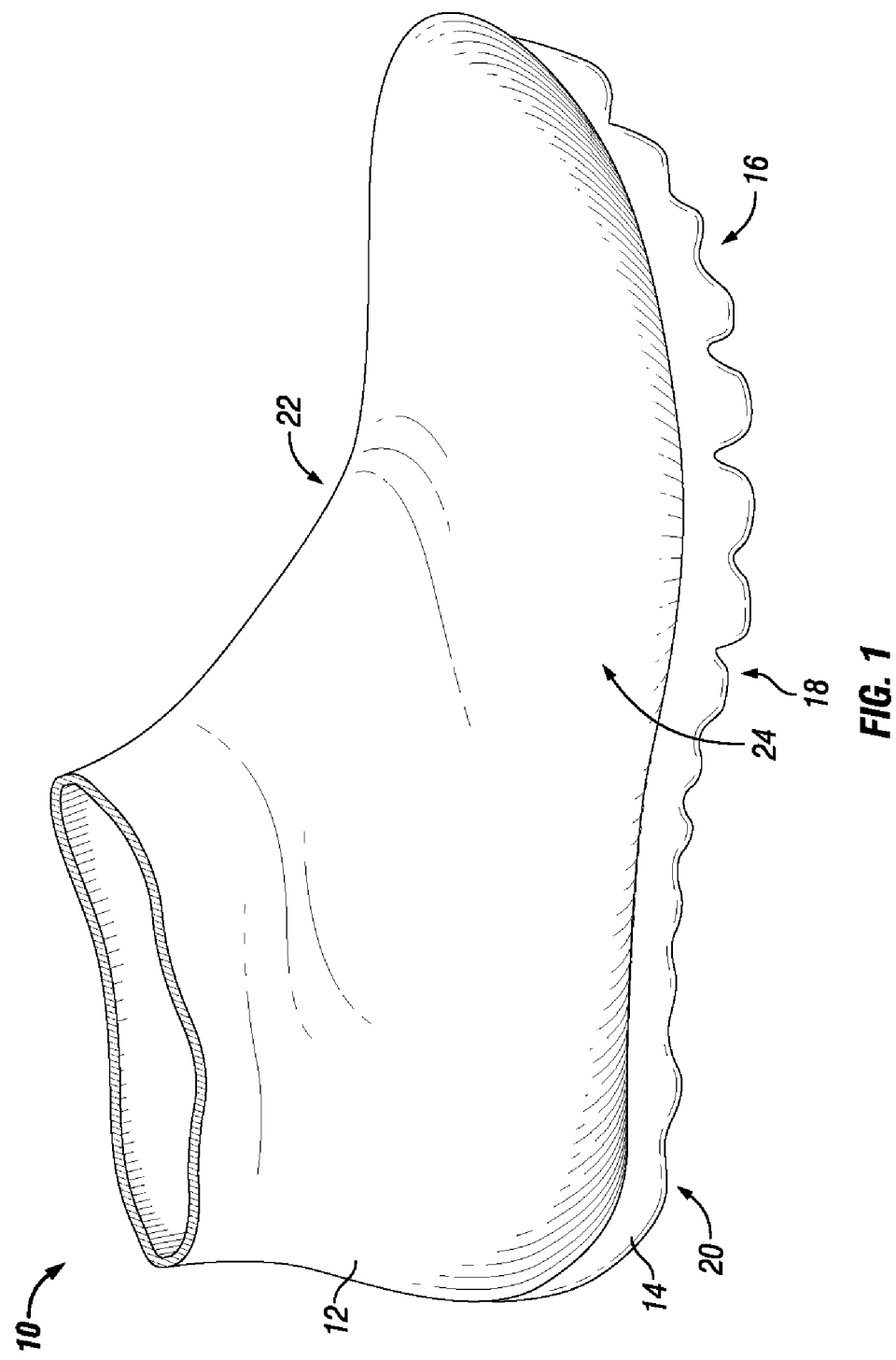
FIG. 1 is an exemplary perspective view of an article of footwear incorporating an example sole structure according to an aspect of the present disclosure.

FIG. 1 illustrates a perspective view of an article of footwear 10 incorporating an example sole structure 14 according to various aspects described herein. The article of footwear 10 is a representative example for discussion of the use of one or more mesh components, e.g., mesh textiles, in a sole structure to increase the compression and/or shear strength in certain regions of the sole structure. That is, in some aspects, a mesh component can be a mesh textile component as disclosed herein below. The article of footwear 10 is not drawn to any particular scale in FIG. 1. Similarly, in the remaining figures, the components of the article of footwear 10 are not necessarily drawn to scale, with emphasis instead on demonstrating various ways to increase the compression and/or shear strength in certain regions of the sole structure.

As shown in FIG. 1, the article of footwear 10 includes an upper 12 and the sole structure 14 attached to the upper 12. The article of footwear 10 includes a number of regions, including a forefoot region 16, a midfoot region 18, and a heel region 20. The forefoot region 16 may correspond with toes and joints connecting metatarsal bones with phalanx bones of a foot. The midfoot region 18 may correspond with an arch of the foot, and the heel region 18 may correspond with the rear portion of the foot, including the calcaneus bone. The article of footwear 10 also includes a medial side 22 and a lateral side 24, corresponding respectively with opposite sides of the article of footwear.

As described in further detail below, the sole structure 14 may include one or more mesh components, such as one or more mesh textiles. In various aspects, the mesh components may stretch in one direction or in two directions. The mesh components may stretch to the same extent or percentage in either direction, or the mesh components may stretch to a first percentage in a first direction and to a second, different percentage in a second direction. The mesh components may be knitted, crocheted, braided, or woven with one or more yarns, each formed from one or more individual fibers. The compression and/or shear strength of the sole structure 14 may be increased in certain regions based on the number, placement, and orientation of the mesh components in the sole structure 14. Thus, the characteristics of the article of footwear 10 may be adapted for use with various types of activities.

Figure 2:
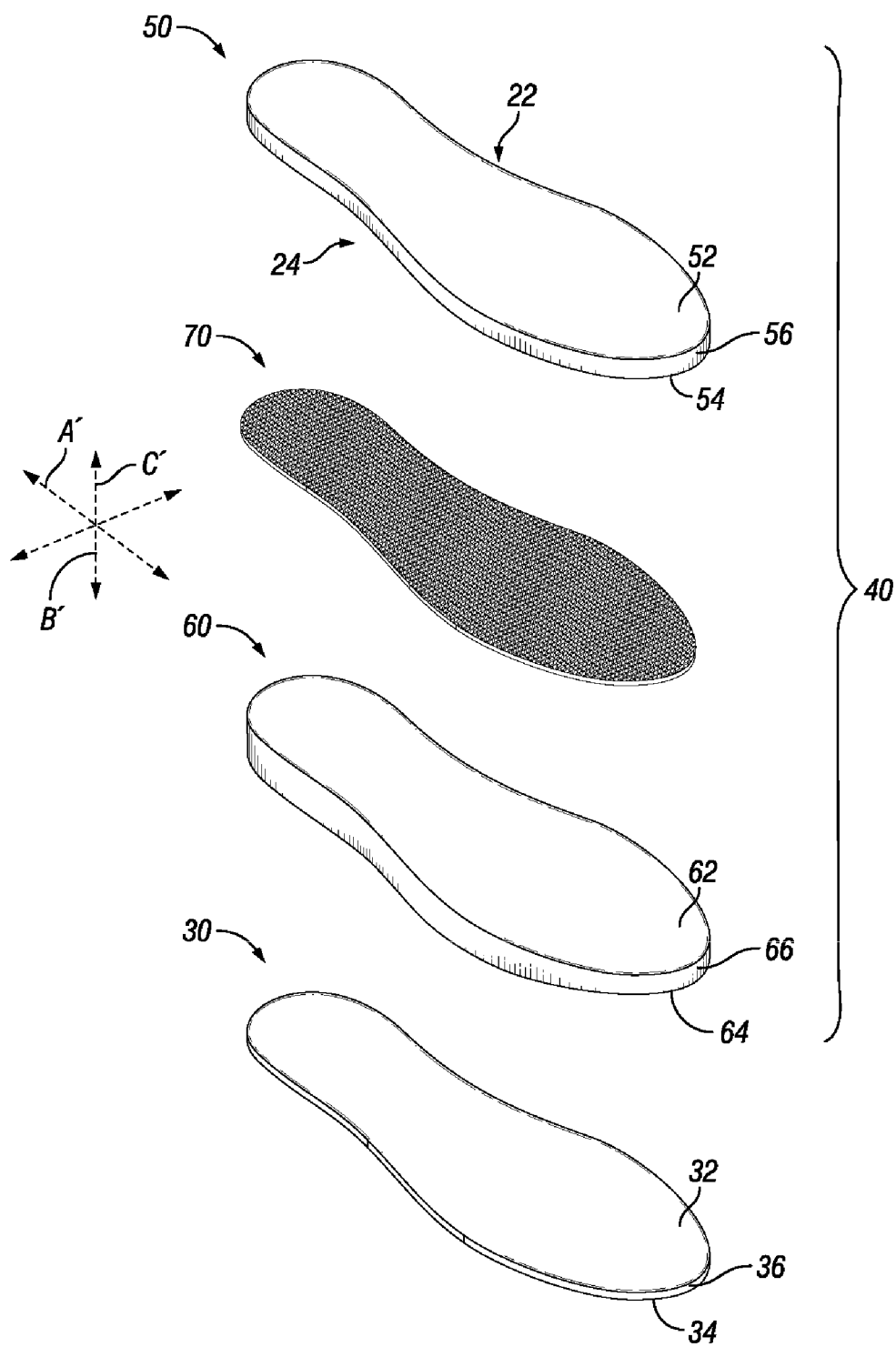
FIG. 2 is an exemplary exploded perspective view of the example sole structure of the article of footwear shown in FIG. 1 according to an aspect of the present disclosure.

FIG. 2 illustrates an exploded perspective view of the example sole structure 14 of the article of footwear 10 shown in FIG. 1 according to various aspects described herein. As shown in FIG. 2, the sole structure 14 includes an outsole 30 and midsole 40. The outsole 30 includes a first midsole-contacting side 32, a second side 32 opposite the first side 32, and a sidewall 34 extending around the periphery of the first side 32 and the second side 34. The outsole 30 provides abrasion-resistance and traction with a ground surface. The outsole 30 may be formed from any suitable materials, including rubber or other materials that impart durability and wear-resistance, as well as enhance traction with the ground surface. When the article of footwear 10 is assembled, the midsole 40 is disposed between the outsole 30 and the upper 12.

The midsole 40 includes a first foam component 50, a second foam component 60, and a mesh component 70. The first foam component 50 includes a first side 52, a second side 54 opposite the first side 52, and a sidewall 54 extending around the periphery of the first side 52 and the second side 54. The second foam component 60 includes a first side 62, a second side 64 opposite the first side 62, and a sidewall 66 extending around the periphery of the first side 62 and the second side 64. When assembled, the mesh component 70 is positioned in a stack between and bonded to the second side 54 of the first foam component 50 and the first side 62 of the second foam component 60. The form and characteristics of the first foam component 50, the second foam component 60, and the mesh component 70 are described in further detail below.

As described herein, the compression and/or shear strength of the midsole 40 may be increased due to the inclusion of the mesh component 70 as compared to a case in which the midsole 40 were to omit or exclude the mesh component 70. The compression and/or shear strength may be increased in one or more areas of the midsole 40, such as in the forefoot region 16, the midfoot region 18, the heel region 20, the medial side 22, and the lateral side 24 depending on the size and placement of the mesh component 70. The compression and/or shear strength may also be increased to a greater or lesser extent in one or more of the directions A', B', and C' depending upon certain characteristics of the mesh component 70, such as the type of the mesh component 70 and the orientation of the mesh component 70, as described below.

Figure 3:
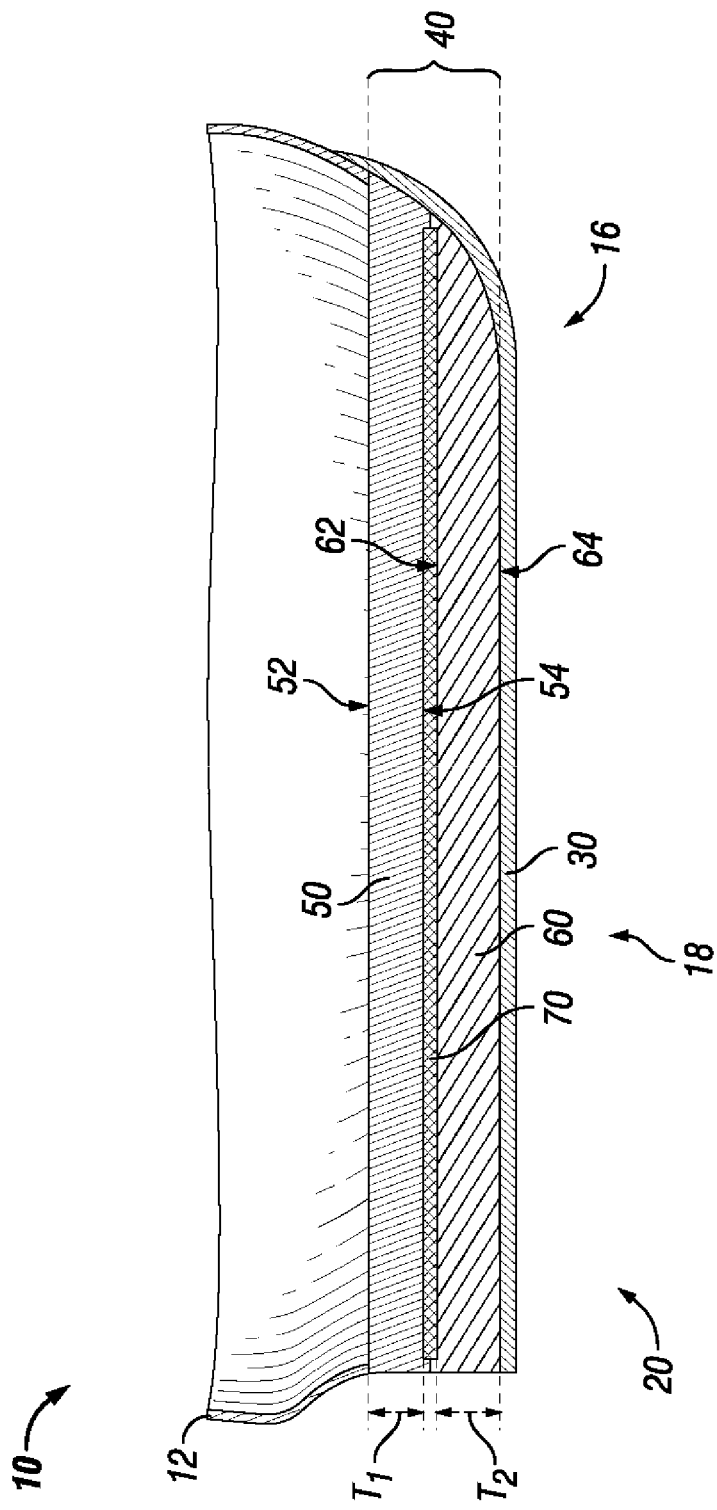
FIG. 3 is an exemplary cross-sectional side view of the example sole structure shown in FIG. 2 according to an aspect of the present disclosure.

FIG. 3 illustrates a cross-sectional side view of the example sole structure 14 shown in FIG. 2 according to various aspects described herein. As shown, the first foam component 50 and the second foam component 60 form a stack in the midsole 40. Further, the mesh component 70 is positioned in the stack between and bonded to the second side 54 of the first foam component 50 and the first side 62 of the second foam component 60. In some cases, the second side 54 of the first foam component 50 and the first side 62 of the second foam component 60 can also be bonded to each other over certain regions in which they interface with each other. Depending upon the characteristics of the mesh component 70, the second side 54 of the first foam component 50 and the first side 62 of the second foam component 60 can also be bonded to each other through openings or apertures in the mesh component 70.

As shown in FIGS. 2 and 3, the first side 52 and the second side 54 of the first foam component 50 may be substantially flat or planar from the medial side 22 to the lateral side 24 and over the forefoot region 16, midfoot region 18, and heel region 20 of the first foam component 50. In other words, neither the first side 52 nor the second side 54 of the first foam component 50 includes undulations. Similarly, the first side 62 and the second side 64 of the second foam component 60 may be substantially flat or planar from the medial side 22 to the lateral side 24 and over the forefoot region 16, midfoot region 18, and heel region 20 of the second foam component 60. In other words, neither the first side 62 nor the second side 64 of the first foam component 60 includes undulations. Examples of other aspects in which the foam components in a midsole include undulations, such as undulations formed as sawtooth patterns and/or wave patterns, are described below.

The first foam component 50 can be formed to any suitable thickness $T_1$ depending upon the design, style, and intended use of the article of footwear 10. Similarly, the second foam component 60 can be formed to any suitable thickness $T_2$ depending upon the design, style, and intended use of the article of footwear 10. Although the first side 52 and the second side 54 of the first foam component 50 may be substantially flat, the thickness $T_1$ of the first foam component 50 may vary over the forefoot region 16, midfoot region 18, and heel region 20. As an example, the thickness $T_1$ of the first foam component 50 may be larger in the heel region 20 and taper down to a smaller thickness $T_1$ in the forefoot region 16. Similarly, the thickness $T_2$ of the first second component 60 may vary over the forefoot region 16, midfoot region 18, and heel region 20. The thickness of the mesh component 70, which is not individually referenced in FIG. 3, can vary based on the type of mesh textile used, and the thickness of the mesh component 70 is not drawn to scale in FIG. 3.

In other aspects described below, the first side 62 of the second foam component 60 may include at least one undulating region. Additionally or alternatively, the second side 54 of the first foam component 50 may include at least one undulating region. When both the second side 54 of the first foam component 50 and the first side 62 of the second foam component 60 include an undulating region, the undulating regions may correspond to (e.g., mirror) each other. Examples of these types of undulating regions are described in further detail below with reference to FIGS. 7, 8, 10, 11, and 14A-14F. In those aspects, the thicknesses of the foam components (e.g., the thicknesses $T_2$ and $T_2$) in the midsole 40 may also vary due to the inclusion of one or more undulating regions formed on the sides of the foam components.

In various examples, one or both of the first foam component 50 and the second foam component 60 can be formed from a foam composition. The foam composition can have an asker C hardness of about 30 C to 65 C among the aspects. The foam composition can also have an energy return of about 60% to 90%. The foam composition can include an olefinic polymer or copolymer, a thermoplastic polymer or copolymer, and/or a polymer selected from the group consisting of an ethylene-vinyl acetate (EVA) copolymer, a styrene-butadiene copolymer, a polyurethane homopolymer or copolymer, and blends thereof.

In some cases, the first foam component 50 and the second foam component 60 can be formed from the same foam composition. In other cases, the first foam component 50 and the second foam component 60 can be formed from different foam compositions. In that case, the first foam component 50 can be formed from a first foam composition, and the second foam component 60 can be formed a second, different foam composition. When formed from different foam compositions, the first foam component 50 can have a different stiffness than the second foam component 60.

The mesh component 70 may be embodied as a mesh textile material, such as a flexible mesh textile material. The mesh component 70 may be knitted, crocheted, braided, or formed through any other suitable process or technique. The mesh component 70 may be formed with one or more yarns formed of one or more individual fibers. In another example, the mesh component 70 may be embodied as a non-woven textile including one or more individual fibers. The mesh component may have a first concentration or density of fibers in a first region and a second concentration or density of fibers in a second region. The first concentration may be greater than the second concentration. For example, the first concentration may be 10 weight percent greater than the second concentration or more, although other differences in weight percent between various regions of the mesh component 70 are within the scope of the aspects.

In some cases, the mesh component 70 may include openings, passages, or apertures. The apertures may vary in size among the aspects. In one example, the apertures may range from at least 0.5 millimeter to 1 millimeter in length in a largest dimension. In another example, the mesh component 70 may include a number of different apertures having different sizes, ranging from at least 0.5 millimeter to 1 millimeter in length in a largest dimension.

The passages or apertures of the mesh component 70 may permit the first foam component 50 and the second foam component 60 to directly contact one another at an interface between them. One or both of the first foam component 50 and the second foam component 60 can be injection molded around or through each passage or aperture in the mesh component 70 in certain aspects. Alternatively, an adhesive may be used to adhere the mesh component 70 to the first foam component 50. Then, the first foam component 50, with the mesh component 70, can be adhered to the second foam component 60 with an adhesive or other suitable adhesion process or step. In another case, an adhesive may be used to adhere the mesh component 70 to the second foam component 60. Then, the first foam component 60, with the mesh component 70, can be adhered to the first foam component 50 with an adhesive or other suitable adhesion process or step. Example methods of forming the first foam component 50, the second foam component 60, and assembling or forming the first foam component 50 and the second foam component 60 with the mesh component 70 are described in further detail below with reference to FIGS. 15A-15B.

Figure 4:
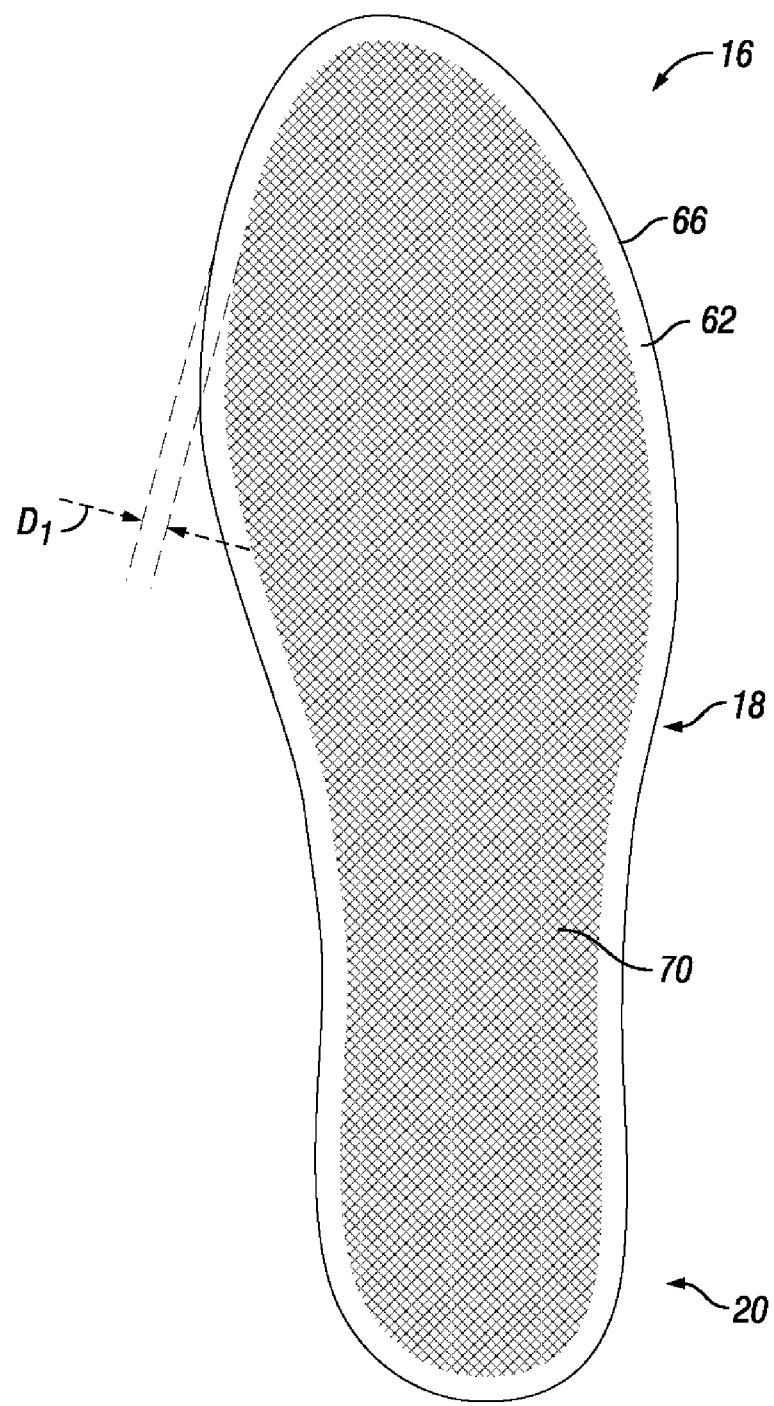
FIG. 4 illustrates a top-down view of a mesh component and a foam component of the sole structure shown in FIGS. 1-3 according to aspects of the present disclosure.

FIG. 4 illustrates a top-down view of the mesh component 70 and the second foam component 60 of the sole structure 14 shown in FIGS. 1-3 according to various aspects described herein. FIG. 4 is provided as a representative example of the manner in which the mesh component 70 may extend between the first foam component 50 and the second foam component 60 within the midsole 40. As shown, the mesh component 70 extends over the first side 62 of the second foam component 60 to within the distance $D_1$ of the sidewall 66 of the second foam component 60. Thus, when the first foam component 50 is stacked over the second foam component 60, the mesh component 70 may extend over the second side 54 of the first foam component 50. In one example, the mesh component 70 may extend to within about 1-5 millimeter of the sidewall 66 of the second foam component 60 (i.e., the distance $D_1$ may be 1-5 mm), although other distances are within the scope of the aspects. Similarly, the mesh component 70 may extend to within about 1-5 millimeter of the sidewall 56 of the first foam component 50, although other distances are within the scope of the aspects.

In FIG. 4, the mesh component 70 extends over the first side 62 of the second foam component 60 to within the distance $D_1$ of the sidewall 66, uniformly, around the periphery of the second foam component 60. In other aspects, the mesh component 70 may extend over any suitable portion or region of the first side 62 of the second foam component 60 and the second side 54 of the first foam component 50 in various aspects. The mesh component 70 may also extend to within different distances of the sidewall 66, as the mesh component 70 extends around the periphery of the second foam component 60. For example, the mesh component 70 may extend closer to the sidewall 66 in the heel region 20 than in the midfoot region 18 or the forefoot region 16. As another example, the mesh component 70 may extend closer to the sidewall 66 in the heel region 20 and the midfoot region 18 than in the forefoot region 16. As still another example, the mesh component 70 may extend closer to the sidewall 66 in the forefoot region 16 than in the heel region 20 and the midfoot region 18.

Figure 5:
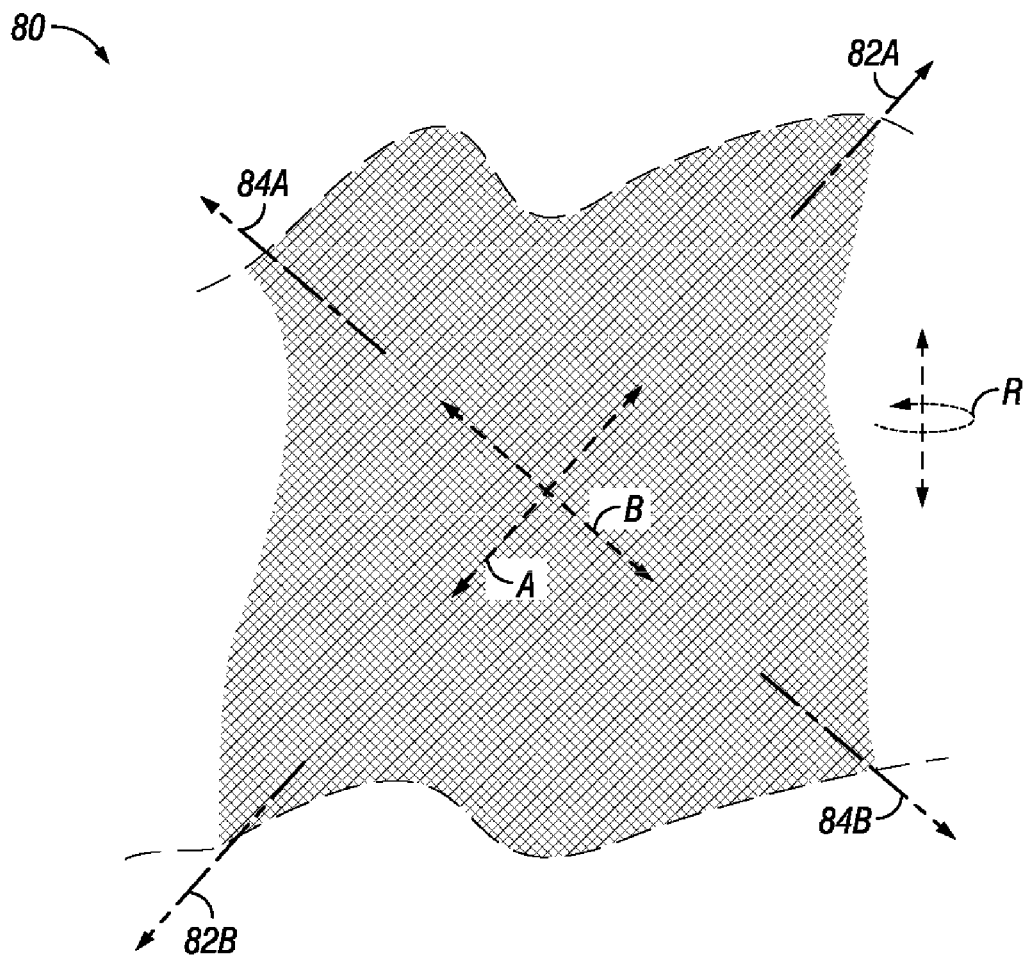
FIG. 5 illustrates an example piece of mesh textile according to aspects of the present disclosure.

As noted above, the compression and/or shear strength sole structure 14 may be increased in certain regions based on the number, placement, and orientation of the mesh components in the sole structure 14. Aspects with different numbers and placements of mesh components are described below. With particular regard to the orientation of the mesh components, FIG. 5 illustrates an example piece of mesh textile 80. The mesh components described herein, such as the mesh component 70 shown in FIGS. 1-4, among others, can be cut out from a piece of mesh textile similar to the piece of mesh textile 80.

The mesh textile 80 may stretch in one direction (e.g., a one-way stretch textile) or in two directions (e.g., a two-way stretch textile). If embodied as a one-way stretch textile, the mesh textile 80 may stretch to a certain extent in the direction A when stretching or pulling forces are applied to it in the directions 82A and 82B, but the mesh textile 80 may not stretch (or may stretch significantly less) in the direction B despite that stretching or pulling forces are applied in the directions 84A and 84B. Alternatively, the mesh textile 80 may stretch to a certain extent in the direction B when stretching or pulling forces are applied to it in the directions 84A and 84B, but the mesh textile 80 may not stretch (or may stretch significantly less) in the direction A despite that stretching or pulling forces are applied in the directions 82A and 82B. Thus, the extent to which the mesh textile 80 stretches (or resists stretching) may be directionally-dependent based on the type or types of materials from which it is formed, the manner in which the mesh textile 80 is formed, and other factors.

If embodied as a two-way stretch textile, the mesh textile 80 may stretch in the direction A when stretching or pulling forces are applied in the directions 82A and 82B, and the mesh textile 80 may also stretch in the direction B when stretching or pulling forces are applied in the directions 84A and 84B. For a two-way stretch textile, mesh textile 80 may stretch in the direction A to a first percentage, and the mesh textile 80 may also stretch to a different, second percentage in the direction B. Thus, even for two-way stretch textiles, the extent to which the mesh textile 80 stretches (or resists stretching) may be directionally-dependent based on the types of materials from which it is formed, the manner in which the mesh textile 80 is formed, and other factors. Further, because the extent to which the mesh textile 80 stretches may be directionally-dependent, the type (e.g., one-way or two-way stretch) and orientation R of the mesh textile 80 may be considered before cutting a piece of the mesh textile 80 out from it for use in a midsole.

Referring back to FIG. 2, the compression and/or shear strength of the midsole 40 may be increased in one or more of the directions A', B', and C' the due to the inclusion of the mesh component 70 in the midsole 40. Further, in some cases, the compression and/or shear strength of the midsole 40 may be altered to a greater or lesser extent in one or more of the directions A', B', and C' depending upon the type of the mesh component 70 (e.g., one-way or two-way stretch) and the orientation of the mesh component 70. For example, if the mesh component 70 shown in FIG. 2 is cut out from a piece of the mesh textile 80 shown in FIG. 4, the mesh component 70 may stretch to a greater or lesser extent in one or more of the directions A' and B', depending upon the orientation R of the mesh textile 80 when the mesh component 70 is cut out from the mesh textile 80. To the extent that the mesh component 70 stretches to a greater extent in the direction A' as compared to the direction B', in one example, the shear strength of the midsole 40 may be increased to a greater extent in the direction B' than in the direction A'. On the other hand, to the extent that the mesh component 70 stretches to a greater extent in the direction B' as compared to the direction A', the shear strength of the midsole 40 may be increased to a greater extent in the direction A' than in the direction B'. Thus, the shear strength of the sole structure 14 may be increased, more or less, in certain directions based on the orientation of the mesh component 70 and the directionality of the stretch properties of the mesh component 70 in the sole structure 14.

Figure 6A:
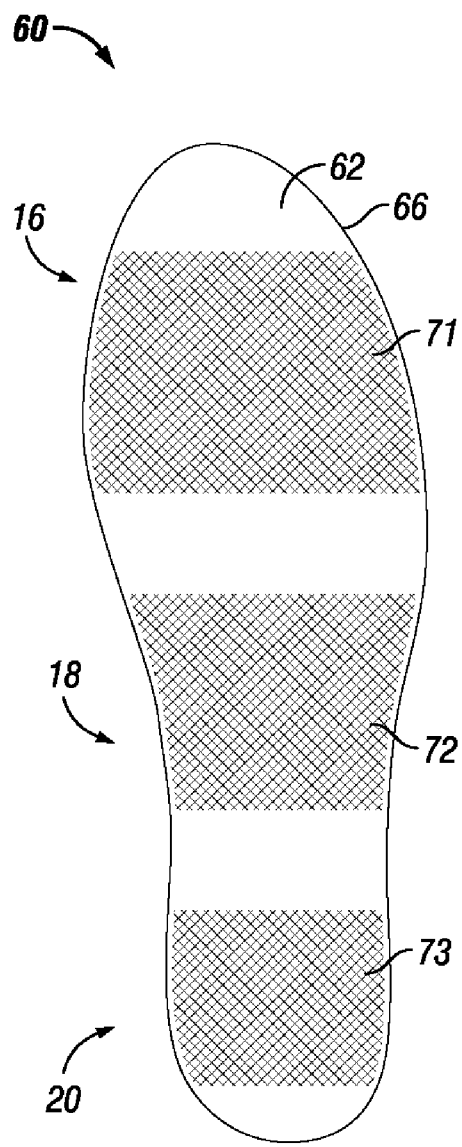
FIGS. 6A-6B illustrate top-down views of example aspects each including different mesh components and a foam component in various arrangements according to aspects of the present disclosure.

According to other aspects, the sole structure 14 may also include more than one mesh component, and the compression and/or shear strength of the sole structure 14 may be increased based on the number and placement of the mesh components. In that context, FIG. 6A illustrates a top-down view of an example aspect including a number of mesh components and the second foam component 60. In the example shown in FIG. 6A, a first mesh component 71, a second mesh component 72, and a third mesh component 73 (collectively, the "mesh components 71-73") are each positioned at different locations on the first side 62 of the second foam component 60. The first mesh component 71 is positioned in the forefoot region 16, the second mesh component 72 is positioned in the midfoot region 18, and the third mesh component 73 is positioned in the heel region 20. The sizes, shapes, and relative positions of the mesh components 71-73 are provided as an example in FIG. 6A. In other cases, mesh components in addition to the mesh components 71-73 can also be included, or one or more of the mesh components 71-73 can be omitted.

In FIG. 6A, each of the mesh components 71-73 can be embodied as either a one-way or a two-way stretch textile. Further, the extent to which each of the mesh components 71-73 stretches may be directionally-dependent as described herein. Thus, the type (e.g., one-way or two-way stretch) and orientation of each of the mesh components 71-73 may be selected to increase the compression and/or shear strength of the midsole 40 in the forefoot region 16, the midfoot region 18, and the heel region 20. By selecting different types and/or orientations of the mesh components 71-73 (relative to each other), the compression and/or shear strength of the midsole 40 can be varied among the forefoot region 16, the midfoot region 18, and the heel region 20. Further, the compression and/or shear strength in the forefoot region 16 can be increased in one or more of the directions A', B', or C' (see FIG. 2). The compression and/or shear strength in both the midfoot region 18 and the heel region 20 can also be increased, respectively, in one or more of the directions A', B', or C'.

Figure 6B:
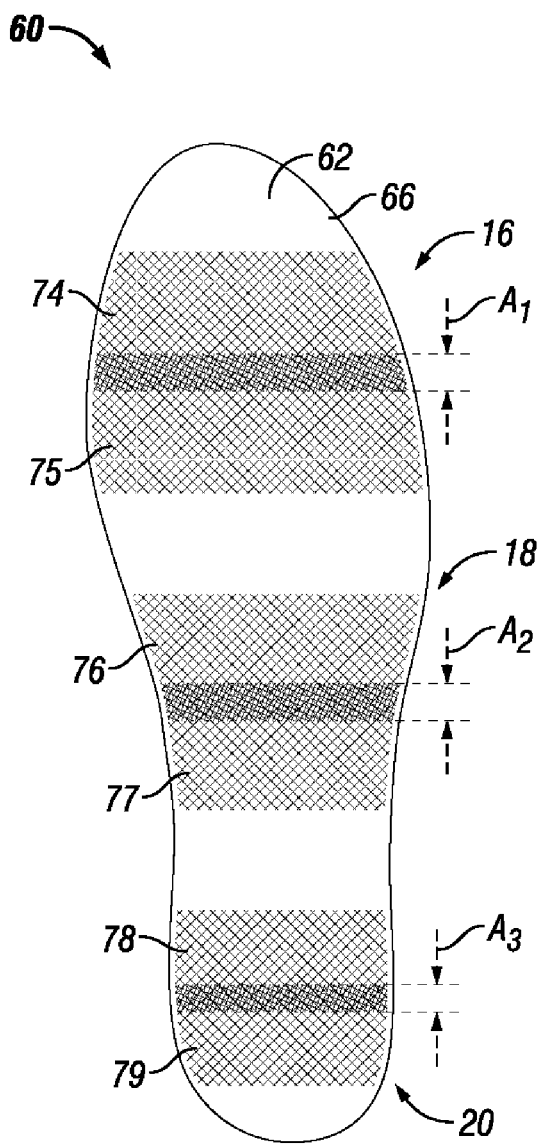

In the example shown in FIG. 6B, a first mesh component 74, a second mesh component 75, a third mesh component 76, a fourth mesh component 77, a fifth mesh component 78, and a sixth mesh component 79 (collectively, the "mesh components 74-79") are each positioned at different locations on the first side 62 of the second foam component 60. The sizes, shapes, and relative positions of the mesh components 74-79 are provided as an example in FIG. 6B. In other cases, mesh components in addition to the mesh components 74-79 can also be included, or one or more of the mesh components 74-79 can be omitted.

As shown in FIG. 6B, the first mesh component 74 and the second mesh component 75 are both positioned in the forefoot region 16 and overlap each other over the area $A_1$ in the forefoot region 16. Further, the third mesh component 76 and the fourth mesh component 77 are both positioned in the midfoot region 18 and overlap each other over the area $A_2$ in the midfoot region 18. Additionally, the fifth mesh component 78 and the sixth mesh component 79 are both positioned in the heel region 20 and overlap each other over the area $A_3$ in the heel region 20. In the area $A_1$ where the first mesh component 74 and the second mesh component 75 overlap each other, the compression and/or shear strength of the midsole 40 can be increased as compared to areas where they do not overlap. The compression and/or shear strength of the midsole 40 can also be increased in a similar way over the areas $A_2$ and $A_3$. The size of the areas $A_1$-$A_3$ are representative in FIG. 6B and can vary as compared to that shown.

In FIG. 6B, each of the mesh components 74-79 can be embodied as either a one-way or a two-way stretch textile. Further, the extent to which each of the mesh components 74-79 stretches may be directionally-dependent as described herein. Thus, the type (e.g., one-way or two-way stretch) and orientation of each of the mesh components 74-79 may be selected to increase the compression and/or shear strength of the midsole 40 in the forefoot region 16, the midfoot region 18, and the heel region 20. By selecting different types and/or orientations of the mesh components 74-79 (relative to each other), the compression and/or shear strength of the midsole 40 can be varied among the forefoot region 16, the midfoot region 18, and the heel region 20. Further, the compression and/or shear strength in the forefoot region 16 can be increased in one or more of the directions A', B', or C' (see FIG. 2). The compression and/or shear strength in both the midfoot region 18 and the heel region 20 can also be increased, respectively, in one or more of the directions A', B', or C'.

Figure 7:
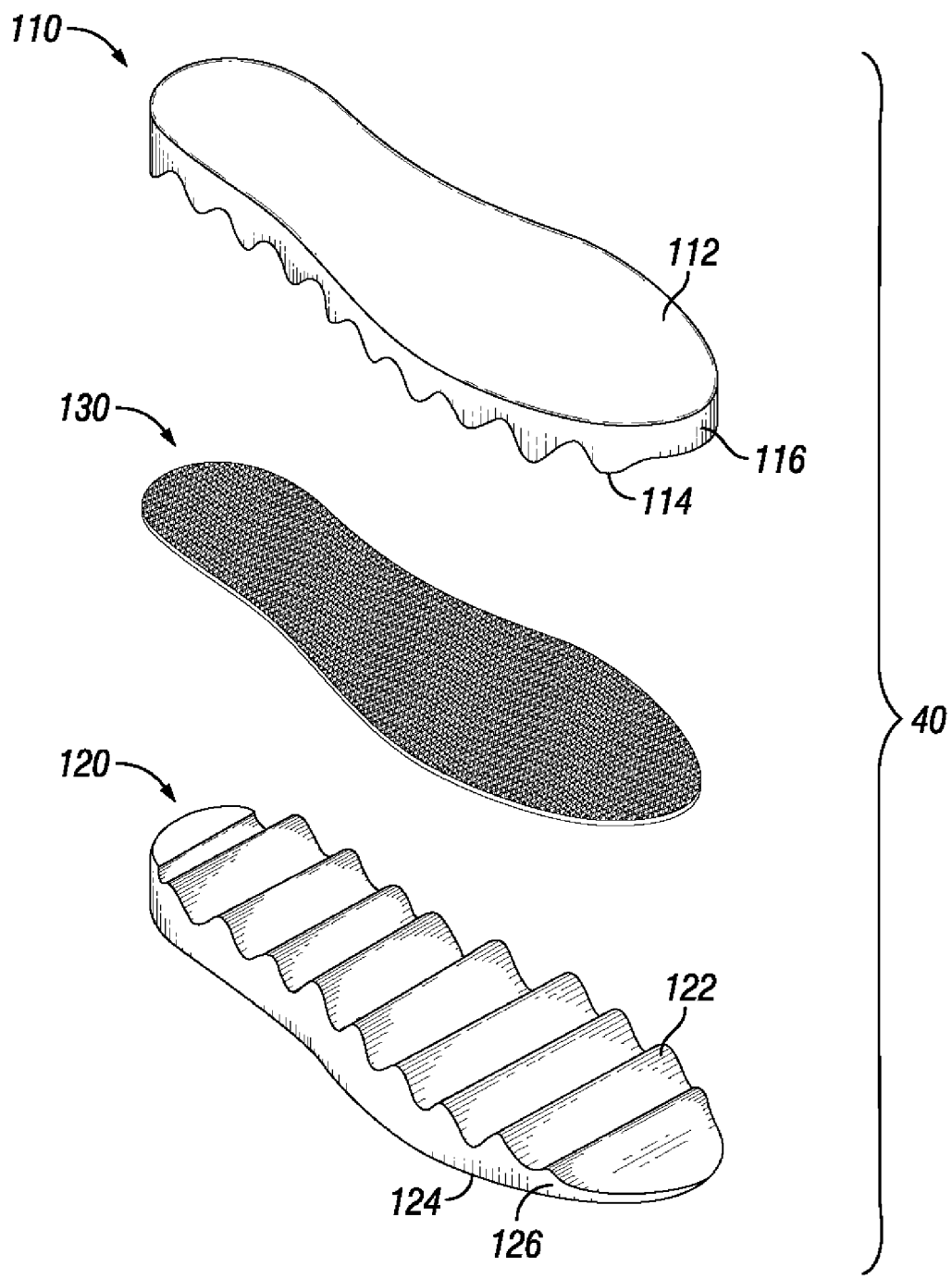
FIG. 7 illustrates an exploded perspective view of another example midsole structure, including a wave pattern according to aspects of the present disclosure.

FIG. 7 illustrates an exploded perspective view of another example midsole 100, including a wave pattern, according to various aspects described herein. As shown, the midsole 100 includes a first foam component 110, a second foam component 120, and a mesh component 130. The first foam component 110 includes a first side 112, a second side 114 opposite the first side 112, and a sidewall 116 extending around the periphery of the first side 112 and the second side 114. The second foam component 120 includes a first side 122, a second side 124 opposite the first side 122, and a sidewall 126 extending around the periphery of the first side 122 and the second side 124. When the midsole 100 is assembled, the mesh component 130 is positioned in a stack between and bonded to the second side 114 of the first foam component 110 and the first side 122 of the second foam component 120. The first foam component 110 and the second foam component 120 may be formed from the same material or materials as the other foam components described herein. The mesh component 130 may be formed from the same material or materials as the other mesh components described herein.

As shown in FIG. 7, the surface of the second side 114 of the first foam component 110 is undulating and transitions in a wave pattern. The surface of the first side 122 of the second foam component 120 is also undulating and transitions in a wave pattern. The wave pattern of the second side 114 of the first foam component 110 may vary over one or more regions according to one or more dimensional aspects that define the shape of the wave pattern as it extends over the second side 114. The wave pattern of the first side 122 of the second foam component 120 may also vary over one or more regions according to one or more dimensional aspects that define the shape of the wave pattern as it extends over the first side 122. Examples of the dimensional aspects are described in further detail below with reference to FIG. 8.

FIG. 8 illustrates a cross-sectional side view of the example midsole 100 shown in FIG. 7. As shown, the first foam component 110 and the second foam component 120 form a stack in the midsole 100. Further, the mesh component 130 is positioned in the stack between and bonded to the second side 114 of the first foam component 110 and the first side 122 of the second foam component 120. In some cases, the second side 114 of the first foam component 110 and the first side 122 of the second foam component 120 can also be bonded to each other over certain regions in which they interface with each other. Depending upon the characteristics of the mesh component 130, the second side 114 of the first foam component 110 and the first side 122 of the second foam component 120 can also be bonded to each other through openings or apertures in the mesh component 130.

As best seen in FIG. 8, the undulating surface of the second side 114 of the first foam component 110 coincides with or is complementary to the undulating surface of the first side 122 of the second foam component 120, and the mesh component 130 is positioned in the stack between them. A relative position of the mesh component 130 varies within the stack along the undulating surface of the second side 114 of the first foam component 110 and the undulating surface of the first side 122 of the second foam component 120. The wave pattern of the undulating surface of the second side 114 and the wave pattern of the undulating surface of first side 122 have an amplitude $A_4$ and a wavelength $W_1$. The amplitude $A_4$ and the wavelength $W_1$ are examples of dimensional aspects that define the shape and size of the wave pattern of the undulating surfaces of the second side 114 and the first side 122.

The amplitude $A_4$ and the wavelength $W_1$ can remain substantially constant over the forefoot region 16, the midfoot region 18, and the heel region 20 as shown in FIG. 8. Alternatively, the amplitude $A_4$ and/or the wavelength $W_1$ can vary from that shown. A larger amplitude $A_4$ may lead to an increased compression and/or shear strength of the midsole 100. Similarly, a shorter wavelength $W_1$ may lead to an increased compression and/or shear strength of the midsole 100. The amplitude $A_4$ and/or the wavelength $W_1$ can vary over one or more regions, such as over the forefoot region 16, the midfoot region 18, and the heel region 20. For example, the amplitude $A_4$ may be greater in the heel region 20, less in the midfoot region 18, and still less in the forefoot region 16. As another example, the wavelength $W_1$ maybe greater in the heel region 20, less in the midfoot region 18, and still less in the forefoot region 16.

Figure 9A:
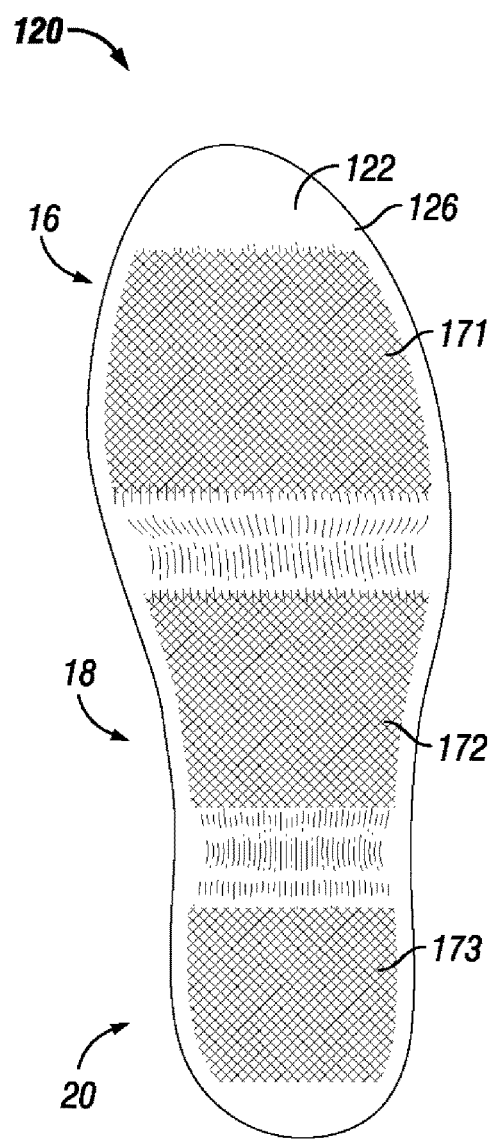
FIGS. 9A-9B illustrate top-down views of example aspects each including different mesh components and a foam component in various arrangements according to aspects of the present disclosure.

FIG. 9A illustrates a top-down view of an example aspect including a number of mesh components and the second foam component 120. In the example shown in FIG. 9A, a first mesh component 171, a second mesh component 172, and a third mesh component 173 (collectively, the "mesh components 171-173") are each positioned at different locations on the first side 122 of the second foam component 120. The first mesh component 171 is positioned in the forefoot region 16, the second mesh component 172 is positioned in the midfoot region 18, and the third mesh component 173 is positioned in the heel region 20. The sizes, shapes, and relative positions of the mesh components 171-173 are provided as an example in FIG. 9A. In other cases, mesh components in addition to the mesh components 171-173 can also be included, or one or more of the mesh components 171-173 can be omitted.

In FIG. 9A, each of the mesh components 171-173 can be embodied as either a one-way or a two-way stretch textile. Further, the extent to which each of the mesh components 171-173 stretches may be directionally-dependent as described herein. Thus, the type (e.g., one-way or two-way stretch) and orientation of each of the mesh components 171-173 may be selected to increase the compression and/or shear strength of the midsole 100 in the forefoot region 16, the midfoot region 18, and the heel region 20. By selecting different types and/or orientations of the mesh components 171-173 (relative to each other), the compression and/or shear strength of the midsole 40 can be varied among the forefoot region 16, the midfoot region 18, and the heel region 20. Further, by selecting certain orientations of the mesh components 171-173, the compression and/or shear strength in the forefoot region 16 can be increased in one or more of the directions A', B', or C' (see FIG. 2). The compression and/or shear strength in both the midfoot region 18 and the heel region 20 can also be increased, respectively, in one or more of the directions A', B', or C'. The increase in the compression and/or shear strength of the midsole 100 due to the inclusion of the mesh components 171-173 may be in addition to any increase due to the undulating surfaces of the second side 114 of the first foam component 110 and the undulating surface of the first side 122 of the second foam component 120.

Figure 9B:
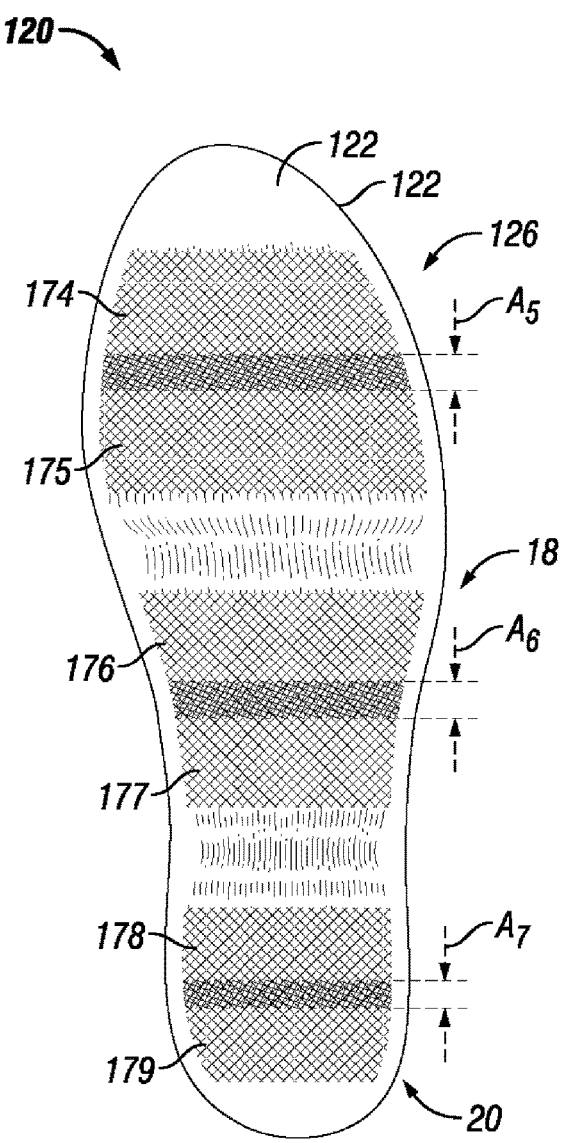

In the example shown in FIG. 9B, a first mesh component 174, a second mesh component 175, a third mesh component 176, a fourth mesh component 177, a fifth mesh component 178, and a sixth mesh component 179 (collectively, the "mesh components 174-179") are each positioned at different locations on the first side 122 of the second foam component 120. The sizes, shapes, and relative positions of the mesh components 174-179 are provided as an example in FIG. 9B. In other cases, mesh components in addition to the mesh components 174-179 can also be included, or one or more of the mesh components 174-179 can be omitted.

As shown in FIG. 9B, the first mesh component 174 and the second mesh component 175 are both positioned in the forefoot region 16 and overlap each other over the area $A_5$ in the forefoot region 16. Further, the third mesh component 176 and the fourth mesh component 177 are both positioned in the midfoot region 18 and overlap each other over the area $A_6$ in the midfoot region 18. Additionally, the fifth mesh component 178 and the sixth mesh component 179 are both positioned in the heel region 20 and overlap each other over the area $A_7$ in the heel region 20. In the area $A_5$ where the first mesh component 174 and the second mesh component 175 overlap each other, the compression and/or shear strength of the midsole 100 can be increased as compared to areas where they do not overlap. The compression and/or shear strength of the midsole 100 can also be increased in a similar way over the areas $A_6$ and $A_7$. The size of the areas $A_5$-$A_7$ are representative in FIG. 9B and can vary as compared to that shown.

In FIG. 9B, each of the mesh components 174-179 can be embodied as either a one-way or a two-way stretch textile. Further, the extent to which each of the mesh components 174-179 stretches may be directionally-dependent as described herein. Thus, the type (e.g., one-way or two-way stretch) and orientation of each of the mesh components 174-179 may be selected to increase the compression and/or shear strength of the midsole 100 in the forefoot region 16, the midfoot region 18, and the heel region 20. By selecting different types and/or orientations of the mesh components 174-179 (relative to each other), the compression and/or shear strength of the midsole 100 can be varied among the forefoot region 16, the midfoot region 18, and the heel region 20. Further, by selecting certain orientations of the mesh components 174-179, the compression and/or shear strength in the forefoot region 16 can be increased in one or more of the directions A', B', or C' (see FIG. 2). The compression and/or shear strength in both the midfoot region 18 and the heel region 20 can also be tailored to be increased, respectively, in one or more of the directions A', B', or C'. The increase in the compression and/or shear strength of the midsole 100 due to the inclusion of the mesh components 174-179 may be in addition to any increase due to the undulating surfaces of the second side 114 of the first foam component 110 and the undulating surface of the first side 122 of the second foam component 120.

Figure 10:
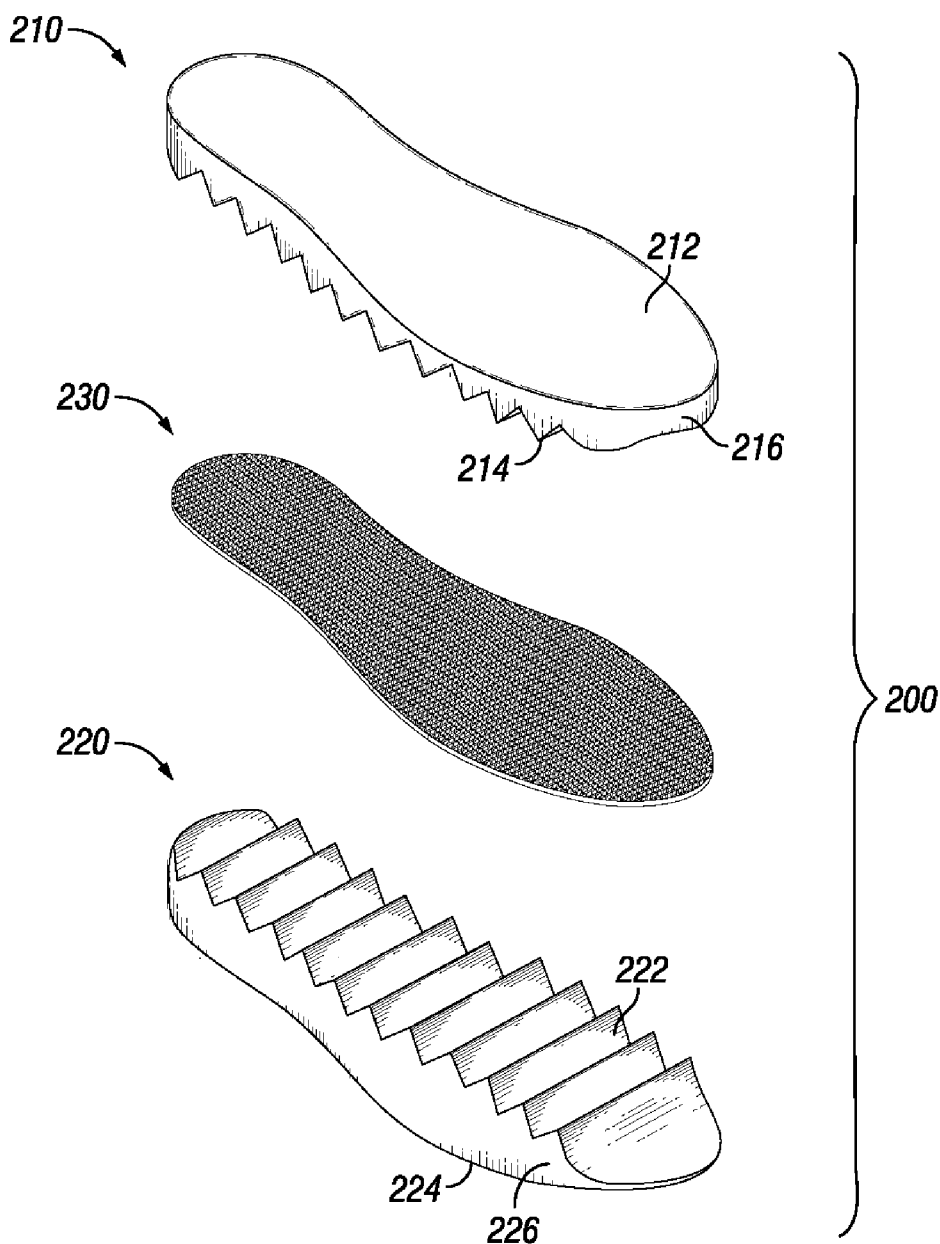
FIG. 10 illustrates an exploded perspective view of another example midsole structure, including a sawtooth pattern according to aspects of the present disclosure.

FIG. 10 illustrates an exploded perspective view of another example midsole 200, including a sawtooth pattern, according to various aspects described herein. As shown, the midsole 200 includes a first foam component 210, a second foam component 220, and a mesh component 230. The first foam component 210 includes a first side 212, a second side 214 opposite the first side 212, and a sidewall 216 extending around the periphery of the first side 212 and the second side 214. The second foam component 220 includes a first side 222, a second side 224 opposite the first side 222, and a sidewall 226 extending around the periphery of the first side 222 and the second side 224. When the midsole 200 is assembled, the mesh component 230 is positioned in a stack between and bonded to the second side 214 of the first foam component 210 and the first side 222 of the second foam component 220. The first foam component 210 and the second foam component 220 may be formed from the same material or materials as the other foam components described herein. The mesh component 230 may be formed from the same material or materials as the other mesh components described herein.

As shown in FIG. 10, the surface of the second side 214 of the first foam component 210 is undulating and transitions in a sawtooth pattern. The surface of the first side 222 of the second foam component 220 is also undulating and transitions in a sawtooth pattern. The sawtooth pattern of the second side 214 of the first foam component 210 may vary over one or more regions according to one or more dimensional aspects that define the shape of the sawtooth pattern as it extends over the second side 214. The sawtooth pattern of the first side 222 of the second foam component 220 may also vary over one or more regions according to one or more dimensional aspects that define the shape of the sawtooth pattern as it extends over the first side 222. Examples of the dimensional aspects are described in further detail below with reference to FIG. 11.

Figure 11:
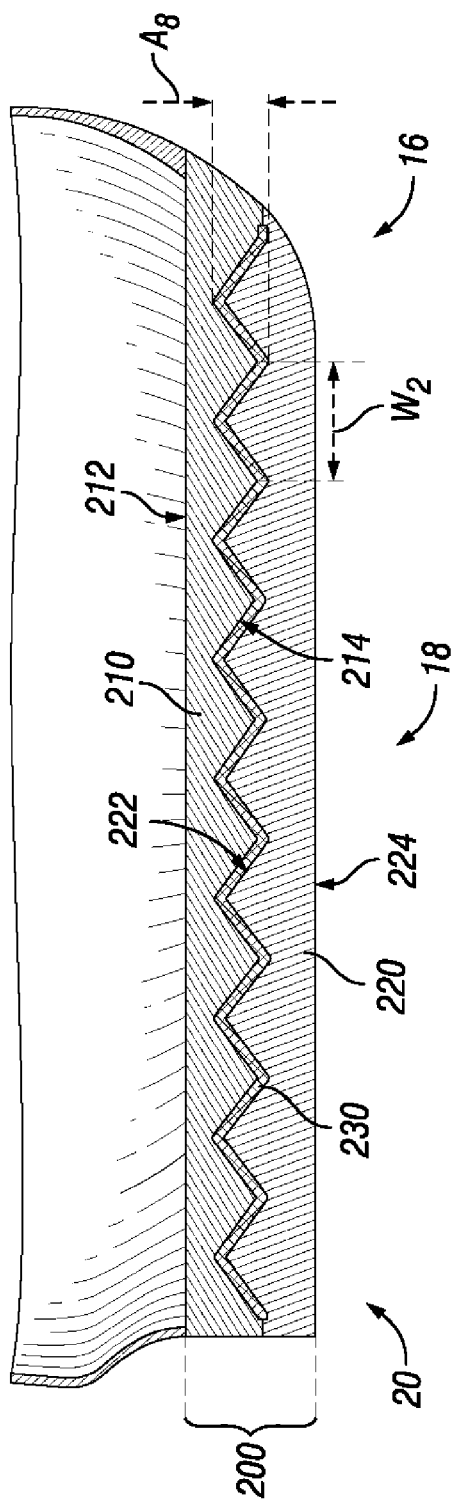
FIG. 11 illustrates a cross-sectional side view of the example midsole structure shown in FIG. 10 according to aspects of the present disclosure.

FIG. 11 illustrates a cross-sectional side view of the example midsole 200 shown in FIG. 10. As shown, the first foam component 210 and the second foam component 220 form a stack in the midsole 200. Further, the mesh component 230 is positioned in the stack between and bonded to the second side 214 of the first foam component 210 and the first side 222 of the second foam component 220. In some cases, the second side 214 of the first foam component 210 and the first side 222 of the second foam component 220 can also be bonded to each other over certain regions in which they interface with each other. Depending upon the characteristics of the mesh component 230, the second side 214 of the first foam component 210 and the first side 222 of the second foam component 220 can also be bonded to each other through openings or apertures in the mesh component 230.

As best seen in FIG. 11, the undulating surface of the second side 214 of the first foam component 210 coincides with or is complementary to the undulating surface of the first side 222 of the second foam component 220, and the mesh component 230 is positioned in the stack between them. The sawtooth pattern of the undulating surface of the second side 214 and the sawtooth pattern of the undulating surface of first side 222 have an amplitude $A_8$ and a wavelength $W_2$. The amplitude $A_8$ and the wavelength $W_2$ are examples of dimensional aspects that define the shape and size of the wave pattern of the undulating surfaces of the second side 214 and the first side 222.

The amplitude $A_8$ and the wavelength $W_2$ can remain substantially constant over the forefoot region 16, the midfoot region 18, and the heel region 20 as shown in FIG. 11. Alternatively, the amplitude $A_8$ and/or the wavelength $W_2$ can vary from that shown. A larger amplitude $A_8$ may lead to an increased compression and/or shear strength of the midsole 200. Similarly, a shorter wavelength $W_2$ may lead to an increased compression and/or shear strength of the midsole 200. The amplitude $A_8$ and/or the wavelength $W_2$ can vary over one or more regions, such as over the forefoot region 16, the midfoot region 18, and the heel region 20. For example, the amplitude $A_8$ may be greater in the heel region 20, less in the midfoot region 18, and still less in the forefoot region 16. As another example, the wavelength $W_2$ maybe greater in the heel region 20, less in the midfoot region 18, and still less in the forefoot region 16.

FIG. 12A illustrates a top-down view of an example aspect including a number of mesh components and the second foam component 220. In the example shown in FIG. 12A, a first mesh component 271, a second mesh component 272, and a third mesh component 273 (collectively, the "mesh components 271-273") are each positioned at different locations on the first side 222 of the second foam component 220. The first mesh component 271 is positioned in the forefoot region 16, the second mesh component 272 is positioned in the midfoot region 18, and the third mesh component 273 is positioned in the heel region 20. The sizes, shapes, and relative positions of the mesh components 271-273 are provided as an example in FIG. 9A. In other cases, mesh components in addition to the mesh components 271-273 can also be included, or one or more of the mesh components 271-273 can be omitted.

In FIG. 12A, each of the mesh components 271-273 can be embodied as either a one-way or a two-way stretch textile. Further, the extent to which each of the mesh components 271-273 stretches may be directionally-dependent as described herein. Thus, the type (e.g., one-way or two-way stretch) and orientation of each of the mesh components 271-273 may be selected to increase the compression and/or shear strength of the midsole 200 in the forefoot region 16, the midfoot region 18, and the heel region 20. By selecting different types and/or orientations of the mesh components 271-273 (relative to each other), the compression and/or shear strength of the midsole 40 can be varied among the forefoot region 16, the midfoot region 18, and the heel region 20. Further, by selecting certain orientations of the mesh components 271-273, the compression and/or shear strength in the forefoot region 16 can be increased in one or more of the directions A', B', or C' (see FIG. 2). The compression and/or shear strength in both the midfoot region 18 and the heel region 20 can also be increased, respectively, in one or more of the directions A', B', or C'. The increase in the compression and/or shear strength of the midsole 200 due to the inclusion of the mesh components 271-273 may be in addition to any increase due to the undulating surfaces of the second side 214 of the first foam component 210 and the undulating surface of the first side 222 of the second foam component 220.

In the example shown in FIG. 12B, a first mesh component 274, a second mesh component 275, a third mesh component 276, a fourth mesh component 277, a fifth mesh component 278, and a sixth mesh component 279 (collectively, the "mesh components 274-279") are each positioned at different locations on the first side 222 of the second foam component 220. The sizes, shapes, and relative positions of the mesh components 274-279 are provided as an example in FIG. 12B. In other cases, mesh components in addition to the mesh components 274-279 can also be included, or one or more of the mesh components 274-279 can be omitted.

As shown in FIG. 12B, the first mesh component 274 and the second mesh component 275 are both positioned in the forefoot region 16 and overlap each other over the area $A_9$ in the forefoot region 16. Further, the third mesh component 276 and the fourth mesh component 277 are both positioned in the midfoot region 18 and overlap each other over the area $A_{10}$ in the midfoot region 18. Additionally, the fifth mesh component 278 and the sixth mesh component 279 are both positioned in the heel region 20 and overlap each other over the area $A_{11}$ in the heel region 20. In the area $A_9$ where the first mesh component 274 and the second mesh component 275 overlap each other, the compression and/or shear strength of the midsole 200 can be increased as compared to areas where they do not overlap. The compression and/or shear strength of the midsole 200 can also be increased in a similar way over the areas $A_{11}$ and $A_{12}$. The size of the areas $A_9$-$A_{12}$ are representative in FIG. 12B and can vary as compared to that shown.

In FIG. 12B, each of the mesh components 274-279 can be embodied as either a one-way or a two-way stretch textile. Further, the extent to which each of the mesh components 274-279 stretches may be directionally-dependent as described herein. Thus, the type (e.g., one-way or two-way stretch) and orientation of each of the mesh components 274-279 may be selected to increase the compression and/or shear strength of the midsole 200 in the forefoot region 16, the midfoot region 18, and the heel region 20. By selecting different types and/or orientations of the mesh components 274-279 (relative to each other), the compression and/or shear strength of the midsole 200 can be varied among the forefoot region 16, the midfoot region 18, and the heel region 20. Further, by selecting certain orientations of the mesh components 274-279, the compression and/or shear strength in the forefoot region 16 can be increased in one or more of the directions A', B', or C' (see FIG. 2). The compression and/or shear strength in both the midfoot region 18 and the heel region 20 can also be tailored to be increased, respectively, in one or more of the directions A', B', or C'. The increase in the compression and/or shear strength of the midsole 200 due to the inclusion of the mesh components 274-279 may be in addition to any increase due to the undulating surfaces of the second side 214 of the first foam component 210 and the undulating surface of the first side 222 of the second foam component 220.

Figure 13:
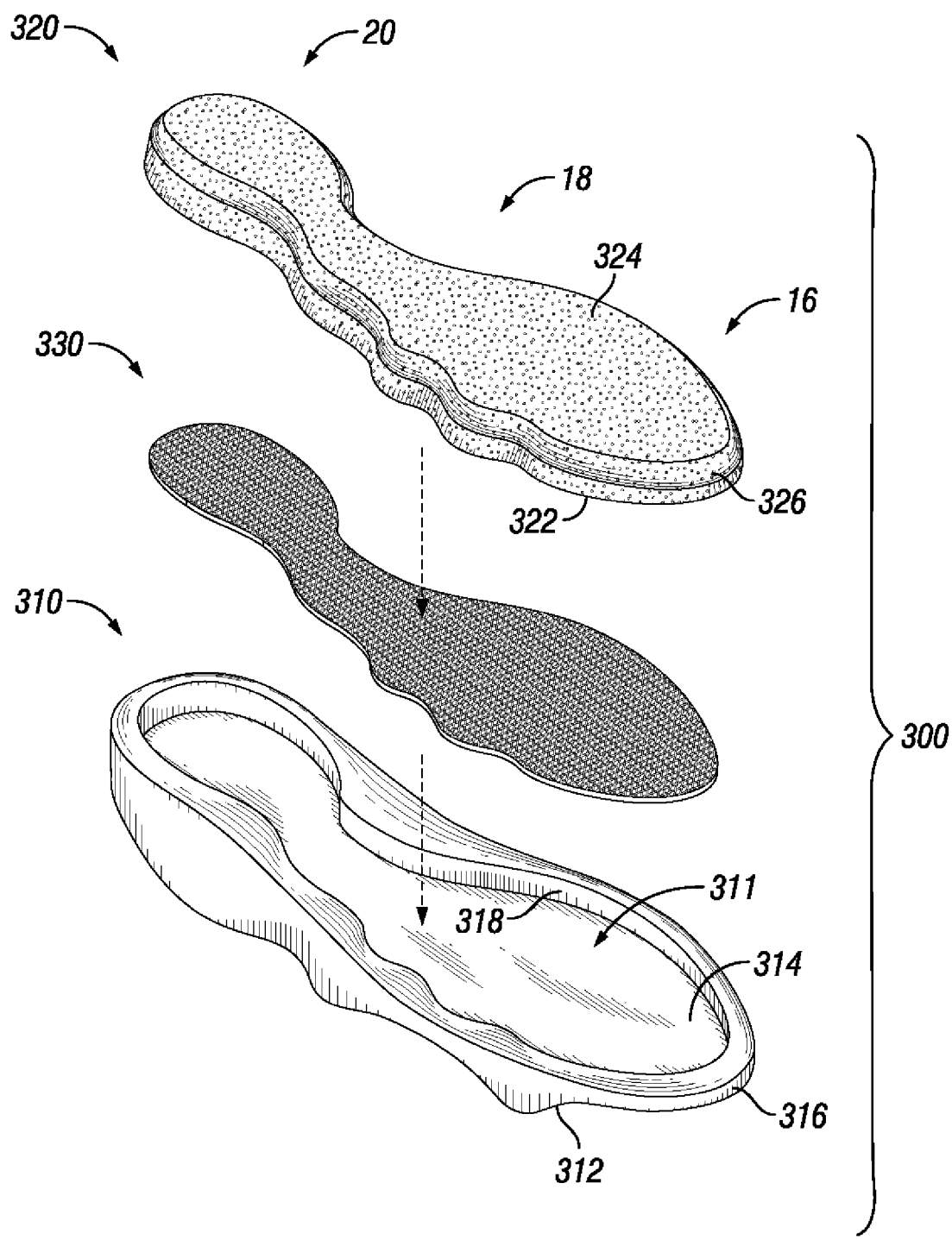
FIG. 13 illustrates an exploded perspective view of another example midsole structure, including a first foam component having a cavity and a second foam component that fits into the cavity according to aspects of the present disclosure.

FIG. 13 illustrates an exploded perspective view of another example midsole 300, including a first foam component 310 having a cavity 311 and a second foam component 320 that fits into the cavity 311, according to various aspects described herein. To provide a view of the cavity 311, the midsole 300 is illustrated in an upside-down orientation as compared to how it would be used. That is, when assembled into an article of footwear similar to the article of footwear 10 shown in FIG. 1, an outsole (e.g., similar to the outsole 30 shown in FIG. 1) may be adhered to the second side 324 of the second foam component 320.

As shown in FIG. 13, the midsole 300 includes a first foam component 310, a second foam component 320, and a mesh component 330. The first foam component 310 includes a first side 312, a second side 314 opposite the first side 312, and a sidewall 316 extending around the periphery of the first side 312 and the second side 314. The second foam component 320 includes a first side 322, a second side 324 opposite the first side 322, and a sidewall 326 extending around the periphery of the first side 322 and the second side 324. The sizes and shapes of the first foam component 310, the second foam component 320, and the mesh component 330 are provided as an example in FIG. 13. In other aspects, the sizes and shapes may differ from that shown.

One difference between the midsole 300 shown in FIG. 13 and the midsoles 40, 100, and 200 described above is that the second foam component 320 fits into the cavity 311 of the first foam component 310. Similarly, the mesh component 330 is positioned within the cavity 311 between the first foam component 310 and the second foam component 320. The cavity 311 is bounded by the second side 314 of the first foam component 310 and the inner sidewall 318 of the first foam component 310.

When the midsole 300 is assembled, the second side 314 of the first foam component 310 and the first side 322 of the second foam component 320 can be bonded to each other over certain regions in which they interface with each other. Depending upon the characteristics of the mesh component 330, the second side 314 of the first foam component 310 and the first side 322 of the second foam component 320 can also be bonded to each other through openings or apertures in the mesh component 330. Additionally, the sidewall 326 of the second foam component 320 can be bonded to the inner sidewall 318 of the first foam component 310 within the cavity 311. The first foam component 310 and the second foam component 320 may be formed from the same material or materials as the other foam components described herein.

The mesh component 330 may be formed from the same material or materials as the other mesh components described herein. The mesh component 330 can be embodied as either a one-way or a two-way stretch textile. Thus, the extent to which mesh component 330 stretches may be directionally-dependent as described herein. Thus, the type (e.g., one-way or two-way stretch) and orientation of each of mesh component 330 may be selected to increase the compression and/or shear strength of the midsole 330 in the forefoot region 16, the midfoot region 18, and the heel region 20. By selecting a particular type and orientation of the mesh component 330, the compression and/or shear strength of the midsole 330 can be tailored for a particular purpose as described herein. Further, the compression and/or shear strength of the midsole 330 can be increased in one or more of the directions A', B', or C' (see FIG. 2).

In other examples, a number of separate mesh components can be used in place of the mesh component 330. For example, mesh components similar to the mesh components 71-73 shown in FIG. 6A can be positioned at different locations between the first foam component 310 and the second foam component 320. In that case, a first mesh component may be positioned in the forefoot region 16, a second mesh component may be positioned in the midfoot region 18, and a third mesh component may be positioned in the heel region 20. In another example, mesh components similar to the mesh components 74-79 shown in FIG. 6B can be positioned at different locations between the first foam component 310 and the second foam component 320. The mesh components can overlap over certain areas or regions.

When more than one mesh component is relied upon, each of the mesh components can be embodied as a one-way or a two-way stretch textile. In that case, the type (e.g., one-way or two-way stretch) and orientation of each of the mesh components may be selected to increase the compression and/or shear strength of the midsole 300 to a different extent in one of the forefoot region 16, the midfoot region 18, and the heel region 20. By selecting different types and/or orientations of the mesh components (relative to each other), the compression and/or shear strength of the midsole 300 can be varied among the forefoot region 16, the midfoot region 18, and the heel region 20. Further, the compression and/or shear strength in the forefoot region 16 can be increased in one or more of the directions A', B', or C' (see FIG. 2). The compression and/or shear strength in both the midfoot region 18 and the heel region 20 can also be increased, respectively, in one or more of the directions A', B', or C'.

As shown in FIG. 13, the second side 314 of the first foam component 310 (i.e., within the cavity 311) and the first side 322 of the second foam component 320 may be substantially flat or planar over the forefoot region 16, the midfoot region 18, and the heel region 20. In other words, neither the first side 322 nor the second side 314 includes undulations. As an example of a midsole including foam components with undulating sides, FIGS. 14A-14F illustrate views of another example midsole 400. Particularly, FIG. 14A illustrates a top view of the midsole 400, FIG. 14B illustrates a bottom view of the midsole 400, and FIG. 14C illustrates a cross-sectional side view of the midsole 400. FIGS. 14D-14F illustrate the cross-sectional views designated in FIG. 14A.

As best shown in FIG. 14C, the midsole includes a first foam component 410 having a first side 412 and a second side 414 opposite the first side 412. The second foam component 420 includes a first side 422 and a second side 424 opposite the first side 422. The first foam component 410 fits within a cavity formed in the second foam component 420, similar to the aspect shown in FIG. 13. The midsole 410 also includes a mesh component 430 which is positioned within the cavity between the first foam component 410 and the second foam component 420.

As also shown in FIG. 14C, the second side 414 of the first foam component 410 and the first side 422 of the second foam component 420 include undulating surfaces. The undulating surface of the second side 414 of the first foam component 410 corresponds with the undulating surface of the first side 422 of the second foam component 420. The pattern of the undulating surface of the second side 414 and the pattern of the undulating surface of first side 422 have an amplitude $A_{12}$ and a wavelength $W_3$. The amplitude $A_{12}$ and the wavelength $W_3$ are examples of dimensional aspects that define the shape and size of the wave pattern of the undulating surfaces of the second side 414 and the first side 422. A larger amplitude $A_{12}$ may lead to an increased compression and/or shear strength of the midsole 400. Similarly, a shorter wavelength $W_3$ may lead to an increased compression and/or shear strength of the midsole 400.

The amplitude $A_{12}$ and the wavelength $W_3$ can remain substantially constant over the forefoot region 16, the midfoot region 18, and the heel region 20. Alternatively, the amplitude $A_{12}$ and/or the wavelength $W_3$ can vary between the forefoot region 16, the midfoot region 18, and the heel region 20. For example, the amplitude $A_4$ may be greater in the heel region 20, less in the midfoot region 18, and still less in the forefoot region 16 as shown in FIG. 14C.

When the midsole 400 is assembled, the second side 414 of the first foam component 410 and the first side 422 of the second foam component 420 can be bonded to each other over certain regions in which they interface with each other. Depending upon the characteristics of the mesh component 430, the second side 414 of the first foam component 410 and the first side 422 of the second foam component 420 can also be bonded to each other through openings or apertures in the mesh component 430. The first foam component 410 and the second foam component 420 may be formed from the same material or materials as the other foam components described herein.

The mesh component 430 may be formed from the same material or materials as the other mesh components described herein. The mesh component 430 can be embodied as either a one-way or a two-way stretch textile. Thus, the extent to which mesh component 430 stretches may be directionally-dependent as described herein. Thus, the type (e.g., one-way or two-way stretch) and orientation of each of mesh component 430 may be selected to increase the compression and/or shear strength of the midsole 430 in the forefoot region 16, the midfoot region 18, and the heel region 20. By selecting a particular type and orientation of the mesh component 430, the compression and/or shear strength of the midsole 430 can be tailored for a particular purpose as described herein. Further, the compression and/or shear strength of the midsole 430 can be increased in one or more of the directions A', B', or C' (see FIG. 2).

In other examples, a number of separate mesh components can be used in place of the mesh component 430. For example, mesh components similar to the mesh components 71-73 shown in FIG. 6A can be positioned at different locations between the first foam component 410 and the second foam component 420. In that case, a first mesh component may be positioned in the forefoot region 16, a second mesh component may be positioned in the midfoot region 18, and a third mesh component may be positioned in the heel region 20. In another example, mesh components similar to the mesh components 74-79 shown in FIG. 6B can be positioned at different locations between the first foam component 410 and the second foam component 420. The mesh components can overlap over certain areas or regions.

When more than one mesh component is relied upon, each of the mesh components can be embodied as a one-way or a two-way stretch textile. In that case, the type (e.g., one-way or two-way stretch) and orientation of each of the mesh components may be selected to increase the compression and/or shear strength of the midsole 400 to a different extent in one of the forefoot region 16, the midfoot region 18, and the heel region 20. By selecting different types and/or orientations of the mesh components (relative to each other), the compression and/or shear strength of the midsole 400 can be varied among the forefoot region 16, the midfoot region 18, and the heel region 20. Further, the compression and/or shear strength in the forefoot region 16 can be increased in one or more of the directions A', B', or C' (see FIG. 2). The compression and/or shear strength in both the midfoot region 18 and the heel region 20 can also be increased, respectively, in one or more of the directions A', B', or C'.

Figure 15A:
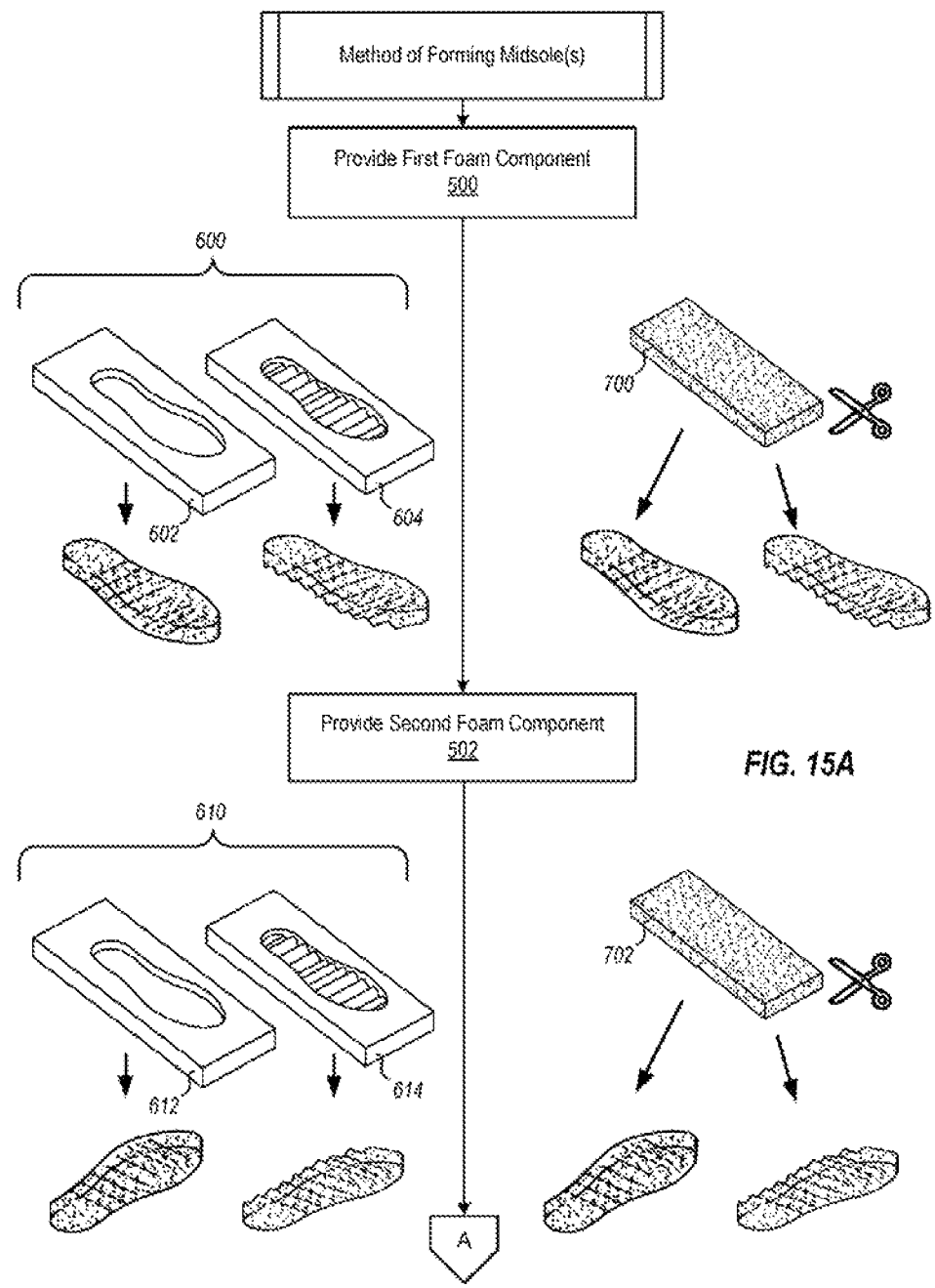
FIGS. 15A-15B illustrate a method of forming midsoles for an article of footwear according to aspects of the present disclosure.
Figure 15B:
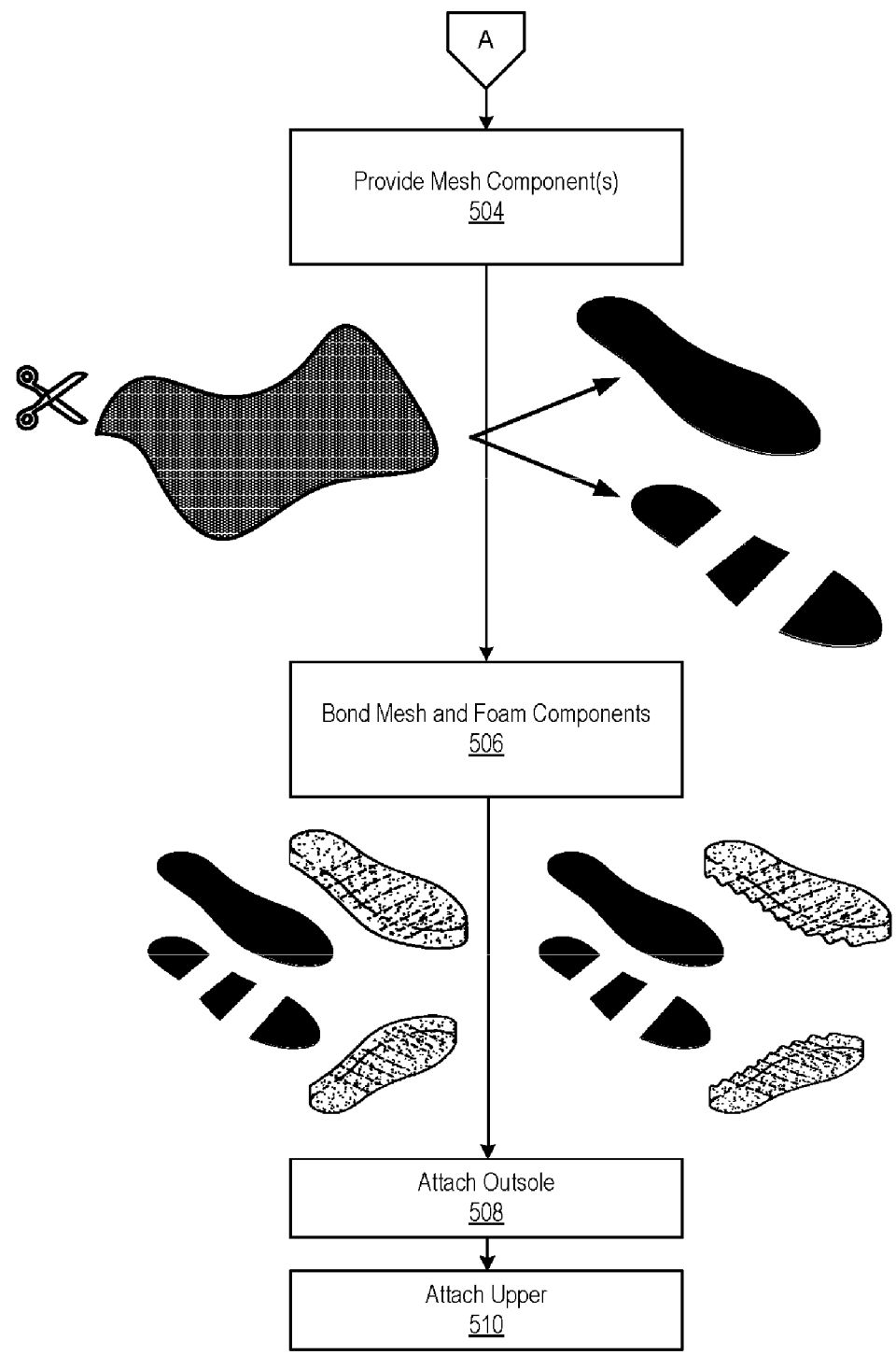

Turning to other aspects, FIGS. 15A-B illustrate a method of forming midsoles for an article of footwear. The process illustrated in FIGS. 15A-B provides an example of a sequence of steps that can be used for forming one or more midsoles similar to the midsoles described above, including the midsoles 40, 100, 200, 300, and 400, among others. The arrangement of the steps shown in FIGS. 15A-B is provided by way of representative example. In other aspects, the order of the steps can differ from that depicted. For example, one or more steps can be omitted. Further, the order of two or more of the steps can be swapped or rearranged relative to the order shown. Also, in some cases, two or more of the steps can be performed concurrently or with partial concurrence. While the method shown in FIG. 15 is described in connection with the midsoles 40, 100, 200, 300, and 400 described above, the method can be used to form other midsoles that vary as compared to the midsoles 40, 100, 200, 300, and At step 500, the method includes providing a first foam component, the first foam component having a first side and a second side opposite the first side. As examples, any of the first foam components 50, 110, 210, 310, and 410, among others, may be provided at step 500, each of which includes first and second opposing sides as described above. The first foam component provided at step 500 may include a surface having one or more undulating regions on at least one side as described herein. Providing this first foam component at step 500 may be achieved in various ways, such as by injection molding the first foam component in a mold 600, by cutting the first foam component from a sheet of foam 700, or by other suitable technique(s). In either case, the first foam component may be formed as a foam composition as described herein.

When provided by injection molding, the first foam component may be provided without any undulating surface regions using a mold 602. The mold 602 does not include undulating surfaces. In that case, the first foam component may be formed without any undulating surface regions, similar to the first foam components 50 and 310 described above. Alternatively, the first foam component can be provided with undulating surface regions, such as one or more regions including sawtooth patterns and/or wave patterns. To do so, step 500 may include injection molding the first foam component using a mold 604 having one or more undulating surface regions. In that case, the first foam component may be formed with one or more undulating surface regions, similar to the first foam components 50, 110, 210, and 410 described above. Thus, step 500 may include forming an undulating region on the second side of the first foam component.

When provided by cutting the first foam component from the sheet of foam 700, the sheet of foam 700 can be cut using a knife, wire, laser, jetted water, or another suitable cutting tool and/or technique. Regardless of the type of cutting tool or technique used, the first foam component may be formed without any undulating surface regions, similar to the first foam components 50 and 310 described above. Alternatively, the first foam component can may be formed with one or more undulating surface regions, similar to the first foam components 50, 110, 210, and 410 described above. Thus, step 500 may include forming undulations in the second side of the first foam component through cutting a sheet of foam using a knife, wire, laser, jetted water, or other cutting tool.

At step 502, the method includes providing a second foam component, the second foam component having a first side and a second side opposite the first side. As examples, any of the second foam components 60, 120, 220, 320, and 420, among others, may be provided at step 502, each of which includes first and second opposing sides as described above. The first foam component provided at step 502 may include a surface having one or more undulating regions on at least one side as described herein. Providing this second foam component at step 502 may be achieved in various ways, such as by injection molding the second foam component in a mold 610, by cutting the second foam component from a sheet of foam 702, or by other suitable technique(s). In either case, the second foam component may be formed as a foam composition as described herein.

When provided by injection molding, the second foam component may be provided without any undulating surface regions using a mold 612 without undulating surfaces. In that case, the second foam component may be formed without any undulating surface regions, similar to the second foam components 60 and 320 described above. Alternatively, the second foam component can be provided with undulating surface regions, such as one or more regions including sawtooth patterns and/or wave patterns. To do so, step 502 may include injection molding the second foam component using a mold 614 having one or more undulating surface regions. In that case, the second foam component may be formed with one or more undulating surface regions, similar to the second foam components 60, 120, 220, and 420 described above. Thus, step 502 may include forming an undulating region on the second side of the first foam component.

When provided by cutting the second foam component from the sheet of foam 702, the sheet of foam 702 can be cut using a knife, a wire, a laser, jetted water, or another suitable cutting tool and/or technique. Regardless of the type of cutting tool or technique used, the second foam component may be formed without any undulating surface regions, similar to the second foam components 60 and 320 described above. Alternatively, the first foam component can may be formed with one or more undulating surface regions, similar to the first foam components 60, 120, 220, and 420 described above. Thus, step 502 may include forming undulations in the first side of the second foam component using a knife, wire, laser, jetted water, or other cutting tool.

Turning to FIG. 15B, at step 504, the method includes providing one or more mesh components. As shown, providing one or more mesh components can including cutting the mesh components from a sheet of mesh textile. Any number, size, and shape of mesh components can be provided at step 504. As described herein, a single mesh component can be provided to extend over various regions of the midsole structure, such as across the forefoot, midfoot, and heel regions and from the medial to the lateral sides of the midsole. In other cases, a number of different mesh components can be provided at step 504. Each of mesh components can extend over a different area in the forefoot, midfoot, and heel regions and/or from the medial to the lateral side of the midsole.

Depending upon the characteristics of the mesh textile, the mesh components may stretch in one direction or in two directions. The mesh components may stretch to the same extent or percentage in each direction or stretch to a first percentage in a first direction and to a second, different percentage in a second direction. The mesh components may be knitted, crocheted, braided, or woven with one or more yarns, each formed from one or more individual fibers. The mesh textile may be knitted, crocheted, braided, or formed through any other suitable process or technique. The mesh textile may also be formed with one or more yarns formed of one or more individual fibers.

At step 506, the method includes bonding the foam components provided at steps 500 and 502 together with the one or more of the mesh components provided at step 504. The sequence of the bonding at step 506 can occur in a number of different ways but generally results in bonding the mesh components provided at step 504, a second side of the first foam component provided at step 500, and a first side of the second foam component provided at step 502 to each other. After the bonding at step 506, the result is that a first side of a first foam component forms a first side of a resulting sole structure, a second side of a second foam component forms a second side of the sole structure opposing the first side of the sole structure, and mesh components are positioned and bonded between the second side of the first foam component and the first side of the second foam component as described herein.

In one example case, the bonding at step 506 includes applying an adhesive to the one or more mesh components provided at step 504 and adhering the mesh components to the second side of the first foam component provided at step 500. Here, any number, size, and shape of mesh components can be adhered to the second side of the first foam component. For example, a single mesh component can be adhered to the second side of the first foam component, to extend over the forefoot, midfoot, and heel regions and/or from the medial to the lateral sides of the midsole. In another example, a number of different mesh components can be adhered to the second side of the first foam component at step 506. Each of mesh components in that case can extend over a different area in the forefoot, midfoot, and heel regions and/or from the medial to the lateral side of the first foam component. In some cases, the mesh components can overlap each other in certain regions or areas similar to the ways shown in FIGS. 6B, 9B, and 12B. The bonding at step 506 further includes adhering the second side of the first foam component, with the mesh components, to the first side of the second foam component provided at step 502.

As another example, the bonding at step 506 may include applying an adhesive to the one or more mesh components provided at step 504 and adhering the mesh components to the first side of the second foam component provided at step 502. A single mesh component can be adhered to the first side of the second foam component, to extend over the forefoot, midfoot, and heel regions and/or from the medial to the lateral sides of the midsole. In another example, a number of different mesh components can be adhered to the first side of the second foam component at step 506. Each of mesh components in that case can extend over a different area in the forefoot, midfoot, and heel regions and/or from the medial to the lateral side of the second foam component. In some cases, the mesh components can overlap each other in certain regions or areas similar to the ways shown in FIGS. 6B, 9B, and 12B. The bonding at step 506 further includes adhering the first side of the second foam component, with the mesh components, to the second side of the first foam component provided at step 500.

Rather than (or in addition to) using adhesives, the bonding at step 506 can be performed using a mold. For example, the bonding at step 506 may include placing the first foam component provided at step 500 and the one or more mesh components provided at step 504 into a mold with the second side of the first foam component contacting the mesh components. Once in the mold, the bonding at step 506 may include compression molding the first foam component and the mesh components together, possibly with the use of heat, thereby bonding the one or more mesh components to the second side of the first foam component. After the mesh components are bonded to the second side of the first foam component, the first side of the second foam component can be bonded to the second side of the first foam component using adhesives and/or an additional step of compression molding.

As another alternative, the bonding at step 506 may include placing the second foam component provided at step 502 and the one or more mesh components provided at step 504 into a mold with the first side of the second foam component contacting the mesh components. Once in the mold, the bonding at step 506 may include compression molding the second foam component and the mesh components together, thereby bonding the one or more mesh components to the first side of the second foam component. After the mesh components are bonded to the first side of the second foam component, the second side of the first foam component can be bonded to the first side of the second foam component using adhesives and/or an additional step of compression molding.

As still another alternative, the bonding at step 506 may include placing the first foam component provided at step 500, the one or more mesh components provided at step 504, and the second foam component provided at step 502 into a mold with the second side of the first foam component and the first side of the second component contacting the mesh component. Then, the bonding can include compression molding the first foam component, the mesh component, and the second foam component together such that the mesh components are positioned and bonded between the second side of the first foam component and the first side of the second foam component.

After step 506 is finished, a midsole for use in an article of footwear is constructed. Once the midsole is constructed, the method may include the additional step of attaching an outsole to the midsole at step 508. An outsole, similar to the outsole 30 shown in FIGS. 2 and 3, can be attached to the midsole using an adhesive, for example, or another suitable technique. Additionally, the method may include attaching an upper to the midsole structure at step 510, thereby forming the article of footwear. The upper may be similar to the upper 12 shown in FIG. 1, for example, although any suitable upper can be attached to the midsole.

Figure 16B:
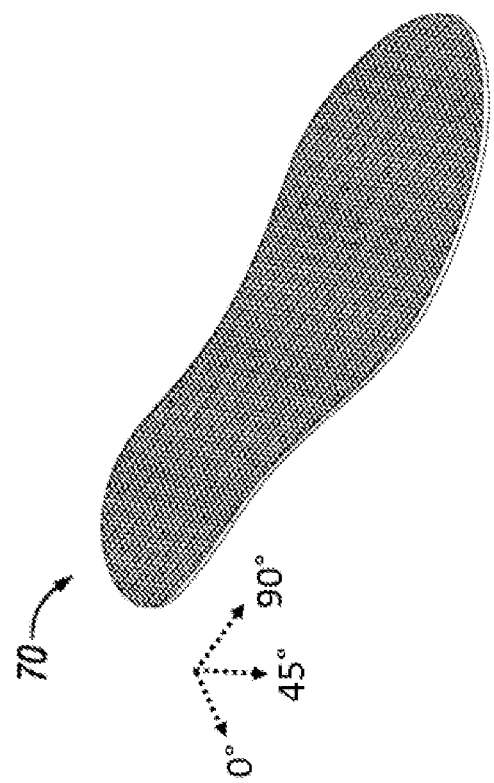
FIGS. 16A-16B illustrate test angles for a mesh component.
Figure 16A:
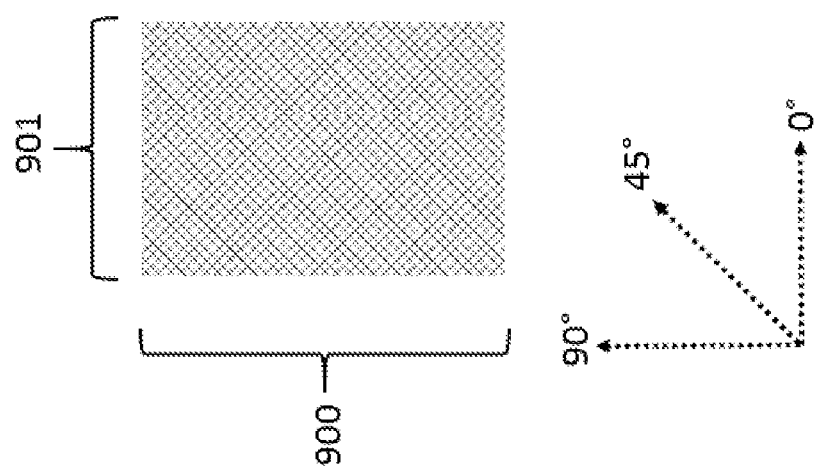

As discussed herein, the mesh component 70 can be associated with certain characteristics, e.g., tensile strength and/or elongation. The associated characteristic, e.g., tensile strength and/or elongation, can be determined using standard test methods on a shear testing apparatus capable of providing stress/strain curves in both tension and compression modes, e.g., an Instron 8501 testing machine. The tensile strength and/or elongation can be determined along an axis corresponding to a specified angle as shown in FIG. 16A, e.g., an axis at 0°, 45°, and 90° with respect to an axis that is perpendicular to the width dimension of a test sample. These are referred to herein as a 0°, 45°, and 90° axis. The test sample has a length dimension 900 of 75 millimeter and a width dimension 901 of 25.4 millimeter. The relative orientation of the test angles of a test sample in FIG. 16A to a mesh component 70 are shown in FIG. 16B.

Elongation can be expressed as percent elongation. Percent elongation represents the amount a material, such as a test sample corresponding to a mesh component 70, can be stretched along an axis, such as a 0°, 45°, and 90° axis before rupturing. Percent elongation is given by the following equation:

$$\text{Percent Elongation} = 100(LR - L0)/L0.$$

Here, LR represents the length of the material at the moment it has ruptured, while L0 represents the initial length of the material. These measurements are preferably taken with respect a central axis.

Methods of Manufacturing a Foam Component.

In some examples, the disclosed foam components can be prepared by various methods as disclosed herein and as known in the art. Accordingly, a foam component comprising a disclosed polymeric material can be formed by molding the polymer material, e.g., compression molding or injection molding, to a desired shape as known to the skilled artisan. The foam component can be foamed during or after the molding process.

For example, a foam component can be prepared by injection molding a melt of a polymeric material described herein using a physical blowing agent and/or chemical blowing agent using a suitable extruder. An extruder (e.g., single or twin screw) can be used to provide a composition. The extruder can have a motor to turn a screw inside the extruder. The extruder may be a single screw or twin screws made of individual elements of various sizes and pitches appropriate for mixing or kneading the specific materials used. In some examples, the extruder has a twin screw.

The disclosed polymeric materials, and optionally additives, as described herein can be added into the extruder through one or more port. The various components can be added as a melt or as appropriately-sized solid particles, for example chips or pellets, that are melted in section as they are mixed in the barrel of the extruder. The contents of the extruder can be heated to melt the composition. A supercritical fluid can be added into the melt as a physical blowing agent. In particular examples, the foam components can be prepared by using a physical blowing agent which foams the composition after it exits the extruder, and the thermoplastic copolyester elastomer foam is thus substantially free of a chemical blowing agent or decomposition product thereof.

In some examples, the disclosed polymeric materials can be added as a melt at a temperature close to or at a temperature that causes ionic crosslinks between polymer chains to dissociate. At lower temperatures the ionic moieties can reform or reassociate. Due to the ionic crosslinking, the extent to which the compositions are crosslinked during processing can be controlled by controlling the temperature; by causing a temperature reduction at a desired point to increase crosslinking, which results in an increase in the modulus or viscosity of the molten resin as the ionic moieties reassociate.

If a chemical blowing agent is used, the processing (melting) temperature used can be sufficiently below the temperature that would trigger the blowing agent. In order to foam polymeric materials, the temperature near the exit of the extruder can be increased to a temperature close to or at the triggering temperature of a chemical blowing agent, thereby producing a chemically foamed polymeric material foam as the composition exits the extruder (e.g., as the composition is injected into an injection mold).

Alternatively or in addition, a physical blowing agent can be used to form a physically foamed foam component, or a physically and chemically foamed polymeric foam component. For example, a supercritical fluid such as supercritical carbon dioxide or supercritical nitrogen can be mixed with the molten polymeric material in the barrel of the extruder. As the mixture of the molten polymeric material comprising one or more polymeric materials and a supercritical fluid exits the extruder, the pressure drop between the higher pressure in the extruder and the lower pressure outside the extruder causes the supercritical fluid to transition to the gas phase and foam the molten polymeric composition.

Nonlimiting examples of suitable compounds that can be used as the supercritical fluid include carbon dioxide (critical temperature 31.1 degrees Celsius, critical pressure 7.38 MPa), nitrous oxide (critical temperature 36.5 degrees Celsius, critical pressure 7.24 MPa), ethane (critical temperature 32.3 degrees Celsius, critical pressure 4.88 MPa), ethylene (critical temperature 9.3 degrees Celsius, critical pressure 5.12 MPa), nitrogen (critical temperature −147 degrees Celsius, critical pressure 3.39 MPa), and oxygen (critical temperature −118.6 degrees Celsius, critical pressure 5.08 MPa).

Carbon dioxide is often used as a supercritical fluid in different processes. The supercritical carbon dioxide fluid can be made more compatible with the polar thermoplastic elastomers (particularly thermoplastic polyurethane, polyurea, and polyamide elastomers) by mixing it with a polar fluid such as methanol, ethanol, propanol, or isopropanol. The polar fluid that is used should have a Hildebrand solubility parameter equal to or greater than 9 $\text{MPa}^{-1/2}$. Increasing the weight fraction of the polar fluid increases the amount of carbon dioxide uptake, but the polar fluid is also taken up, and at some point there is a shift from a maximum amount of uptake of the supercritical carbon dioxide to an increasing amount of the non-foaming agent polar fluid being taken up by the thermoplastic elastomer article. In certain aspects, from about 0.1 mole percent to about 7 mole percent of the polar fluid is included in the supercritical fluid, based on total fluid, especially when used to infuse a polyurethane elastomer, polyurea elastomer, or a polyamide elastomer.

Supercritical fluids may be used in combination. In some cases, supercritical nitrogen may be used as a nucleating agent in a small weight percentage along with supercritical carbon dioxide or another supercritical fluid that acts as the blowing agent. Nano-sized particles such as nano clays, carbon black, crystalline, immiscible polymers, and inorganic crystals such as salts can be included as nucleating agents.

In various aspects, methods of manufacturing a foam component include injection molding a polymeric material described herein to produce a foam component. The injection molding can use a screw-type injector that allows for maintaining and controlling the pressure in the injector barrel. The injection molding machine can allow metering and delivering a supercritical fluid such as carbon dioxide or nitrogen into the composition prior to injection. The supercritical fluid can be mixed into the composition within the injection barrel and then injected into the mold. The supercritical fluid can then expand to create cell nuclei to form the physical foam within the mold. The injection molding can include physical foaming of the compositions described herein using a microcellular foam injection molding process, such as, for example the MuCell process (Trexcel Inc., Royal Oak. Michigan, USA).

In some examples, the foam components of the various examples described herein are made using a process that involves impregnating a foam component (e.g., at or above a softening temperature of the composition) with a physical blowing agent at a first concentration or first pressure. As used herein, the term "impregnating" generally means dissolving or suspending a physical blowing agent in a polymeric material. The impregnated polymeric material can then be foamed, or can be cooled (when applicable) and re-softened (when applicable) for blowing at a later time.

In some instances, the impregnated polymeric material is foamed by reducing the solubility of the physical blowing agent in the polymer matrix through pressure or temperature changes. The reduction in solubility of the physical blowing agent can release additional amounts (e.g., to create a secondary expansion of an originally-formed microcell in the composition) of the impregnated physical blowing agent from the composition, to further blow the composition, forming a foam component (e.g., a foam component having a microcellular structure).

A foam component can be foamed after the molding process by a method comprising infusion of a molded component, preferably to saturation, with a supercritical fluid. For example, a component can be placed in a vessel that can withstand high pressure. The vessel is closed and a foaming agent, e.g., carbon dioxide, nitrogen, mixtures of carbon dioxide and nitrogen, or other type of foaming agent is introduced. The vessel temperature and pressure are maintained above the critical temperature and pressure of the foaming agent. Once the component is saturated with the foaming agent, the vessel is rapidly depressurized (the depressurizing process can last up to a minute or so). The component is then removed from the vessel and heated to produce the foam component. When a co-solvent is used, it can be introduced along with the foaming agent, e.g., carbon dioxide, nitrogen, mixtures of carbon dioxide and nitrogen, or other type of foaming agent, to the vessel with the component before the vessel is closed. The component can be soaked in the supercritical fluid under conditions—temperature and pressure—and for a time to allow it to take up a desired amount of the supercritical fluid.

In various aspects, the component can be soaked under conditions that result in it becoming saturated with the supercritical fluid. The component is then removed from the chamber and immediately either heated to a temperature in a medium with suitable thermal characteristics for foaming to occur or is exposed to microwaves or infrared radiation in a tunnel or oven to cause the foaming to occur. In microwave heating, the material is exposed to an electromagnetic wave that causes the molecules in the material to oscillate, thereby generating heat. The system can be designed to work in batch or continuous process. In a batch process, the component saturated with the supercritical fluid is placed in a microwave oven or a device equipped with an IR lamp or IR lamps. Preferably the component is rotated or agitated, when their size is small enough, to ensure fast and uniform heating. When foaming is completed, the articles are removed from the system. The heating can also be done in the continuous process. The component can be placed on a planar surface such as a belt that moves them through a tunnel or through a pipe. The system is designed so that the heating elements (IR lamp or microwave generator) can apply power to achieve rapid uniform heating. The time of heating is controlled by the speed by which the components move through the tunnel or pipe.

Water is one suitable medium in which foaming readily occurs at an appropriate temperature because water has a high heat capacity and heat transfer rate. In certain preferred aspects, the thermoplastic elastomer article infused or saturated with supercritical fluid is submerged in water that is at a temperature at least about 80 degrees Celsius higher and, preferably, at least about 100 degrees Celsius higher than the elastomer's (soft segment) glass transition temperature but less than the elastomer's (hard segment) melting temperature. Other suitable mediums are steam or pressurized hot air.

Time, temperature, and pressure in the step of solvating the component with the supercritical fluid and the depressurization rate, temperature, and medium in the foaming step all affect the degree of foaming achieved. In general, a thicker article must be kept in the supercritical fluid for a longer time to become saturated with the supercritical fluid.

The foam component may be annealed at an elevated temperature after the foaming process. While not wishing to be bound by theory, it is believed that annealing the article may allow phase segregation of the elastomers that are placed under strain, e.g. the mold, and stress, a partial pressure external to moderate internal pressure equilibration just after rapid foaming. Cooling under balanced forces allow the increased modulus to maintain shape once at room temperature and atmospheric pressure.

The foam component may be annealed at a temperature from above ambient to just below the $T_m$ of the thermoplastic elastomer (which may be determine by the usual appropriate thermal methods, of which differential scanning calorimetry (DSC) may be mentioned) for a time sufficient to stabilize the foam.

In addition to injection molding, the foam components of the present disclosure can be foamed and molded using various processes known in the art. For example, the polymeric material foam can be formed into slab foam, filament or strand foams, particulate (e.g., bead) foams of various shapes and sizes, etc. These various forms of foam components can then be used in different ways. For example, like injection molded foam, slab foam and filament or strand foam can be used directly as a finished foam article, or can be shaped (e.g., cut, buffed, or trimmed) to form a finished foam article, or can be compression molded to form a finished foam article. Optionally, the foam component can be subjected to annealing processes as part of forming the finished foam article. Pellets of the polymeric materials can be used to form individual particulate foams, or can be foamed and molded to form unitary molded foam articles composed of individual portions of foam affixed to each other.

The foam components of the various examples described herein may be further shaped or molded by any of the methods known for forming articles from thermoplastic materials. Optionally, the foam components of the present disclosure which have been foamed using any suitable blowing process (e.g., blowing using a physical and/or chemical blowing agent), including by injection molding using only a physical blowing agent, can then be compression molded to form a compression molded foam.

In some examples, the foam components of the present disclosure can be prepared by a process comprising (i) softening a polymeric material (e.g., by heating at a first temperature at or above a softening temperature of the composition); (ii) simultaneously or sequentially with the softening (when applicable), contacting the polymeric material with a first concentration or first pressure of a physical blowing agent sufficient to drive an amount of the physical blowing agent into the composition or combine the physical blowing agent with the composition; (iii) changing the concentration or pressure (e.g., decreasing the pressure or concentration) of the physical blowing agent to a second concentration or second pressure that is effective to foam the composition, thereby forming a foam component (e.g., a polymeric material foam having a microcellular structure); and, (iv) following the changing, cooling (when applicable) the foam components (e.g., cooling to a temperature below the softening temperature of the composition), to form a solidified thermoplastic foam component.

In other examples, the foam components of the present disclosure is prepared by (i) contacting (e.g., dissolving or suspending) the composition with a first concentration of a chemical blowing agent, in some examples, at or above a softening temperature of the composition (ii) triggering the chemical blowing agent to foam the polymeric material, thereby forming a foam component (e.g., a foam component having a microcellular structure); and, (iii) following the triggering, in some examples, cooling the foam component to, e.g., a temperature below its softening temperature, to form a solidified thermoplastic copolyester elastomer foam. In some examples, the "triggering" of the chemical blowing agent is performed by any suitable method, including heating the composition comprising a concentration of the chemical blowing agent to a temperature sufficient to "trigger" the chemical blowing agent, wherein the concentration of the chemical blowing agent is effective to foam the composition, thereby forming a foam component (e.g., a foam component having a microcellular structure). In some examples, the contacting comprises contacting at a pressure of from about 10 MPa to about 100 MPa (e.g., from about 30 MPa to about 100 MPa, about 20 MPa to about 80 MPa, about 30 MPa to about 60 MPa or about 40 MPa to about 70 MPa).

Chemical foaming agents may be endothermic or exothermic, which refers to a type of decomposition they undergo to produce the gas for foaming. The decomposition may be a result of thermal energy in the system. Endothermic foaming agents absorb energy and typically release a gas, such as carbon dioxide, upon decomposition. Exothermic foaming agents release energy and generate a gas, such as nitrogen, when decomposed. Regardless of the chemical foaming agent used, thermal variables of the polymer composition being molded and thermal variables of the foaming agent to be decomposed are coupled together such that process parameters are selected so that the polymer can be molded and the foaming agent can decompose at an appropriate phase of the molding operation.

Polymeric Materials.

In various aspects, the polymeric material can include one or more polymers, such as a polyurethane, polyurea, polyamide, polyester, metallocene-catalyzed block copolymer of ethylene and α-olefins having 4 to about 8 carbon atoms, styrene block copolymers such as poly(styrene-butadiene-styrene), poly(styrene-ethylene-co-butylene-styrene), and poly(styrene-isoprene-styrene), and combinations thereof.

In a further aspect, the polymeric material can include one or more polyesters. In aspects, the polymer can comprise a polyester. The polyester can be formed by reaction of one or more carboxylic acids, or its ester-forming derivatives, with one or more bivalent or multivalent aliphatic, alicyclic, aromatic or araliphatic alcohols or a bisphenol. The polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

In various aspects, the polymeric material can include one or more polymers, such as a polyurethane, polyurea, polyamide, polyester, metallocene-catalyzed block copolymer of ethylene and α-olefins having 4 to about 8 carbon atoms, styrene block copolymers such as poly(styrene-butadiene-styrene), poly(styrene-ethylene-co-butylene-styrene), and poly(styrene-isoprene-styrene), and combinations thereof.

Exemplary carboxylic acids that that can be used to prepare a polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitro-terephthalic acid, 4,4'-diphenyl ether dicarboxylic acid, 4,4'-diphenyl thioether dicarboxylic acid, 4,4'-diphenyl sulfonedicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

In some aspects, the polyester is a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The polyester can be a co-polyester (i.e., a co-polymer including polyester segments and non-polyester segments).

The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the polyester can be a block co-polyester having repeating blocks of polymeric units of the same chemical structure (segments) which are relatively harder (hard segments), and repeating blocks of polymeric segments which are relatively softer (soft segments). In block co-polyesters, including block co-polyesters having repeating hard segments and soft segments, physical crosslinks can be present within the blocks or between the blocks or both within and between the blocks. In a particular example, the material can comprise or consist essentially of an elastomeric co-polyester having repeating blocks of hard segments and repeating blocks of soft segments.

The non-polyester segments of the co-polyester can comprise or consist of polyether segments, polyamide segments, or both polyether segments and polyamide segments. The co-polyester can be a block co-polyester, or can be a random co-polyester. The copolyester can be formed from the polycondensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1-3 propanediol. Examples of co-polyesters include polyethelene adipate, polybutylene succinate, poly(3-hydroxybutyrate-co-3-hydroxyvalerate), polyethylene terephthalate, polybutylene terephthalate, polytrimethylene terephthalate, polyethylene napthalate, and combinations thereof. In a particular example, the co-polyamide can comprise or consist of polyethylene terephthalate.

In some aspects, the polyester is a block copolymer comprising segments of one or more of polybutylene terephthalate (PBT), a polytrimethylene terephthalate, a polyhexamethylene terephthalate, a poly-1,4-dimethylcyclohexane terephthalate, polyethylene terephthalate (PET), a polyethylene isophthalate (PEI), a polyarylate (PAR), a polybutylene naphthalate (PBN), and a liquid crystal polyester. For example, a suitable polyester that is a block copolymer can be a PET/PEI copolymer, a polybutylene terephthalate/tetraethylene glycol copolymer, a polyoxyalkylenediimide diacid/polybutylene terephthalate copolymer, or a blend or mixture of any of the foregoing.

In some aspects, the polyester is a biodegradable resin, for example, a copolymerized polyester in which poly($\alpha$-hydroxy acid) such as polyglycolic acid or polylactic acid is contained as principal repeating units.

The disclosed polyesters can be prepared by a variety of polycondensation methods known to the skilled artisan, such as a solvent polymerization or a melt polymerization process.

In various aspects, the polymeric material of the present disclosure can include one or more thermoplastic copolyester elastomers. The thermoplastic copolyester elastomers can include chain units derived from one or more olefins and chain units derived from one or more ethylenically-unsaturated acid groups. The polymeric materials can also include a plurality of cations ionically crosslink anionic form of the acid groups in the thermoplastic copolyester elastomers. The thermoplastic copolyester elastomers can have a melt flow index of about 30 or less, about 20 or less, about 15 or less, about 10 or less, or about 5 or less.

A variety of thermoplastic copolyester elastomers can be processed as described herein to have a foam structure. In some aspects, the thermoplastic copolyester elastomers are terpolymers of ethylene, acrylic acid, and methyl acrylate or butyl acrylate. In some aspects, a ratio III of a total parts by weight of the acrylic acid in the thermoplastic copolyester elastomers to a total weight of the thermoplastic copolyester elastomers is about 0.05 to about 0.6, about 0.1 to about 0.6, about 0.1 to about 0.5, about 0.15 to about 0.5, or about 0.2 to about 0.5.

The polymeric materials provided herein can include a thermoplastic copolyester elastomer comprising: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. In various aspects, the thermoplastic copolyester elastomer is a block copolymer. In some aspects, the thermoplastic copolyester elastomer is a segmented copolymer. In further aspects, the thermoplastic copolyester elastomer is a random copolymer. In still further aspects, the thermoplastic copolyester elastomer is a condensation copolymer.

In a further aspect, the thermoplastic copolyester elastomer can have a weight average molecular weight of about 50,000 Daltons to about 1,000,000 Daltons; about 50,000 Daltons to about 500,000 Daltons; about 75,000 Daltons to about 300,000 Daltons; about 100,000 Daltons to about 200,000 Daltons; or a value or values of weight average molecular weight within any of the foregoing ranges or a weight average molecular weight range encompassing any sub-range of the foregoing ranges.

In a further aspect, the thermoplastic copolyester elastomer can have a ratio of first segments to third segments from about 1:1 to about 1:5 based on the weight of each of the first segments and the third segments; about 1:1 to about 1:3 based on the weight of each of the first segments and the third segments; about 1:1 to about 1:2 based on the weight of each of the first segments and the third segments; about 1:1 to about 1:3 based on the weight of each of the first segments and the third segments; or a value or values of have a ratio of first segments to third segments within any of the foregoing ranges or a have a range of ratio of first segments to third segments encompassing any sub-range of the foregoing ranges.

In a further aspect, the thermoplastic copolyester elastomer can a ratio of second segments to third segments from about 1:1 to about 1:2 based on the weight of each of the first segments and the third segments; about 1:1 to about 1:1.52 based on the weight of each of the first segments and the third segment; or a value or values of have a ratio of second segments to third segments within any of the foregoing ranges or a have a range of ratio of second segments to third segments encompassing any sub-range of the foregoing ranges.

In a further aspect, the thermoplastic copolyester elastomer can have first segments derived from a poly(alkylene oxide)diol having a number-average molecular weight of about 250 Daltons to about 6000 Daltons; about 400 Daltons to about 6,000 Daltons; about 350 Daltons to about 5,000 Daltons; about 500 Daltons to about 3,000 Daltons; or a value or values of weight average molecular weight within any of the foregoing ranges or a weight average molecular weight range encompassing any sub-range of the foregoing ranges.

In a further aspect, the thermoplastic copolyester elastomer can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol; poly(heptamethylene ether)diol; poly(octamethylene ether)diol; poly(nonamethylene ether)diol; poly(decamethylene ether)diol; or mixtures thereof. In a still further aspect, the thermoplastic copolyester elastomer can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol. In a yet further aspect, the thermoplastic copolyester elastomer can have first segments derived from a poly(tetramethylene ether)diol.

In a further aspect, the thermoplastic copolyester elastomer can have second segments derived from a diol having a molecular weight of less than about 250. The diol from which the second segments are derived can be a C2-C8 diol. In a still further aspect, the second segments can be derived from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof. In a yet further aspect, the second segments can be derived from 1,2-ethanediol, 1,3-propanediol, 1,4-butanediol, 1,6-hexanediol, and mixtures thereof. In an even further aspect, the second segments can be derived from 1,2-ethanediol. In a still further aspect, the second segments can be derived from 1,4-butanediol.

In a further aspect, the thermoplastic copolyester elastomer can have third segments derived from an aromatic C5-C16 dicarboxylic acid. The aromatic C5-C16 dicarboxylic acid can have a molecular weight less than about 300 Daltons; about 120 Daltons to about 200 Daltons; or a value or values of molecular weight within any of the foregoing ranges or a molecular weight range encompassing any sub-range of the foregoing ranges. In some instances, the aromatic C5-C16 dicarboxylic acid is terephthalic acid, phthalic acid, isophthalic acid, or a derivative thereof. In a still further aspect, the aromatic C5-C16 dicarboxylic acid is a diester derivative of the terephthalic acid, phthalic acid, or isophthalic acid. In a yet further aspect, the aromatic C5-C16 dicarboxylic acid is terephthalic acid or the dimethyl ester derivative thereof.

In a further aspect, the a thermoplastic copolyester elastomer comprises: (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

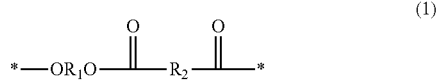

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein The second copolyester unit has a structure represented by a formula 2:

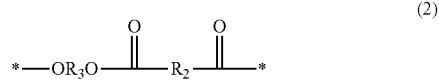

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

In a further aspect, the thermoplastic copolyester elastomer comprises a plurality of first copolyester units having a structure represented by a formula 3:

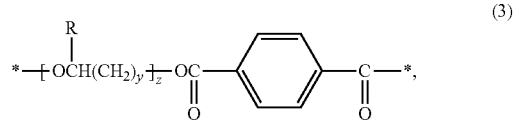

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

In a further aspect, the thermoplastic copolyester elastomer comprises a plurality of first copolyester units having a structure represented by a formula 4:

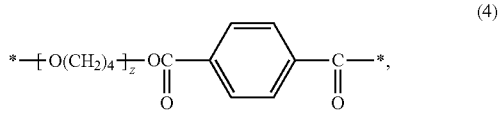

wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any integer value or set of integer values within the foregoing ranges or values, or any range of integer values encompassing a sub-range the foregoing integer value ranges.

In a further aspect, the thermoplastic copolyester elastomer comprises a plurality of first copolyester units having a weight average molecular weight from about 400 Daltons to about 6,000 Daltons; about 400 Daltons to about 5,000 Daltons; about 400 Daltons to about 4,000 Daltons; about 400 Daltons to about 3,000 Daltons; about 500 Daltons to about 6,000 Daltons; about 500 Daltons to about 5,000 Daltons; about 500 Daltons to about 4,000 Daltons; about 500 Daltons to about 3,000 Daltons; about 600 Daltons to about 6,000 Daltons; about 600 Daltons to about 5,000 Daltons; about 600 Daltons to about 4,000 Daltons; about 600 Daltons to about 3,000 Daltons; or a value or values of weight average molecular weight within any of the foregoing ranges or a weight average molecular weight range encompassing any sub-range of the foregoing ranges.

In a further aspect, the thermoplastic copolyester elastomer comprises a plurality of second copolyester units, each second copolyester unit of the plurality having represented by a formula 5:

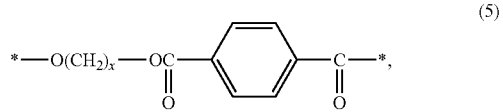

(5)

wherein x is an integer having a value from 1 to 20; wherein the foam article has a microcellular microcellular foam structure. In some aspects, in the foregoing formula, x is an integer having a value from 2 to 18; 2 to 17; 2 to 16; 2 to 15; 2 to 14; 2 to 13; 2 to 12; 2 to 11; 2 to 10; 2 to 9; 2 to 8; 2 to 7; 2 to 6; 2 to 5; 2 to 4; or x can be any integer value or set of integer values within the foregoing ranges or values, or any range of integer values encompassing a sub-range the foregoing integer value ranges. In a further aspect, x is an integer having a value of 2, 3, or 4.

In a further aspect, the thermoplastic copolyester elastomer comprises a plurality of second copolyester units, each second copolyester unit of the plurality having represented by a formula 6:

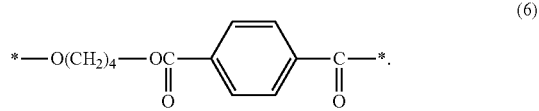

(6)

In a further aspect, the thermoplastic copolyester elastomer comprises a weight percent range of the plurality of first copolyester units based on total weight of the thermoplastic copolyester elastomer such that the weight percent range is about 30 weight percent to about 80 weight percent; about 40 weight percent to about 80 weight percent; about 50 weight percent to about 80 weight percent; about 30 weight percent to about 70 weight percent; about 40 weight percent to about 70 weight percent; about 50 weight percent to about 70 weight percent; about 40 weight percent to about 65 weight percent; about 45 weight percent to about 65 weight percent; about 50 weight percent to about 65 wt; about 55 weight percent to about 65 weight percent; about 40 weight percent to about 60 weight percent; about 45 weight percent to about 60 weight percent; about 50 weight percent to about 60 weight percent; about 55 weight percent to about 60 weight percent; or any weight percent value or set of weight percent values within any of the foregoing ranges of weight percent, or any range of weight percent values encompassing a sub-set of any of the foregoing ranges.

In various aspects, the thermoplastic copolyester elastomer comprises about 30 weight percent to about 80 weight percent of the plurality of first copolyester units based on total weight of the thermoplastic copolyester elastomer; or in alternative aspects, about 40 weight percent to about 65 weight percent of the plurality of second copolyester units based on total weight of the thermoplastic copolyester elastomer.

In a further aspect, the thermoplastic copolyester elastomer can have a maximum load, when determined using a cyclic tensile test as described herein, of about 10 N to about 100 N; about 15 N to about 50 N; about 20 N to about 40 N; or any load value or set of load values within any of the foregoing ranges of load value, or any range of load values encompassing a sub-set of any of the foregoing ranges.

In a further aspect, the thermoplastic copolyester elastomer can have an energy efficiency, when determined using a cyclic tensile test as described herein, of greater than or equal to about 50 percent; of greater than or equal to about 60 percent; greater than or equal to about 70 percent; of about 50 percent to about 90 percent; of about 60 percent to about 90 percent; of about 70 percent to about 90 percent; or any energy efficiency value or set of energy efficiency values within any of the foregoing ranges of energy efficiency, or any range of energy efficiency values encompassing a sub-set of any of the foregoing ranges.

In a further aspect, the thermoplastic copolyester elastomer can have an energy return, when determined using a cyclic tensile test as described herein, of about 1 J to 15 J; about 2 J to 12 J; about 4 J to 10 J; or any energy return value or set of energy return values within any of the foregoing ranges of energy return, or any range of energy return values encompassing a sub-set of any of the foregoing ranges.

In a further aspect, the thermoplastic copolyester elastomer can have tensile modulus, when determined using a cyclic tensile test as described herein, of about 1 MPa to 15 MPa; about 300 kPa to 3 MPa; about 500 kPa to about 2 MPa; and about 100 MPa to about 10 MPa; or any tensile modulus value or set of tensile modulus values within any of the foregoing ranges of tensile modulus, or any range of tensile modulus values encompassing a sub-set of any of the foregoing ranges.

In a further aspect, the thermoplastic copolyester elastomer can have a zero-shear viscosity value that can be determined as described herein below. Briefly, viscosity measurements can be collected on a suitable rheometer, e.g., a TA instruments DHR-3 Rheometer using flat parallel plates. Typically, samples of 25 mm circular cross are and circle roughly 2 mm thick are die cut from a solid injection molded plaque. The samples were dried before placing in the rheometer. All samples are equilibrated at 180° C. for 2-5 minutes and trimmed to obtain a final gap of <1 mm. A flow sweep experiment with shear rates from 0.01 to 100 s$^{-1}$ is conducted. The data are fit with Carreau, Carreau-Yasuda, and Williamson models and the best-fit is selected to record the zero-shear viscosity value. Polymer melt flow curve was determined at a temperature 20° C. greater than the melting point as determined by DSC as described herein above. In various aspects, the thermoplastic copolyester elastomer can have a zero-shear viscosity value of about 10 to about 10,000 Pa·s; about 100 to about 7,000 Pa·s; and about 1,000 to about 5,000 Pa·s.

In some aspects, the thermoplastic copolyester elastomer can comprise phase separated domains. For example, the plurality of first segments derived from a dihydroxy-terminated polydiol can phase-separate into domains comprising primarily the first segments. Moreover, the plurality of second segments derived from a diol can phase-separate into domains comprising primarily the second segments. In other aspects, the thermoplastic copolyester elastomer can comprise phase-separated domains comprising primarily of a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

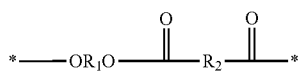

(1)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and other phase-separated domains comprising primarily of a plurality of second copolyester units, each second copolyester unit of the plurality comprising the second segment derived from a diol and the third segment derived from an aromatic dicarboxylic acid, wherein The second copolyester unit has a structure represented by a formula 2:

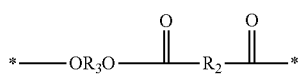

(2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment. In still other aspects, the thermoplastic copolyester elastomer can comprise phase-separated domains comprising primarily of a plurality of first copolyester units, each first copolyester unit of the plurality having a structure represented by a formula 4:

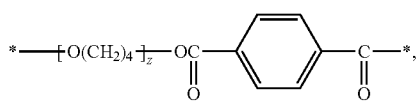

(4)

wherein z is an integer having a value from 2 to 60; and wherein a weight average molecular weight of each of the plurality of first copolyester units is from about 300 Daltons to about 7,000 Daltons; and other phase-separated domains comprising primarily of a plurality of second copolyester units, each second copolyester unit of the plurality having represented by a formula 5:

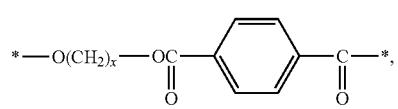

(5)

wherein x is an integer having a value from 1 to 20.

Exemplary, but non-limiting, thermoplastic polyester elastomers, including thermoplastic copolyester elastomers, that can be used in the disclosed methods, foams, and articles include Hytrel® 3078, Hytrel® 4068, and Hytrel® 4556 (DuPont, Wilmington, Delaware, USA); Pelprene™ P30B, P40B, and P40H (Toyobo U.S.A. Inc., New York, New York, USA); TRIEL® 5300, TRIEL® 5400, and blends thereof (Samyang Corporation, Korea); Keyflex BT1028D, BT1033D, BT1035D, BT1040D, BT1045D, and BT1047D (LG Chem, Korea); and KOPEL® KP3340, KP3346, KP3347, KP3942 (Kolon Plastics, Inc., Korea).

In some aspects, the disclosed foamed polymeric materials can further include one or more ionomers, such as any of the Surlyn® polymers (DuPont, Wilmington, Delaware, USA). Ionic foams described herein can be made by a process/method including receiving a composition described herein, and physically foaming the composition to form a thermoplastic copolyester elastomer foam having a density of about 0.7 gram per cubic centimeter or less, or 0.5 gram per cubic centimeter or less, or 0.4 gram per cubic centimeter or less, or 0.3 gram per cubic centimeter or less. The process can include blowing the composition to produce an article or component comprising the thermoplastic copolyester elastomer foam. In some examples, the process for forming the thermoplastic copolyester elastomer foam comprises injection molding a mixture including a composition as described herein and a supercritical fluid (e.g., supercritical carbon dioxide or supercritical nitrogen) in a mold, and removing the thermoplastic copolyester elastomer foam from the mold.

In some aspects, the disclosed foamed polymeric materials can further include one or more thermoplastic polyurethanes, such as Fortimo™ (Mitsui Chemicals, Inc., Tokyo, Japan); Texin® (Covestro LLC, Pittsburgh, Pennsylvania, USA); and BounCell-X™ (Lubrizol Advanced Materials, Inc., Brecksville, Ohio, USA).

In some aspects, the disclosed foamed polymeric materials can further include one or more olefinic polymers. Olefinic polymers can include ethylene-based copolymers, propylene-based copolymers, and butene-based copolymers. In some aspects, the olefinic polymer is an ethylene-based copolymer such as a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; any copolymer thereof, and any blend thereof. In some aspects, a ratio V of a total parts by weight of the olefinic polymers present in the composition to a total parts by weight of the thermoplastic copolyester elastomers in the composition is about 0.0 to about 0.6, about 0.0 to about 0.4, about 0.01 to about 0.4, or about 0.01 to about 0.6, or about 0.1 to about 0.4.

In some aspects, the disclosed polymeric materials can further include an ethylene-vinyl acetate (EVA) copolymer. The ethylene-vinyl acetate (EVA) copolymer can have a range of vinyl acetate contents, for example about 50 percent to about 90 percent, about 50 percent to about 80 percent, about 5 percent to about 50 percent, about 10 percent to about 45 percent, about 10 percent to about 30 percent, about 30 percent to about 45 percent, or about 20 percent to about 35 percent.

In various aspects, the polymeric materials of the present disclosure can include a suitable thermoplastic elastomer. For example, a thermoplastic elastomer can be selected from a thermoplastic polyurethane elastomer, a thermoplastic polyurea elastomer, a thermoplastic polyether elastomer, a thermoplastic copolyetherester elastomer, a thermoplastic polyamide elastomer, a thermoplastic polystyrene elastomer, a thermoplastic polyolefin elastomer, a thermoplastic copolyetheramide elastomer, a thermoplastic styrene diene copolymer elastomer, a thermoplastic styrene block copolymer elastomer, a thermoplastic polyamide elastomer, a thermoplastic polyimide elastomer, any copolymer thereof, and any blend thereof.

In various aspects, the thermoplastic elastomer used to prepare the foam components comprises a thermoplastic copolyetherester elastomer. It is understood that as used herein, "thermoplastic copolyetherester elastomer" can be used interchangeably with "thermoplastic polyether-polyester block copolymers," "thermoplastic polyester/polyether block copolymers," "copolyester elastomer," "poly-etherester block copolymer," "block poly-ether-ester," "polyester elastomer," "thermoplastic poly-ether-ester," "copoly(ether ester)," and "copolyester thermoplastic elastomer." In a further aspect, the thermoplastic copolyetherester elastomer comprises hard (or crystalline) polyester segments dispersed within soft (or amorphous) polyether segments. In a further aspect, the thermoplastic copolyetherester elastomer is a block copolymer. In a still further aspect, the thermoplastic copolyetherester elastomer is a segmented block copolymer. In some aspects, the thermoplastic copolyetherester elastomer is a block copolymer comprising segments or blocks of polyester and segments or blocks of polyether.

In various aspects, the thermoplastic copolyetherester elastomer used to prepare the foam components comprise polyesters segments, produced by the reaction of dicarboxylic derivative (such as terephthalate) and diols (such as butanediol) and polyether segments (such as polyalkylene (ether) glycol or polyol).

In various aspects, the polyester segments comprise polybutylene terephthalate (PBT). In a further aspect, the polyester segments have a segment molecular of about 3000 Daltons to about 9000 Daltons. In a still further aspect, the polyester segments have a segment molecular of about 5000 Daltons to about 7000 Daltons.

In various aspects, the polyether segments comprise long-chain polyols. In a further aspect, polyethylene glycol (PEG), polypropylene glycol (PPG) or polypropylene ether glycol (PPEG), polytetramethylene glycol (PTMG or PTHF) polytetramethylene ether glycol, and combinations thereof. In a further aspect, the polyether segments have a segment molecular of about 200 Daltons to about 4000 Daltons. In a still further aspect, the polyether segments have a segment molecular of about 1000 Daltons to about 3000 Daltons.

In various aspects, the thermoplastic copolyetherester elastomer comprises a polytetramethylene ether terephthalate soft segment and a polybutylene terephthalate hard segment. Thermoplastic copolyetherester elastomers are commercially available, and non-limiting examples are available under the tradenames HYTREL (DuPont Company, Wilmington, Delaware), ARNITEL (DSM Engineering Plastics, Evansville, Indiana), and PELPRENE (Toyobo Co., Ltd., Osaka, Japan).

In various aspects, the thermoplastic copolyetherester elastomer polymers comprise a polyether segment obtained by polymerization of tetrahydrofuran (i.e. poly(tetramethylene ether)) and a polyester segment obtained by polymerization of tetramethylene glycol and phthalic acid (i.e. 1,4-butylene terephthalate). The more polyether units incorporated into the copolyetherester, the softer the polymer. The poly(tetramethylene ether) glycol used to make the copolyetherester can have a molecular weight of from about 500 Daltons to about 3500 Daltons, or about 800 Daltons to about 2500 Daltons.

In various aspects, the thermoplastic copolyetherester elastomer polymers comprise repeat units derived from 30 to 70 weight percent of 1,4-butylene terephthalate and from 10 to 70 weight percent of poly(tetramethylene ether) terephthalate. In a further aspect, e thermoplastic copolyetherester elastomer polymers comprise repeat units derived from 55 to 60 weight percent of 1,4-butylene terephthalate, from 23 to 27 weight percent of 1,4-butylene isophthalate, from 10 to 15 weight percent of poly(tetramethylene ether) terephthalate, and from 3 to 7 weight percent of poly(tetramethylene ether) isophthalate. The poly(tetramethylene ether) glycol used to make the copolyetherester may have a molecular weight of from about 800 to about 1200.

In various aspects, the thermoplastic copolyetherester elastomer polymers comprise repeat units derived from 30 to 40 weight percent 1,4-butylene terephthalate, and from 60 to 70 weight percent poly(tetramethylene ether) terephthalate. The poly(tetramethylene ether) glycol used to make the copolyetherester preferably has a molecular weight of from 1500 to about 2500.

In various aspects, the thermoplastic copolyetherester elastomer is a block copolymer of short-chain diol terephthalate and long-chain polyether diol terephthalate, comprising about 60 weight percent of hard segments of polybutylene terephthalate and about 40 weight percent of soft segments of polytetramethylene ether terephthalate, has a Durometer hardness (ASTM D-2240) of Shore 55D, a melting point (ASTM D-2117) of 211° C.; a Vicat Softening Point (ASTM D1525) of 180° C. and flexural modulus (ASTM D790) of 207 megapascals (MPa). A suitable material with the foregoing characteristics is available under the tradename HYTRELO 5556 (DuPont Company, Wilmington, Delaware).

In various aspects, the thermoplastic copolyetherester elastomer is a block copolymer of short-chain diol terephthalate and long-chain polyether diol terephthalate, comprising about 42 weight percent of hard segments of polybutylene terephthalate and about 58 weight percent of soft segments of polytetramethylene ether terephthalate, has a Durometer hardness of 92A/40D; a melting point of 168 degrees Celsius; a Vicat Softening Point of 112 degrees Celsius and flexural modulus of 48.3 megapascals. A suitable material with the foregoing characteristics is available under the tradename HYTREL 4056 (DuPont Company, Wilmington, Delaware).

In various aspects, the thermoplastic copolyetherester elastomer is a block copolymer of short-chain diol terephthalate and long-chain polyether diol terephthalate, comprising about 80 weight percent of hard segments of polybutylene terephthalate and about 20 weight percent of soft segments of polytetramethylene ether terephthalate, has a Durometer hardness of about 72D; a melting point of 219 degrees Celsius; a Vicat Softening Point of 207 degrees Celsius and a flexural modulus of 585 megapascals. A suitable material with the foregoing characteristics is available under the tradename HYTRELO 7246 (DuPont Company, Wilmington, Delaware).

In various aspects, the thermoplastic copolyetherester elastomer comprises long-chain ester units of formula 7:

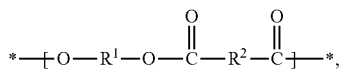

and short-chain ester units of formula 8:

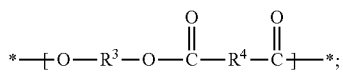

wherein $R^1$ comprises a divalent radical remaining after removal of terminal hydroxyl groups from poly(alkylene ether) having a carbon-to-oxygen ratio from about 2.0 to about 4.3 and a number average molecular weight from about 400 Daltons to about 6000 Daltons; wherein $R^2$ comprises a divalent radical remaining after removal of carboxyl groups from a dicarboxylic acid having a molecular weight less than about 300 Daltons; wherein $R^3$ comprises a divalent radical remaining after removal of hydroxyl groups from a low molecular weight diol having a molecular weight less than about 250 Daltons; wherein $R^4$ comprises a divalent radical remaining after removal of carboxyl groups from a dicarboxylic acid having a molecular weight less than about 300 Daltons; wherein the long-chain ester units represented by formula I comprise about 5 weight percent to about 95 weight percent of the thermoplastic copolyetherester elastomer; and wherein the short-chain ester units represented by formula II comprise about 95 weight percent to about 5 weight percent of the thermoplastic copolyetherester elastomer.

In a further aspect, $R^1$ comprises a divalent radical remaining after removal of terminal hydroxyl groups from poly(tetramethylene ether). In a still further aspect, $R^1$ has a number average molecular weight from about 500 Daltons to about 3500 Daltons; about 600 Daltons to about 3000 Daltons; about 800 Daltons to about 1200 Daltons; about 800 Daltons to about 2000 Daltons; about 800 Daltons to about 2500 Daltons; about 800 Daltons to about 3000 Daltons; about 800 Daltons to about 3500 Daltons; about 800 Daltons to about 4000 Daltons; about 1000 Daltons to about 3000 Daltons; or about 1500 Daltons to about 2500 Daltons.

In a further aspect, $R^2$ comprises a divalent radical remaining after removal of carboxyl groups from an aromatic dicarboxylic acid. In a still further aspect, $R^2$ comprises a divalent radical remaining after removal of carboxyl groups from 1,4-benzenedicarboxylic acid.

In a further aspect, $R^3$ comprises a divalent radical remaining after removal of hydroxyl groups from a C2-C6 alkyl diol. In a still further aspect, $R^3$ comprises a divalent radical remaining after removal of hydroxyl groups from 1,4-butanediol.

In a further aspect, $R^4$ is a divalent radical remaining after removal of carboxyl groups from an aromatic dicarboxylic acid. In a still further aspect, $R^4$ is a divalent radical remaining after removal of carboxyl groups from 1,4-benzenedicarboxylic acid.

In a further aspect, the long-chain ester units represented by formula I comprise about 10 weight percent to about 60 weight percent of the thermoplastic copolyetherester elastomer; about 20 weight percent to about 60 weight percent of the thermoplastic copolyetherester elastomer; about 30 weight percent to about 60 weight percent of the thermoplastic copolyetherester elastomer; about 10 weight percent to about 70 weight percent of the thermoplastic copolyetherester elastomer; about 20 weight percent to about 70 weight percent of the thermoplastic copolyetherester elastomer; about 30 weight percent to about 70 weight percent of the thermoplastic copolyetherester elastomer; about 10 weight percent to about 80 weight percent of the thermoplastic copolyetherester elastomer; about 20 weight percent to about 80 weight percent of the thermoplastic copolyetherester elastomer; or about 30 weight percent to about 80 weight percent of the thermoplastic copolyetherester elastomer.

In a further aspect, the short-chain ester units represented by formula II comprise about 20 weight percent to about 90 weight percent of the thermoplastic copolyetherester elastomer; about 40 weight percent to about 90 weight percent of the thermoplastic copolyetherester elastomer; about 20 weight percent to about 80 weight percent of the thermoplastic copolyetherester elastomer; about 40 weight percent to about 80 weight percent of the thermoplastic copolyetherester elastomer; about 20 weight percent to about 70 weight percent of the thermoplastic copolyetherester elastomer; about 40 weight percent to about 70 weight percent of the thermoplastic copolyetherester elastomer; about 40 weight percent to about 60 weight percent of the thermoplastic copolyetherester elastomer; or about 20 weight percent to about 60 weight percent of the thermoplastic copolyetherester elastomer.

In a further aspect, at least about 50 weight percent of the short-chain ester units represented by formula II are identical.

In a further aspect, the thermoplastic copolyetherester elastomer comprises polybutylene terephthalate blocks and poly(tetramethylene ether) terephthalate blocks, wherein the polybutylene terephthalate blocks comprise from about 95 weight percent to about 5 weight percent of the thermoplastic copolyetherester elastomer, wherein the poly(tetramethylene ether) terephthalate blocks comprise from about 5 weight percent to about 95 weight percent of the thermoplastic copolyetherester elastomer, and wherein the poly(tetramethylene ether) terephthalate blocks have a number average molecular weight from about 200 Daltons to about 6000 Daltons.

In a further aspect, the thermoplastic copolyetherester elastomer comprises polybutylene terephthalate blocks and poly(tetramethylene ether) terephthalate blocks, wherein the polybutylene terephthalate blocks comprise from about 70 weight percent to about 20 weight percent of the thermoplastic copolyetherester elastomer, wherein the poly(tetramethylene ether) terephthalate blocks comprise from about 5 weight percent to about 95 weight percent of the thermoplastic copolyetherester elastomer, and wherein the poly(tetramethylene ether) terephthalate blocks have a number average molecular weight from about 200 Daltons to about 6000 Daltons.

In a further aspect, the thermoplastic copolyetherester elastomer comprises polybutylene terephthalate blocks and poly(tetramethylene ether) terephthalate blocks, wherein the polybutylene terephthalate blocks comprise from about 80 weight percent to about 30 weight percent of the thermoplastic copolyetherester elastomer, wherein the poly(tetramethylene ether) terephthalate blocks comprise from about 5 weight percent to about 95 weight percent of the thermoplastic copolyetherester elastomer, and wherein the poly(tetramethylene ether) terephthalate blocks have a number average molecular weight from about 200 Daltons to about 6000 Daltons.

In a further aspect, the thermoplastic copolyetherester elastomer comprises polybutylene terephthalate blocks and poly(tetramethylene ether) terephthalate blocks, wherein the polybutylene terephthalate blocks comprise from about 70 weight percent to about 20 weight percent of the thermoplastic copolyetherester elastomer, wherein the poly(tetramethylene ether) terephthalate blocks comprise from about 30 weight percent to about 80 weight percent of the thermoplastic copolyetherester elastomer, and wherein the poly(tetramethylene ether) terephthalate blocks have a number average molecular weight from about 200 Daltons to about 6000 Daltons.

In a further aspect, the poly(tetramethylene ether) terephthalate blocks have a number average molecular weight from about 800 Daltons to about 1200 Daltons; about 1500 Daltons to about 2500 Daltons; or about 1000 Daltons to about 3000 Daltons.

In various aspects, the thermoplastic elastomer used to prepare the foam components comprises a thermoplastic polyurethane elastomer. In a still further aspect, the thermoplastic polyurethane elastomer is selected from a thermoplastic polyester-polyurethane elastomer, a thermoplastic polyether-polyurethane elastomer, a thermoplastic polycarbonate-polyurethane elastomer, a thermoplastic polyolefin-polyurethane elastomer, any copolymer thereof, and any blend thereof. In a yet further aspect, the thermoplastic polyurethane elastomer is a thermoplastic polyester-polyurethane elastomer. In a still further aspect, the thermoplastic polyurethane elastomer is a thermoplastic polyether-polyurethane elastomer. In a yet further aspect, the thermoplastic polyurethane elastomer is a thermoplastic polycarbonate-polyurethane elastomer.

Thermoplastic polyurethane from which the foam components are prepared may have a melt index (also called a melt flow index or melt flow rate) of at least about 160 grams/10 minutes (at 190 degrees Celsius, 21.6 kilograms) as measured according to ASTM D1238. In various embodiments, the melt index may be from about 160 to about 250 grams/10 minutes (at 190 degrees Celsius, 21.6 kilograms) or from about 160 to about 220 grams/10 minutes (at 190 degrees Celsius, 21.6 kilograms), in each case as measured according to ASTM D1238.

Thermoplastic polyurethanes can be produced via reaction of (a) diisocyanates with difunctional compounds reactive toward isocyanates. In general, the difunctional compounds have two hydroxyl groups (diols) and may have a molar mass of from 62 Daltons (the molar mass of ethylene glycol) to about 10,000 Daltons, although difunctional compounds having other isocyanate-groups (e.g., secondary amine) may be used, generally in minor amounts, and a limited molar fraction of tri-functional and mono-functional isocyanate-reactive compounds may be used. Preferably, the polyurethane is linear. Including difunctional compounds with molar masses of about 400 or greater introduces soft segments into the polyurethane. An increased ratio of soft segments to hard segments in the polyurethane causes the polyurethane to become increasingly more flexible and eventually elastomeric. In certain aspects, such as when the molded article is an outsole for an article of footwear, the particles may advantageously be prepared using a rigid thermoplastic polyurethane or combination of thermoplastic polyurethanes. In various other aspects, such as when the molded article is a midsole for footwear, the particles may advantageously be prepared using an elastomeric thermoplastic polyurethane or a combination of elastomeric thermoplastic polyurethanes.

Suitable thermoplastic polyurethanes include thermoplastic polyester-polyurethanes, polyether-polyurethanes, and polycarbonate-polyurethanes. Non-limiting, suitable examples of these include, without limitation, polyurethanes polymerized using as diol reactants polyesters diols prepared from diols and dicarboxylic acids or anhydrides, polylactone polyesters diols (for example polycaprolactone diols), polyester diols prepared from hydroxy acids that are monocarboxylic acids containing one hydroxyl group, polytetrahydrofuran diols, polyether diols prepared from ethylene oxide, propylene oxide, or combinations of ethylene oxide and propylene oxide, and polycarbonate diols such as polyhexamethylene carbonate diol and poly(hexamethylene-co-pentamethylene)carbonate diols. The elastomeric thermoplastic polyurethane may be prepared by reaction of one of these polymeric diols (polyester diol, polyether diol, polylactone diol, polytetrahydrofuran diol, or polycarbonate diol), one or more polyisocyanates, and, optionally, one or more monomeric chain extension compounds. Chain extension compounds are compounds having two or more functional groups, preferably two functional groups, reactive with isocyanate groups. Preferably the elastomeric thermoplastic polyurethane is substantially linear (i.e., substantially all of the reactants are di-functional).

Non-limiting examples of polyester diols used in forming the elastomeric thermoplastic polyurethane include those prepared by the condensation polymerization of dicarboxylic compounds, their anhydrides, and their polymerizable esters (e.g. methyl esters) and diol compounds. Preferably, all of the reactants are di-functional, although small amounts of mono-functional, tri-functional, and higher functionality materials (perhaps up to a few mole percent) can be included. Suitable dicarboxylic acids include, without limitation, glutaric acid, succinic acid, malonic acid, oxalic acid, phthalic acid, hexahydrophthalic acid, adipic acid, maleic acid, anhydrides of these, and mixtures thereof. Suitable polyols include, without limitation, wherein the extender is selected from the group consisting of ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, 1,4-butanediol, 1,5-pentanediol, 1,3-propanediol, butylene glycol, neopentyl glycol, and combinations thereof. Small amounts of triols or higher functionality polyols, such as trimethylolpropane or pentaerythritol, are sometimes included. In a preferred aspect, the carboxylic acid includes adipic acid and the diol includes 1,4-butanediol. Typical catalysts for the esterification polymerization are protonic acids, Lewis acids, titanium alkoxides, and dialkyl tin oxides.

Hydroxy carboxylic acid compounds such as 12-hydroxy stearic acid may also be polymerized to produce a polyester diol. Such a reaction may be carried out with or without an initiating diol such as one of the diols already mentioned.

Polylactone diol reactants may also be used in preparing the elastomeric thermoplastic polyurethanes. The polylactone diols may be prepared by reacting a diol initiator, e.g., a diol such as ethylene or propylene glycol or another of the diols already mentioned, with a lactone. Lactones that can be ring opened by an active hydrogen such as, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these can be polymerized. The lactone ring can be substituted with alkyl groups of 1-7 carbon atoms. In one preferred aspect, the lactone is E-caprolactone. Useful catalysts include those mentioned above for polyester synthesis. Alternatively, the reaction can be initiated by forming a sodium salt of the hydroxyl group on the molecules that will react with the lactone ring.

Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above.

Aliphatic polycarbonates may be prepared by polycondensation of aliphatic diols with dialkyl carbonates, (such as diethyl carbonate), cyclic glycol carbonates (such as cyclic carbonates having five- and six-member rings), or diphenyl carbonate, in the presence of catalysts like alkali metal, tin catalysts, or titanium compounds. or diphenyl carbonate. Another way to make aliphatic polycarbonates is by ring-opening polymerization of cyclic aliphatic carbonates catalyzed by organometallic catalysts. The polycarbonate diols can also be made by copolymerization of epoxides with carbon dioxide. Aliphatic polycarbonate diols are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

The polymeric diol, such as the polymeric polyester diols and polyether diols described above, that are used in making an elastomeric thermoplastic polyurethanes synthesis preferably have a number average molecular weight (determined for example by the ASTM D-4274 method) of from about 300 Daltons to about 8,000 Daltons, or from about 300 Daltons to about 5000 Daltons, or from about 300 Daltons to about 3000 Daltons.

The synthesis of a thermoplastic polyurethanes may be carried out by reacting one or more of the polymeric diols, one or more compounds having at least two (preferably two) isocyanate groups, and, optionally, one or more chain extension agents. The elastomeric thermoplastic polyurethanes are preferably linear and thus the polyisocyanate component preferably is substantially di-functional. Useful diisocyanate compounds used to prepare the elastomeric thermoplastic polyurethanes, include, without limitation, methylene bis-4-cyclohexyl isocyanate, cyclohexylene diisocyanate (CHDI), isophorone diisocyanate (IPDI), m-tetramethyl xylylene diisocyanate (m-TMXDI), p-tetramethyl xylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), 2,4-tolylene ("toluene") diisocyanate and 2,6-tolylene diisocyanate (TDI), 2,4'-methylene diphenyl diisocyanate (MDI), 4,4'-methylene diphenyl diisocyanate (MDI), o-, m-, and p-xylylene diisocyanate (XDI), 4-chloro-1,3-phenylene diisocyanate, naphthylene diisocyanates including 1,2-naphthylene diisocyanate, 1,3-naphthylene diisocyanate, 1,4-naphthylene diisocyanate, 1,5-naphthylene diisocyanate, and 2,6-naphthylene diisocyanate, 4,4'-dibenzyl diisocyanate, 4,5'-diphenyldiisocyanate, 4,4'-diisocyanatodibenzyl, 3,3'-dimethoxy-4,4'-biphenylene diisocyanate, 3,3'-dimethyl-4,4'-biphenylene diisocyanate, 1,3-diisocyanatobenzene, 1,4-diisocyanatobenzene, and combinations thereof. Particularly useful is diphenylmethane diisocyanate (MDI).

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders may range from about 60 to about 400 g/mol. Alcohols and amines are preferred in some aspects. Typical examples of useful diols that are used as polyurethane chain extenders include, without limitation, 1,6-hexanediol, cyclohexanedimethanol (sold as CHDM by Eastman Chemical Co.), 2-ethyl-1,6-hexanediol, 1,4-butanediol, ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; 1,3-propanediol, neopentyl glycol, dihydroxyalkylated aromatic compounds such as the bis(2-hydroxyethyl)ethers of hydroquinone and resorcinol; p-xylene-α,α'-diol; the bis(2-hydroxyethyl)ether of p-xylene-α,α'-diol; m-xylene-α,α'-diol and the bis(2-hydroxyethyl)ether; 3-hydroxy-2,2-dimethylpropyl 3-hydroxy-2,2-dimethylpropanoate; and mixtures thereof. Suitable diamine extenders include, without limitation, p-phenylenediamine, m-phenylenediamine, benzidine, 4,4'-methylenedianiline, 4,4'-methylenebis (2-chloroaniline), ethylene diamine, and combinations of these. Other typical chain extenders are amino alcohols such as ethanolamine, propanolamine, butanolamine, and combinations of these. Preferred extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these.

In addition to the above-described di-functional extenders, a small amount of tri-functional extenders such as trimethylolpropane, 1,2,6-hexanetriol and glycerol, and/or mono-functional active hydrogen compounds such as butanol or dimethyl amine, may also be present. The amount of tri-functional extenders and/or mono-functional compounds employed would preferably be a few equivalent percent or less based on the total weight of the reaction product and active hydrogen containing groups employed.

The reaction of the polyisocyanate(s), polymeric diol(s), and, optionally, chain extension agent(s) is typically conducted by heating the components, generally in the presence of a catalyst. Typical catalysts for this reaction include organotin catalysts such as stannous octoate or dibutyl tin dilaurate. Generally, the ratio of polymeric diol, such as polyester diol, to extender can be varied within a relatively wide range depending largely on the desired hardness of the elastomeric thermoplastic polyurethanes. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 0.95:1 to 1.10:1, and more preferably, 0.98:1 to 1.04:1. The polymeric diol segments typically are from about 25 weight percent to about 65 weight percent of the elastomeric thermoplastic polyurethanes, and preferably from about 25 weight percent to about 50 weight percent of the elastomeric thermoplastic polyurethanes.

In various aspects, the thermoplastic polyurethane elastomer used to prepare the foam components comprises a long-chain polyol. In a still further aspect, the long-chain polyol is selected from a polyether polyol, a polyester polyol, a polycarbonate polyol, a polyolefin polyol, a polyacryl polyol, and any copolymer thereof. In a yet further aspect, the long-chain polyol is a polyether polyol, a polyester polyol, and any copolymer thereof. In an aspect, the long-chain polyol is a polyether polyol. In an aspect, the long-chain polyol is a polyester polyol. In a further aspect, the long-chain polyol has a number-average molecular weight of not less than about 500 Daltons. In a still further aspect, the long-chain polyol has a number-average molecular weight of about 500 Daltons to about 10,000 Daltons; about 600 Daltons to about 6,000 Daltons; or about 800 Daltons to about 4,000 Daltons.

One non-limiting example of commercially available elastomeric thermoplastic polyurethanes having a melt flow index of from about 160 to about 220 grams/10 minutes (at 190 degrees Celsius, 21.6 kilograms) suitable for making thermoplastic polyurethanes foam components is ELASTOLLAN SP9213 (melt flow index of 200 grams/10 minutes (at 190 degrees Celsius, 21.6 kilograms)), which is available from BASF Polyurethanes GmbH.

A thermoplastic polyurethane that is more rigid may be synthesized in the same way but with a lower content of the polymeric diol segments. A rigid thermoplastic polyurethane may, for example, include from about 0 to about 25 weight percent of the polyester, polyether, or polycarbonate diol segments. Synthesis of rigid polyurethanes is well-known in the art and described in many references. Rigid thermoplastic polyurethane having a melt index of at least about 160 grams/10 minutes (at 190 degrees Celsius, 21.6 kilograms) as measured according to ASTM D 1238 are commercially available and include those sold under the trademark Isoplast® ETPU by Lubrizol Corp., Wickliffe, Ohio.

Suitable thermoplastic polyurea elastomers may be prepared by reaction of one or more polymeric diamines or polyols with one or more of the polyisocyanates already mentioned and one or more diamine extenders. Nonlimiting examples of suitable diamine extenders include ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imidobis(propylamine), N-(3-aminopropyl)-N-methyl-1,3-propanediamine), 1,4-bis(3-aminopropoxy)butane, diethyleneglycol-di(aminopropyl)ether), 1-methyl-2,6-diamino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, and 3,3'-diethyl-5,5'-dimethyl-4,4'-diamino-dicyclohexylmethane. Polymeric diamines include polyoxyethylene diamines, polyoxypropylene diamines, poly(oxyethylene-oxypropylene)diamines, and poly(tetramethylene ether)diamines. The amine- and hydroxyl-functional extenders already mentioned may be used as well. Generally, as before, trifunctional reactants are limited and may be used in conjunction with monofunctional reactants to prevent crosslinking.

In various aspects, the thermoplastic elastomer comprises a thermoplastic polyamide elastomer. In a further aspect, the thermoplastic polyamide elastomer comprises nylon 6, nylon 12, or combinations thereof.

Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as &-caprolactam or w-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180 degrees Celsius to about 300 degrees Celsius Specific examples of suitable polyamide blocks include NYLON 6, NYLON 66, NYLON 610, NYLON 11, NYLON 12, copolymerized NYLON, NYLON MXD6, and NYLON 46.

In various aspects, the thermoplastic elastomer comprises at least one thermoplastic polystyrene elastomer. In a further aspect, the thermoplastic polystyrene elastomer is a styrene block copolymer elastomer. In a further aspect, the thermoplastic styrene block copolymer elastomer is a styrene ethylene butylene styrene block copolymer. In a still further aspect, the styrene block copolymer elastomer is a poly(styrene-butadiene-styrene), a poly(styrene-ethylene-cobutylene-styrene), a poly(styrene-isoprene-styrene), any copolymer thereof, and any blend thereof.

In various aspects, the thermoplastic elastomer used to prepare the foam components is characterized by a broad peak indicating a range of melting temperatures ($T_m$) when determined using differential scanning calorimetry. In a further aspect, the melting temperature is characterized by a melting range of about 15 degrees Celsius to about 200 degrees Celsius or about 50 degrees Celsius to about 90 degrees Celsius. In a still further aspect, the melting temperature is characterized by a melting range of about 30 degrees Celsius to about 150 degrees Celsius from initial onset to a melting temperature peak. In a yet further aspect, the melting temperature is characterized by a melting range of at least about 30 degrees Celsius or by a melting range of at least about 50 degrees Celsius.

In various aspects, the polymeric material can be a polyolefin polymer, e.g., an ethylene-vinyl-acetate (EVA) polymer. The polyolefin polymer can be a polymer comprising styrene repeating units and non-styrenic repeating units; a $C_4$-$C_{100}$ unsaturated olefin; an ethylene vinyl acetate copolymer; an olefin block copolymer; and mixtures thereof. In some aspects, a polyolefin polymer is an A-B-A block copolymer, wherein each of the A blocks have styrenic repeat units, the B block is a random copolymer of ethylene and a first alpha-olefin having 3 to 8 carbon atoms (e.g. 3, 4, 5, 6, 7, or 8 carbon atoms), and wherein the A-B-A-block copolymer includes about 10 percent to 50 percent, about 10 percent to 40 percent, about 15 percent to 40 percent, or about 15 percent to 30 percent of the A blocks by weight based upon an entire weight of the A-B-A block copolymer; an olefinic block copolymer, wherein the olefinic block copolymer is a copolymer of ethylene and a second alpha-olefin having about 4 to 14, about 6 to 12, or about 6 to 10 carbon atoms, and wherein the olefinic block copolymer has one or more blocks rich in the ethylene and one or more blocks rich in the second alpha-olefin; and an ethylene-vinyl acetate copolymer.

Elastomeric ethylene-vinyl acetate copolymers can be prepared by free-radical emulsion polymerization of ethylene and up to about 50 percent by weight vinyl acetate. The vinyl acetate monomer is usually at least about 10 percent by weight, preferably at least about 25 percent by weight of the monomers used. The ethylene-vinyl acetate copolymer has a vinyl acetate content of preferably from about 25 weight percent to about 50 weight percent and more preferably from about 35 weight percent to about 50 weight percent. The ethylene-vinyl acetate (EVA) copolymer can have a vinyl acetate content of about 5 percent to 55 percent, about 5 percent to 50 percent, about 10 percent to 50 percent, about 10 percent to 45 percent, or about 15 percent to 40 percent by weight based upon the weight of the ethylene-vinyl acetate copolymer. The ethylene-vinyl acetate copolymers may have a melt flow index of from about 0.5 to about 50 grams/10 min. (at 190 degrees C., 2.16 kg), preferably 2.5 to 10 grams/10 min. (at 190 degrees C., 2.16 kg) as measured using the procedure of ASTM D1238. Nonlimiting examples of suitable commercially available ethylene-vinyl acetate copolymers include ELVAX 265, ELVAX 40L-3 from DuPont (Midland, MI, USA) and LAVAPRENE 400 from Langxess (Cologne, Germany). The ethylene-vinyl acetate copolymers may be used in combination. In some aspects, the EVA may be formed of a combination of high melt index and low melt index material. For example, the EVA may have a melt index between approximately 1 and approximately 50.

In further aspects, the polyolefin polymers can be homopolymers of vinyl esters and olefin-vinyl ester copolymers, such as polyvinyl acetate, ethylene-vinyl acetatecopolymers and propylene-vinyl acetate copolymers, may be used as the vinyl ester polymer.

In various aspects, the polymeric material can be a block copolymer comprising a first block and a third block, each independently comprising a linear or branched chain aliphatic polymer having a plurality of aromatic groups attached pendantly thereto, a second block located between the first block and the third block and comprising an aliphatic polymer having a plurality of aliphatic side chains attached thereto, and a plurality of first ethylenically unsaturated group present on one or more of the first block, second block, and third block; wherein the block copolymer comprises about 60 percent to about 90 percent of the second blocks by weight based upon the weight of the block copolymer; an olefinic copolymer comprising a plurality of first olefinic segments and a plurality of second olefinic segments having a different chemical structure from the first olefinic segments; one or more linking polymers, each linking polymer comprising one or more third olefinic segments; and an ethylene-vinyl acetate (EVA) copolymer; wherein a sum of a ratio I, II, III, IV, and V is from about 1.00 to about 10.00; wherein the ratio I is a ratio of a total parts by weight of the olefinic copolymers present in the composition to a total parts by weight of the block copolymer present in the composition; wherein the ratio II is a ratio of a total parts by weight of the linking polymers present in the composition to a total parts by weight of the block copolymer present in the composition; wherein the ratio III is ratio of a total parts by weight of the EVA copolymers present in the composition to a total parts by weight of the block copolymer present in the composition; wherein the ratio IV is a ratio of the total parts by weight of the linking polymers present in the composition to a total parts by weight of the block copolymers present in the composition, and wherein the ratio V is a ratio of the total parts by weight of the one or more EVA copolymers present in the composition to a total parts by weight of the one or more olefinic copolymers present in the composition.

In various aspects, the polymeric material can be a block copolymer comprising a first block and a third block, each independently comprising a linear or branched chain aliphatic polymer having a plurality of aromatic groups attached pendantly thereto, a second block located between the first block and the third block and comprising an aliphatic polymer having a plurality of aliphatic side chains attached thereto, and a plurality of first ethylenically unsaturated group present on one or more of the first block, second block, and third block; wherein the block copolymer comprises about 60 percent to about 90 percent of the second blocks by weight based upon the weight of the block copolymer; an olefinic copolymer comprising a plurality of first olefinic segments and a plurality of second olefinic segments having a different chemical structure from the first olefinic segments; and one or more linking polymers, each linking polymer comprising one or more third olefinic segments.

In various aspects, the polymeric material can be a composition comprising an A-B-A block copolymer, wherein each of the A blocks comprise styrenic repeat units, the B block is a random copolymer of ethylene and an alpha-olefin having about 3 to 8 carbon atoms, and wherein the A-B-A-block copolymer comprises about 10 percent to about 40 percent of the A blocks by weight based upon the weight of the A-B-A block copolymer; an olefinic block copolymer, wherein the olefinic block copolymer is a copolymer of ethylene and an alpha-olefin having about 6 to 12 carbon atoms, and wherein the olefinic block copolymer has one or more blocks rich in the ethylene and one or more blocks rich in the alpha-olefin; an alpha-olefin linking polymer, wherein the alpha-olefin linking polymer is a copolymer of ethylene and an alpha-olefin having about 3 to 8 carbon atoms, and wherein the alpha-olefin linking polymer has an alpha-olefin monomer content of about 15 percent to about 40 percent by weight based upon the weight of the alpha-olefin linking polymer; and an ethylene-vinyl acetate copolymer having a vinyl acetate content of about 10 percent to about 40 percent by weight based upon the weight of the ethylene-vinyl acetate copolymer.

In various aspects, the polymeric material can be a composition comprising a partially hydrogenated thermoplastic elastomeric block copolymer, the partially hydrogenated thermoplastic elastomeric block copolymer comprising: one or more A blocks comprising aromatic repeat units, one or more B blocks comprising aliphatic repeat units, and one or more first ethylenically unsaturated groups present on one or both of the aromatic repeat units and the aliphatic repeat units; an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups; an alpha-olefin linking polymer, wherein the alpha-olefin linking polymer comprises one or more aliphatic sidechains; and an ethylene-vinyl acetate copolymer;

wherein a sum of a ratio I, II, III, IV, and V is from about 1.00 to about 10.00; wherein the ratio I is a ratio of a total parts by weight of the olefinic copolymers present in the composition to a total parts by weight of the partially hydrogenated thermoplastic elastomeric block copolymer present in the composition; wherein the ratio II is a ratio of a total parts by weight of the alpha-olefin linking polymers present in the composition to a total parts by weight of the partially hydrogenated thermoplastic elastomeric block copolymer present in the composition; wherein the ratio III is ratio of a total parts by weight of the ethylene-vinyl acetate copolymers present in the composition to a total parts by weight of the partially hydrogenated thermoplastic elastomeric block copolymer present in the composition; wherein the ratio IV is a ratio of the total parts by weight of the alpha-olefin linking polymers present in the composition to a total parts by weight of the partially hydrogenated thermoplastic elastomeric block copolymer present in the composition, and wherein the ratio V is a ratio of the total parts by weight of the one or more ethylene-vinyl acetate copolymers present in the composition to a total parts by weight of the one or more olefinic copolymers present in the composition.

In various aspects, the polymeric material can be a composition comprising: a partially hydrogenated thermoplastic elastomeric block copolymer, the partially hydrogenated thermoplastic elastomeric block copolymer comprising: one or more A blocks comprising aromatic repeat units, one or more B blocks comprising aliphatic repeat units, and one or more first ethylenically unsaturated groups present on one or both of the aromatic repeat units and the aliphatic repeat units; an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups; an alpha-olefin linking polymer, wherein the alpha-olefin linking polymer comprises one or more aliphatic sidechains; and an ethylene-vinyl acetate copolymer.

In various aspects, the polymeric material can be a composition comprising one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units; one or more olefinic block copolymers, each of the one or more olefinic block copolymers comprising second ethylenically unsaturated units; one or more alpha-olefin linking polymers; and one or more ethylene-vinyl acetate copolymers; wherein a sum of a ratio I, II, III, IV, and V is from about 1.00 to about 10.00; wherein the ratio I is a ratio of a total parts by weight of the olefinic block copolymers present in the composition to a total parts by weight of the partially hydrogenated thermoplastic elastomeric block copolymer present in the composition; wherein the ratio II is a ratio of a total parts by weight of the alpha-olefin linking polymers present in the composition to a total parts by weight of the partially hydrogenated thermoplastic elastomeric block copolymer present in the composition; wherein the ratio III is ratio of a total parts by weight of the ethylene-vinyl acetate copolymers present in the composition to a total parts by weight of the partially hydrogenated thermoplastic elastomeric block copolymer present in the composition; wherein the ratio IV is a ratio of the total parts by weight of the alpha-olefin linking polymers present in the composition to a total parts by weight of the partially hydrogenated thermoplastic elastomeric block copolymer present in the composition, and wherein the ratio V is a ratio of the total parts by weight of the one or more ethylene-vinyl acetate copolymers present in the composition to a total parts by weight of the one or more olefinic copolymers present in the composition.

In various aspects, the polymeric material can be a composition comprising one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units; one or more olefinic block copolymers, each of the one or more olefinic block copolymers comprising second ethylenically unsaturated units; one or more alpha-olefin linking copolymers; and one or more ethylene-vinyl acetate copolymers.

In various aspects, the polymeric material can be a polyurethane elastomers, polyurea elastomers, polyamide elastomers (PEBA or polyether block polyamides), polyester elastomers, metallocene-catalyzed block copolymers of ethylene and α-olefins having 4 to about 8 carbon atoms, styrene block copolymers such as poly(styrene-butadiene-styrene), poly(styrene-ethylene-co-butylene-styrene), and poly(styrene-isoprene-styrene), and combinations thereof.

Polyurethane may be selected from polyester-polyurethanes, polyether-polyurethanes, and polycarbonate-polyurethanes, including, without limitation, polyurethanes polymerized using as polymeric diol reactants polyethers and polyesters including polycaprolactone polyesters. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is being used, are compounds having two or more functional groups reactive with isocyanate groups, such as the diols, amino alcohols, and diamines. Preferably the polymeric diol-based polyurethane is substantially linear (i.e., substantially all of the reactants are difunctional).

Diisocyanates used in making the polyurethane may be aromatic or aliphatic. Useful diisocyanate compounds used to prepare thermoplastic polyurethanes include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediisocyanate and para-xylylenediisocyanate, 4-chloro-1,3-phenylene diisocyanate, 1,5-tetrahydro-naphthalene diisocyanate, 4,4'-dibenzyl diisocyanate, and xylylene diisocyanate (XDI), and combinations of these. Nonlimiting examples of higher-functionality polyisocyanates that may be used in limited amounts to produce branched thermoplastic polyurethanes (optionally along with monofunctional alcohols or monofunctional isocyanates) include 1,2,4-benzene triisocyanate, 1,3,6-hexamethylene triisocyanate, 1,6,11-undecane triisocyanate, bicyclo-heptane triisocyanate, triphenylmethane-4,4',4"-triisocyanate, isocyanurates of diisocyanates, biurets of diisocyanates, allophanates of diisocyanates, and the like.

Nonlimiting examples of suitable diols that may be used as extenders include ethylene glycol and lower oligomers of ethylene glycol including diethylene glycol, triethylene glycol and tetraethylene glycol; propylene glycol and lower oligomers of propylene glycol including dipropylene tripropylene glycol, glycol and tetrapropylene glycol; cyclohexanedimethanol, 1,6-hexanediol, 2-ethyl-1,6-hexanediol, 1,4-butanediol, 2,3-butanediol, 1,5-pentanediol, 1,3-propanediol, butylene glycol, neopentyl glycol, dihydroxyalkylated aromatic compounds such as the bis (2-hydroxyethyl) ethers of hydroquinone and resorcinol; p-xylene-α,α'-diol; the bis (2-hydroxyethyl) ether of p-xylene-α, α'-diol; m-xylene-α,α'-diol and combinations of these. Thermoplastic polyurethanes may be made using small amounts of triols or higher functionality polyols, such as trimethylolpropane or pentaerythritol, optionally along with monomeric alcohols such as C2-C8 monools or monoisocyanates such as butyl isocyanate.

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders preferably range from about 60 to about 400. Alcohols and amines are preferred. Examples of useful diols include those diols already mentioned. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these. The dithiol and diamine reactants may also be included in preparing polyurethanes that are not elastomeric.

In addition to difunctional extenders, a small amount of a trifunctional extender such as trimethylolpropane, 1,2,6-hexanetriol and glycerol, or monofunctional active hydrogen compounds such as butanol or dimethyl amine, may also be present. The amount of trifunctional extender or monofunctional compound employed may be, for example, 5.0 equivalent percent or less based on the total weight of the reaction product and active hydrogen containing groups used.

The polyester diols used in forming a polyurethane are in general prepared by the condensation polymerization of one or more polyacid compounds and one or more polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials (perhaps up to 5 mole percent) can be included to provide a slightly branched, but uncrosslinked polyester polyol component. Suitable dicarboxylic acids include, without limitation, glutaric acid, succinic acid, malonic acid, oxalic acid, phthalic acid, hexahydrophthalic acid, adipic acid, maleic acid, suberic acid, azelaic acid, dodecanedioic acid, their anhydrides and polymerizable esters (e.g., methyl esters) and acid halides (e.g., acid chlorides), and mixtures of these. Suitable polyols include those already mentioned, especially the diols. In preferred aspects, the carboxylic acid component includes one or more of adipic acid, suberic acid, azelaic acid, phthalic acid, dodecanedioic acid, or maleic acid (or the anhydrides or polymerizable esters of these) and the diol component includes one or more of includes 1,4-butanediol, 1,6-hexanediol, 2,3-butanediol, or diethylene glycol. Typical catalysts for the esterification polymerization are protonic acids, Lewis acids, titanium alkoxides, and dialkyltin oxides.

A polymeric polyether or polycaprolactone diol reactant for preparing thermoplastic polyurethanes may be obtained by reacting a diol initiator, e.g., 1,3-propanediol or ethylene or propylene glycol, with a lactone or alkylene oxide chain-extension reagent. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred aspect, the lactone is ε-caprolactone. Useful catalysts include those mentioned above for polyester synthesis. Alternatively, the reaction can be initiated by forming a sodium salt of the hydroxyl group on the molecules that will react with the lactone ring.

In other aspects, a diol initiator may be reacted with an oxirane-containing compound to produce a polyether diol to be used in the polyurethane elastomer polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above. Polytetrahydrofuran is also known as polytetramethylene ether glycol (PTMEG).

Aliphatic polycarbonate diols that may be used in making a polyurethane are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

In various aspects, the polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights can be determined suitable methods such as those known in the art, e.g., by means of gel permeation chromatography, in accordance with ASTM D4001-13 (ASTM D4001-13, Standard Test Method for Determination of Weight-Average Molecular Weight of Polymers By Light Scattering, ASTM International, West Conshohocken, P A, 2013), or per Schmitt, M. T., "Methods for Polymer Molecular Weight Measurement." (see MNL17-2ND-EB *Paint and Coating Testing Manual: 15th. Edition of the Gardner-Sward Handbook*, edited by Joseph Koleske, (pp. 908-913). West Conshohocken, PA: ASTM International, 2012. doi:10.1520/MNL12254M).

The reaction of the polyisocyanate, polymeric diol, and diol or other chain extension agent is typically carried out at an elevated temperature in the presence of a catalyst. Typical catalysts for this reaction include organotin catalysts such as stannous octoate, dibutyl tin dilaurate, dibutyl tin diacetate, dibutyl tin oxide, tertiary amines, zinc salts, and manganese salts. Generally, the ratio of polymeric diol, such as polyester diol, to extender can be varied within a relatively wide range depending largely on the desired hardness of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 1:1 to 1:1.05, and more preferably, 1:1 to 1:1.02. The polymeric diol segments typically are from about 35 percent to about 65 percent by weight of the polyurethane polymer, and preferably from about 35 percent to about 50 percent by weight of the polyurethane polymer.

The selection of diisocyanate, extenders, polymeric diols, and the weight percent of the polymeric diols used takes into account the desired density and stability of the desired foam. In general, a greater content of a polymeric polyol that has a Hildenbrand solubility parameter closer to that of the supercritical fluid will permit higher absorption of the supercritical fluid that results in a lower density foam. Also in general, shorter polymeric diols provide foams that shrink less after they are first foamed. Use of higher number average molecular weight polymeric diols allow a higher degree of swelling, but a molecular weight that is too high may yield a less stable foam.

Suitable polyureas may be prepared by reaction of one or more polymeric diamines or polyols with one or more of the polyisocyanates already mentioned and one or more diamine extenders. Nonlimiting examples of suitable diamine extenders include ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl)ether), 1-methyl-2,6-diamino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N, N'-dialkylamino-dicyclohexylmethane, and 3,3'-diethyl-5,5'-dimethyl-4,4'-diamino-dicyclohexylmethane. Polymeric diamines include polyoxyethylene diamines, polyoxypropylene diamines, poly(oxyethylene-oxypropylene) diamines, and poly(tetramethylene ether) diamines. The amine- and hydroxyl-functional extenders already mentioned may be used as well. Generally, as before, trifunctional reactants are limited and may be used in conjunction with monofunctional reactants to prevent crosslinking.

Suitable polyamides may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180 degrees Celsius to about 300 degrees Celsius Specific examples of suitable polyamide blocks include NYLON 6, NYLON 66, NYLON 610, NYLON 11, NYLON 12, copolymerized NYLON, NYLON MXD6, and NYLON 46.

The effects of the type and molecular weights of the soft segment polymeric polyols used in making thermoplastic polyurea elastomers and polyamide elastomers are analogous to the same effects in making thermoplastic polyurethane elastomers.

The polyesters can have blocks of monomer units with low chain length that form the crystalline regions and blocks of softening segments with monomer units having relatively higher chain lengths. In some aspects, the polyesters can be thermoplastic polyester elastomers such as those that are commercially available under the tradename HYTREL from DuPont.

Metallocene-catalyzed block copolymers of ethylene and α-olefins having 4 to about 8 carbon atoms are prepared by single-site metallocene catalysis of ethylene with a softening comonomer such as hexane-1 or octene-1, for example in a high pressure process in the presence of a catalyst system comprising a cyclopentadienyl-transition metal compound and an alumoxane. Octene-1 is a preferred comonomer to use. These materials are commercially available from ExxonMobil (Irving, TX, USA) under the tradename EXACT and from the Dow Chemical Company (Midland, MI, USA) under the tradename ENGAGE.

Styrene block copolymer such as poly(styrene-butadiene-styrene), poly(styrene-ethylene-co-butylene-styrene), and poly(styrene-isoprene-styrene) may be prepared may anionic polymerization in which the polymer segments are produced sequentially, first by reaction of an alkyl-lithium initiator with styrene, then continuing polymerization by adding the alkene monomer, then completing polymerization by again adding styrene. S-EB-S and S-EP-S block copolymers are produced by hydrogenation of S-B-S and S-I-S block copolymers, respectively.

Additives.

In various aspects, a disclosed foam particle further comprise an additive. The additive can be incorporated directly into the disclosed foam components, or alternatively, applied thereto. Additives that can be used in the disclosed foam components include, but are not limited to, dyes, pigments, colorants, ultraviolet light absorbers, hindered amine light stabilizers, antioxidants, processing aids or agents, plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, fillers, or mixtures of two or more of the foregoing. When used, an additive can be present in an amount of from about 0.01 weight percent to about 10 weight percent, about 0.025 weight percent to about 5 weight percent, or about 0.1 weight percent to 3 weight percent, where the weight percent is based upon the sum of the material components in the thermoplastic composition, fiber, filament, yarn, or fabric.

Individual components can be mixed together with the other components of the thermoplastic composition in a continuous mixer or a batch mixer, e.g., in an intermeshing rotor mixer, such as an Intermix mixer, a twin screw extruder, in a tangential rotor mixer such as a Banbury mixer, using a two-roll mill, or some combinations of these to make a composition comprising a thermoplastic polymer and an additive. The mixer can blend the components together via a single step or multiple steps, and can mix the components via dispersive mixing or distributive mixing to form the resulting thermoplastic composition. This step is often referred to as "compounding."

In some aspects, the additive is an antioxidant such as ascorbic acid, an alkylated monophenol, an alkylthiomethylphenol, a hydroquinone or alkylated hydroquinone, a tocopherol, a hydroxylated thiodiphenyl ether, an alkylidenebisphenol, a benzyl compound, a hydroxylated malonate, an aromatic hydroxybenzl compound, a triazine compound, a benzylphosphonate, an acylaminophenol, an ester of β-(3,5-di-tert-butyl-4-hydroxyphenyl)propionic acid with mono- or polyhydric alcohols, an ester of β-(5-tert-butyl-4-hydroxy-3-methylphenyl)propionic acid with mono- or polyhydric alcohols, an ester of β-(3,5-dicyclohexyl-4-hydroxyphenyl)propionic acid with mono- or polyhydric alcohols, an ester of 3,5-di-tert-butyl-4-hydroxyphenyl acetic acid with mono- or polyhydric alcohols, an amide of β-(3,5-di-tert-butyl-4-hydromhenyl)propionic acid, an aminic antioxidant, or mixtures of two or more of the foregoing.

Exemplary alkylated monophenols include, but are not limited to, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-ethylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol, and mixtures of two or more of the foregoing.

Exemplary alkylthiomethylphenols include, but are not limited to, 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, and mixtures of two or more of the foregoing.

Exemplary hydroquinones and alkylated hydroquinones include, but are not limited to, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate, and mixtures of two or more of the foregoing.

Exemplary tocopherols include, but are not limited to, α-tocopherol, p-tocopherol, 7-tocopherol, 6-tocopherol, and mixtures of two or more of the foregoing.

Exemplary hydroxylated thiodiphenyl ethers include, but are not limited to, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide, and mixtures of two or more of the foregoing.

Exemplary alkylidenebisphenols include, but are not limited to, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane, and mixtures of two or more of the foregoing.

Exemplary benzyl compounds include, but are not limited to, 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl)sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl)isocyanurate, 1,3,5-tris-(4-tert-butyl-3-hydroxy-2,6-dimethylbenzyl)isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, and mixtures of two or more of the foregoing.

Exemplary hydroxybenzylated malonates include, but are not limited to, dioctadecyl-2,2-bis-(3,5-di-tert-butyl-2-hydroxybenzyl)-malonate, di-octadecyl-2-(3-tert-butyl-4-hydroxy-5-ethylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate, and mixtures of two or more of the foregoing.

Exemplary aromatic hydroxybenzl compounds include, but are not limited to, 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6- tris(3,5-di-tert-butyl-4-hydroxybenzyl)phenol, and mixtures of two or more of the foregoing.

Exemplary triazine compounds include, but are not limited to, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris (3,5-di-tert-butyl-4-hydroxy-phenylpropionyl)-hexahydro-1.3.5-triazine, 1,3,5-tris(3,5-dicyclohexyl-4-hydroxybenzyl) isocyanurate, and mixtures of two or more of the foregoing.

Exemplary benzylphosphonates include, but are not limited to, dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid, and mixtures of two or more of the foregoing.

Exemplary acylaminophenols include, but are not limited to, 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate, and mixtures of two or more of the foregoing.

Exemplary esters of β-(3,5-di-tert-butyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(5-tert-butyl-4-hydroxy-3-methylphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(3,5-dicyclohexyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of 3,5-di-tert-butyl-4-hydroxyphenyl acetic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary amides of β-(3,5-di-tert-butyl-4-hydromhenyl)propionic acid, include, but are not limited to, N,N'-bis (3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazide, N,N'-bis[2-(3-[3,5-di-tert-butyl-4-hydroxyphenyl]propionyloxy) ethyl]oxamide, and mixtures of two or more of the foregoing.

Exemplary aminic antioxidants include, but are not limited to, N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine. phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol, and mixtures of two or more of the foregoing.

In some aspects, the additive is a UV absorber and/or light stabilizer, including, but limited to, a 2-(2-hydroxyphenyl)-2H-benzotriazole compound, a 2-hydroxybenzophenone compound, an ester of a substituted and unsubstituted benzoic acid, an acrylate or malonate compound, a sterically hindered amine stabilizer compound, an oxamide compound, a tris-aryl-o-hydroxyphenyl-s-triazine compound, or mixtures of two or more of the foregoing.

Exemplary 2-(2-hydroxyphenyl)-2H-benzotriazole compounds include, but are not limited to, 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-a-cumyl-2-hydroxyphenyl)-2H-benzotriazole, 2-(3-t-butyl-2-hydroxy-5-(2-(ω)-hydroxy-octa-(ethyleneoxy)carbonylethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumyl-phenyl)-2H-benzotriazole. 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole, and mixtures of two or more of the foregoing.

Exemplary 2-hydroxybenzophenone compounds include, but are not limited to, 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives of 2-hydroxybenzophenone, and mixtures of two or more such derivatives.

Exemplary esters of a substituted and unsubstituted benzoic acid include, but are not limited to, 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate, and mixtures of two or more of the foregoing.

Exemplary an acrylate or malonate compounds include, but are not limited to, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxycinnamic acid methyl ester, N-(β-carbomethoxy-β-cyanovinyl)-2-methyl-indoline, dimethyl p-methoxybenzylidenemalonate, di-(1,2,2,6,6-pentamethylpiperidin-4-yl)p-methoxybenzylidenemalonate, and mixtures of two or more of the foregoing.

Exemplary sterically hindered amine stabilizer compounds include, but are not limited to, 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl)sebacate, bis(2,2,6,6-tetramethyl-4-piperidyl)succinate, bis (1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethyl-piperidyl)succinate, linear or cyclic condensates of N, N'-bis-(2,2,6,6-tetramethyl-4-piperidyl)-hexamethylenediamine and 4-morpholino-2,6-dichloro-1,3,5-triazine, 8-acetyl-3-dodecyl-7,7,9,9-tetramethyl-1,3,8-triazaspiro [4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, 1,1-bis(1,2,2,6,6-pentamethyl-4-piperidyloxycarbonyl)-2-(4-methoxyphenyl)ethene, N,N'-bis-formyl-N, N'-bis(2,2,6,6-tetramethyl-4-piperidyl) hexamethylenediamine, poly[methylpropyl-3-oxy-4-(2,2,6,6-tetramethyl-4-piperidyl)]siloxane, 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl)adipate, bis(1-(2-hydroxy-2-methylpropoxy)-2,2,6,6-tetramethylpiperidin-4-yl) succinate, bis (1-(2-hydroxy-2-methylpropoxy)-2,2,6,6-tetramethylpiperidin-4-yl)glutarate and 2,4-bis{N-[1-(2-hydroxy-2-methylpropoxy)-2,2,6,6-tetramethylpiperidin-4-yl]-N-butylamino}-6-(2-hydroxyethyl-amino)-s-triazine, and mixtures of two or more of the foregoing.

Exemplary oxamide compounds include, but are not limited to, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl- 2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides, and mixtures of two or more of the foregoing.

Exemplary tris-aryl-o-hydroxyphenyl-s-triazine compounds include, but are not limited to, 4,6-bis-(2,4-dimethylphenyl)-2-(2-hydroxy-4-octyloxyphenyl)-s-triazine, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxy-ethoxy)phenyl]-6-(4-chlorophenyl)-s-triazine, 2,4-bis[2-hydroxy-4-(2-hydroxy-4-(2-hydroxy-ethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenylJ-642-hydroxy-4-(3-sec-amyloxy-2-hydroxypropyloxy)-phenyl]-s-triazine, 2,4-bis(2,4-dimethylphenyl)-6-[2-hydroxy-4-(3-benzyloxy-2-hydroxy-2,4-bis(2-hydroxy-4-n-butyloxyphenyl)-6-(2,4-di-n-propyloxy)phenyl]-s-triazine, butyloxyphenyl)-s-triazine, methylenebis-{2,4-bis(2,4-dimethylphenyl)-6-[2-hydroxy-4-(3-butyloxy-2-hydroxypropoxy)-phenyl]-s-triazine}, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyq-s-triazine, 4,6-bis-(2,4-dimethylphenyl)-2-(2-hydroxy-4-(3-(2-ethyl-hexyloxy)-2-hydroxypropoxy)-phenyl)-s-triazine, 4,6-diphenyl-2-(4-hexyloxy-2-hydroxyphenyl)-s-triazine, and mixtures of two or more of the foregoing.

In some aspects, the additive is a peroxide scavenger such as an ester of β-thiodipropionic acid, e.g., the lauryl, stearyl, myristyl or tridecyl esters, mercaptobenzimidazole, and the zinc salt of 2-mercapto-benzimidazole, zinc dibutyldithiocarbamate, dioctadecyl disulfide, pentaerythritol tetrakis(β-dodecylmercapto)propionate, or mixtures of any of the foregoing.

In some aspects, the additive is a polyamide stabilizer such as a copper salt of a halogen, e.g., iodide, and/or phosphorus compounds and salts of divalent manganese.

In some aspects, the additive is a basic co-stabilizer such as melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

In some aspects, the additive is a nucleating agent such as talcum, metal oxides such as titanium dioxide or magnesium oxide, phosphates, carbonates or sulfates of, preferably, alkaline earth metals, or mixtures thereof. Alternatively, the nucleating agent can be a mono- or polycarboxylic acids, and the salts thereof, e.g., 4-tert-butylbenzoic acid, adipic acid, diphenylacetic acid, sodium succinate, sodium benzoate, or mixtures thereof. In a further aspect, the additive can be a nucleating agent comprising both an inorganic and an organic material as disclosed herein above.

In some aspects, the rheology modifier can be a nanoparticles having comparatively high aspect ratios, nanoclays, nano-carbon, graphite, nano-silica, and the like.

In some aspects, the additive is a filler or reinforcing agent such as clay, kaolin, talc, asbestos, graphite, glass (such as glass fibers, glass particulates, and glass bulbs, spheres, or spheroids), mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), metal hydroxides, particulate synthetic plastics (such as high molecular weight polyethylene, polypropylene, polystyrene, polyethylene ionomeric resins, polyamide, polyester, polyurethane, polyimide, and the like), synthetic fibers (such as fibers comprising high molecular weight polyethylene, polypropylene, polystyrene, polyethylene ionomeric resins, polyamide, polyester, polyurethane, polyimide, and the like), particulate carbonaceous materials (such as carbon black and the like), wood flour and flours or fibers of other natural products, as well as cotton flock, cellulose flock, cellulose pulp, leather fiber, and combinations of any of the above. Non-limiting examples of heavy-weight filler components that can be used to increase the specific gravity of the cured elastomer composition can include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, and zirconium oxide), metal sulfates (such as barium sulfate), metal carbonates (such as calcium carbonate), and combinations of these. Non-limiting examples of light-weight filler components that can be used to decrease the specific gravity of the elastomer compound can include particulate plastics, hollow glass spheres, ceramics, and hollow spheres, regrinds, and foams, which can be used in combinations.

In some aspects, the additive is a cross-linking agent. There are a variety of cross-linking agents that can be used in the disclosed polymeric materials. For example, a cross-linking agent can be a free-radical initiator. The free radical initiator can generate free radicals through thermo cleavage or UV radiation. The free-radical initiator can be present in an amount from about 0.001 weight percent to about 1.0 weight percent. A variety of radical initiators can be used as the radical sources to make polymeric materials have a crosslinked structure. Suitable radical initiators applied include peroxides, sulfurs, and sulfides. Exemplary peroxides include, but are not limited to, aliphatic peroxides and aromatic peroxides, such as diacetylperoxide, di-tert-butylperoxide, dicumyl peroxide, dibenzoylperoxide, 2,5-dimethyl-2,5-di(benzoylperoxy)hexane, 2,5-dimethyl-2,5-di(butylperoxy)-3-hexyne, 2,5-bis-(t-butylperoxy)-2,5-dimethyl hexane, n-butyl-4,4-bis(t-butylperoxy)valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichloro-benzoyl), or combinations of two or more of the foregoing.

In some aspects, the additive is a colorant. The term "colorant," as used herein, means a compound providing color to a substrate, e.g., a disclosed thermoplastic composition, including, but not limited to, dyes, pigments, and the like, and combinations thereof. The colorant can be an organic or inorganic pigment, a dye, or mixtures or combinations thereof. In a further aspect, the pigment or dye is an inorganic material such as a metal oxide, e.g., iron oxide or titanium dioxide. Alternatively, the inorganic pigment or dye can be a metal compound, e.g., strontium chromate or barium sulfate, or a metallic pigment, e.g., aluminum flakes or particles. Other exemplary inorganic pigments include carbon black, talc, and the like. In some cases, the metal compound is not one comprising cadmium. In can be desirable in some instances that the inorganic pigment or dye is not one that contains a lead, cadmium and chromium (VI) compound. In a further aspect, the pigment or dye is an organic compound such as a perylene, phthalocyanine derivative (e.g., copper phthalocyanine), a indanthrone, a benzimidazolone, a quinacridone, a perinone, and an azomethine derivative. In some instances, the composition according to any method known to a person skilled in the art. For example, the colorant can be added to the thermoplastic composition in a mixing device such as an extruder, directly or else by means of a masterbatch. In various aspects, the disclosed thermoplastic composition can comprise between about 0.005 weight percent and about 5 weight percent relative to the weight of the composition. In a further aspect, the disclosed thermoplastic composition can comprise between about 0.01 weight percent and about 3 weight percent relative to the weight of the composition.

The foam components and/or binding material can comprise one or more colorants. In some aspects, the foam components can comprise a first colorant, and the binding material can comprise a second colorant. In this instance, it is understood that the first colorant can comprise one or more dyes or pigments. Similarly, it is understood that the second colorant can comprise one or more dyes or pigments.

There are at least two types of metal complex dyes that can be used as colorants. Acid metal complex dyes are soluble in water and therefore dissolved in a water solvent system prior to use. Solvent metal complex dyes are insoluble in water and therefore dissolved in a water/organic solvent system prior to use.

The solvent system used for metal complex dyes should both dissolve the dyes and promote diffusion of dye molecules into the elastomeric substrates under mild conditions. Thus, it was discovered that certain organic solvents not only dissolve dyes that are insoluble in water such as solvent metal complex dyes, but also promote or facilitate dye diffusion into the polymer matrix of both acid metal complex dyes and solvent metal complex dyes.

Suitable organic solvents include ethylene glycol phenyl ether (EGPE) and isopropanol. Generally a relatively smaller amount of organic solvent is needed.

A suitable solvent system for acid metal complex dyes contains, for example, 90 to 100 volume percent water and 0 to 10 volume percent organic solvent. Typical amounts of organic solvents are 0.5 to 7 volume percent or 1 to 5 volume percent.

A suitable solvent system for solvent metal complex dyes contains, besides water and ethylene glycol phenyl ether, a third component, usually an organic solvent, to increase the solubility of dyes. For example, the solvent system may contain 40 to 80 volume percent water and 60 to 20 volume percent organic solvent. Suitable organic solvents include, but are not limited to, alcohols, ethers, esters and ketones. Suitable solvent metal complex dyes include Orasol Yellow 2RLN, Orasol Yellow 2GLN-M, Pylam Solvent Red, Pylam Brilliant Yellow, and Resofast Orange M2Y.

Alternatively, a two phase solvent system may be used wherein the dye is soluble in the organic solvent, but not in the water and the organic solvent is only partially miscible in water or insoluble or nearly insoluble in water. Suitable organic solvents to form a two-phase system include those that are polar and insoluble in water such as suitable hydrocarbons, alcohols, aldehydes, ketones, ethers, esters, amides, acids, and halogenated compounds. Examples include, but are not limited to, n-butanol, cyclohexanol, butyl acetate, and ethylene glycol phenyl ether.

In a two-phase solvent system, a solution is prepared containing a major amount of water and a minor amount of an organic solvent. The organic solvent is either partially miscible with water or nearly insoluble in water such that the water and organic solvent form a two phase system. The two-phase solvent composition allows fast and uniform dyeing, e.g., of foam components.

The dye may be first dissolved in the organic solvent to form a uniform solution and then the solution may be dispersed in the water as droplets under agitation or stirring. Alternatively, the organic solvent may be combined with the water to form a two-phase solvent. The dye is then added to the two-phase solvent under agitation or stirring to form droplets.

A two-phase solvent composition can contain 1 to 30 volume percent, for example, 1 to 25 volume percent, organic solvent, and 70 to 99 volume percent, for example, 75 to 99 volume percent, water. These two-phase solvent compositions are particularly suitable for solvent dyes that have high solubility in organic solvents. Generally, dyes suitable for use in this embodiment include those that are highly soluble in organic solvent, but nearly insoluble in water.

When suitable substrates are immersed in the two-phase solvent dye system, droplets of organic solvent and dye are preferentially adsorbed onto the surface of the substrate. This creates a thin layer of organic solvent with a high concentration of dye on the surface of the substrate. In addition, the organic solvent causes the substrate to swell providing an open polymeric structure. The combination of such open structure in the substrate and high concentration of dye facilitates fast diffusion of dye molecules into the substrate.

Thus, the two-phase solvent composition both dissolves dyes and promotes diffusion of dye molecules into flexible substrates under mild conditions. Compared with conventional dyeing systems, the two-phase solvent dye system provides fast dyeing, uses less organic solvent, uses mild dyeing conditions, and provides potential for effective dye recovery/removal from solvent.

In some aspects, a dye can be a metal complex dye such as, but not limited to, Bezanyl Black, Bezanyl Red, Bezanyl Yellow, Orasol Black, Orasol Blue GN, Orasol Red G, Orasol Yellow 2GLN, Isolan Blue, SP-R, Isolan Grey SP-G, Isolan Red SP-G, Isolan Yellow SP-2RL, Pylam Solvent Blue, Pylam Solvent Red, Pylam Solvent Yellow, Resofast Blue, Resofast Orange, and Resofast Yellow.

In some aspects, the foam components can be dyed with a nonionic or anionic ("acid") dye by one of: (1) before being infused with the supercritical fluid, (2) during being infused with the supercritical fluid by a nonionic or anionic dye dissolved or dispersed in the supercritical fluid, which optionally comprises a polar liquid, (3) during immersion in the heated fluid, where the heated fluid contains the dye, or (4) after being foamed.

In some aspects, the colorant can be an acid dyes, such as a water-soluble anionic dyes. Acid dyes are available in a wide variety, from dull tones to brilliant shades. Chemically, acid dyes include azo, anthraquinone and triarylmethane compounds.

The "Color Index" (C.I.), published jointly by the Society of Dyers and Colourists (UK) and by the American Association of Textile Chemists and Colorists (USA), is the most extensive compendium of dyes and pigments for large scale coloration purposes, including 12000 products under 2000 C.I. generic names. In the C.I. each compound is presented with two numbers referring to the coloristic and chemical classification. The "generic name" refers to the field of application and/or method of coloration, while the other number is the "constitution number." Nonlimiting examples of acid dyes include Acid Yellow 1, 17, 23, 25, 34, 42, 44, 49, 61, 79, 99, 110, 116, 127, 151, 158:1, 159, 166, 169, 194, 199, 204, 220, 232, 241, 246, and 250; Acid Red, 1, 14, 17, 18, 42, 57, 88, 97, 118, 119, 151, 183, 184, 186, 194, 195, 198, 211, 225, 226, 249, 251, 257, 260, 266, 278, 283, 315, 336, 337, 357, 359, 361, 362, 374, 405, 407, 414, 418, 419, and 447; Acid Violet 3, 5, 7, 17, 54, 90, and 92; Acid Brown 4, 14, 15, 45, 50, 58, 75, 97, 98, 147, 160:1, 161, 165, 191, 235, 239, 248, 282, 283, 289, 298, 322, 343, 349, 354, 355, 357, 365, 384, 392, 402, 414, 420, 422, 425, 432, and 434; Acid Orange 3, 7, 10, 19, 33, 56, 60, 61, 67, 74, 80, 86, 94, 139, 142, 144, 154, and 162; Acid Blue 1, 7, 9, 15, 92, 133, 158, 185, 193, 277, 277:1, 314, 324, 335, and 342; Acid Green 1, 12, 68:1, 73, 80, 104, 114, and 119; Acid Black 1, 26, 52, 58, 60, 64, 65, 71, 82, 84, 107, 164, 172, 187, 194, 207, 210, 234, 235, and combinations of these. The acid dyes may be used singly or in any combination in the dye solution.

Acid dyes and nonionic disperse dyes are commercially available from many sources, including Dystar L.P., Charlotte, North Carolina, under the trademark TELON; Huntsman Corporation, Woodlands, Texas, under the trademarks ERIONYL and TECTILON; BASF SE, Ludwigshafen, Germany under the trademark BASACID; Clariant International Ltd., Muttenz, Switzerland, under the trademarks of SOLVAPERM, HOSTASOL, POLYSYNTHREN, and SAVINYL; and Bezema AG, Montlingen, Switzerland under the trade name Bemacid.

Nonionic disperse dyes are also commercially available in many colors and include fluorescent dyes.

In some aspects, the foam components can be dyed before being foamed. The acid or nonionic disperse dye solution in which the pellets or other articles are dyed may include, for example, from about 0.001 to about 5.0 grams per liter, preferably from about 0.01 to about 2 grams per liter of the acid or nonionic disperse dye compound or combination of acid or nonionic disperse dye compounds. The amount of acid or nonionic disperse dye compound use will determine how strong the color is and how quickly the pellets or other articles are dyed, and may be optimized in a straightforward manner; generally, a more concentrated dye solution can provide a stronger (deeper, darker, more intense) dyed color and can more quickly dye the pellets or other articles containing the thermoplastic elastomer.

The dye solution may include a water-soluble organic solvent. Water solubility of a particular organic solvent used in a particular amount in the dye solution is determined at 20 degrees Celsius. and 1 atm. pressure at the concentration at which the alcohol is to be used in the dye solution; the organic solvent is water soluble if it fully dissolves or is fully miscible in water at 20 degrees Celsius. and 1 atm. pressure at the concentration at which the alcohol is to be used in the dye solution and does not form any separate phase or layer. Suitable, nonlimiting examples of water-soluble organic solvents that may be used include alcohols, such as methanol, ethanol, n-propanol, isopropanol, ethylene glycol, diethylene glycol, triethylene glycol, tetraethylene glycol, propylene glycol, dipropylene glycol, tripropylene glycols, and glycerol; ketones, such as acetone and methyl ethyl ketone; esters, such as butyl acetate, which is soluble in limited amounts in water; and glycol ethers and glycol ether esters (particularly acetates), such as ethylene glycol monobutyl ether, propylene glycol monomethyl ether, and propylene glycol monomethyl ether acetate. The water-soluble organic solvent may be included in concentrations of up to about 50 percent by volume, or up to about 25 percent by volume, or from about 1 percent to about 50 percent by volume, or from about 5 percent to about 40 percent by volume, or from about 10 percent to about 30 percent by volume, or from about 15 percent to about 25 percent by volume of the aqueous medium used to make the dye solution. Whether an organic solvent is used and how much organic solvent is used may be varied according to which dye is used and to the application method for contacting the dye solution with the pellets or other articles.

When the foam components or binding material contain thermoplastic polyurethane elastomers or thermoplastic polyurea elastomers, the anionic dye solution also advantageously includes a quaternary (tetraalkyl) ammonium salt selected from soluble tetrabutylammonium compounds and tetrahexylammonium compounds. Such articles are advantageously dyed in an acid dye solution including an anionic dye compound, a quaternary from soluble tetrabutylammonium compounds and ammonium salt selected tetrahexylammonium compounds, and, optionally, a water-soluble organic solvent.

The counterion of the quaternary ammonium salt should be selected so that the quaternary ammonium salt forms a stable solution with the anionic dye. The quaternary ammonium compound may be, for example, a halide (such as chloride, bromide or iodide), hydroxide, sulfate, sulfite, carbonate, perchlorate, chlorate, bromate, iodate, nitrate, nitrite, phosphate, phosphite, hexfluorophosphate, borate, tetrafluoroborate, cyanide, isocyanide, azide, thiosulfate, thiocyanate, or carboxylate (such as acetate or oxalate). In certain embodiments, an anion that is a weaker Lewis base may be selected for the tetraalkylammonium compound to produce a darker color for the dyed cover or coating layer. In various embodiments, the tetraalkylammonium compound is or includes a tetrabutylammonium halide or tetrahexylammonium halide, particularly a tetrabutylammonium bromide or chloride or a tetrahexylammonium bromide or chloride.

The acid dye solution used to dye the foam components when they contain thermoplastic polyurethane elastomers or thermoplastic polyurea elastomers may include from about 0.1 to about 5 equivalents of the soluble tetraalkylammonium compound per equivalent of dye compound. In various embodiments, the acid dye solution may include from about 0.5 to about 4, preferably from about 1 to about 4 equivalents of the tetraalkylammonium compound per equivalent of dye compound. The amount of tetraalkylammonium compound used with a particular acid dye compound depends upon the rate of diffusion of the dye into and in the cover or coating layer and may be optimized in a straightforward manner. The process of dyeing the foam components containing thermoplastic polyurethane elastomers or thermoplastic polyurea elastomers with this dye solution containing the soluble tetraalkylammonium compound can produce strong color intensity in the dyed foam components.

The foam components may be dyed with a nonionic or anionic dye one of: (1) before being infused with the supercritical fluid. The pellets may also be dyed while being infused with the supercritical fluid by a nonionic or anionic dye dissolved or dispersed in the supercritical fluid, which optionally comprises a polar liquid. The pellets may also be dyed while being immersed in the heated fluid, where the heated fluid contains the dye. In particular, the heated fluid may be a heated aqueous dye solution, which may contain the quaternary ammonium salt and organic solvents as described. Finally, the foam components can be dyed after being foamed using the dyeing process as already described.

Definitions

All technical and scientific terms used herein, unless defined otherwise, have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The terms "comprises," "comprising," "including," and "having," are inclusive and therefore specify the presence of molded features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used in the specification and the appended claims, the singular forms "a," "an" and "the" include plural referents unless the context clearly dictates otherwise. Thus, for example, reference to "a polymer," "a mold," or "a preform," including, but not limited to, two or more such polymers, molds, preforms, and the like.

As used herein, the term "foam component" is inclusive of both a first foam component and a second foam component, that is, "foam component" can be used to refer to any disclosed foam component, including a first foam component and a second foam component.

As used herein, the term "and/or" includes any and all combinations of one or more of the associated listed items.

As used herein, in substance or substantially means at least 50 percent, 60 percent, 75 percent, 90 percent, 95 percent, or more, as determined based on weight or volume.

The terms first, second, third, etc. can be used herein to describe various elements, components, regions, layers and/or sections. These elements, components, regions, layers and/or sections should not be limited by these terms. These terms can be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

As used herein, the modifiers "upper," "lower," "top," "bottom," "upward," "downward," "vertical," "horizontal," "longitudinal," "transverse," "front," "back" etc., unless otherwise defined or made clear from the disclosure, are relative terms meant to place the various structures or orientations of the structures of the article of footwear in the context of an article of footwear worn by a user standing on a flat, horizontal surface.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.4%, 3.2%, and 4.4%) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

The terms "at least one" and "one or more of" an element are used interchangeably, and have the same meaning that includes a single element and a plurality of the elements, and can also be represented by the suffix "(s)" at the end of the element. For example, "at least one polyamide", "one or more polyamides", and "polyamide(s)" can be used interchangeably and have the same meaning.

As used herein, the terms "optional" or "optionally" means that the subsequently described component, event or circumstance can or cannot occur, and that the description includes instances where said component, event or circumstance occurs and instances where it does not.

The term "receiving", such as for "receiving an upper for an article of footwear", when recited in the claims, is not intended to require any particular delivery or receipt of the received item. Rather, the term "receiving" is merely used to recite items that will be referred to in subsequent elements of the claim(s), for purposes of clarity and ease of readability.

As used herein the terms "percent by weight", "weight percent," "wt %," and "wt %," which can be used interchangeably, indicate the weight percent of a given component based on the total weight of the composition or article, unless otherwise specified. That is, unless otherwise specified, all weight percent values are based on the total weight of the composition. It should be understood that the sum of weight percent values for all components in a disclosed composition or formulation or article are equal to 100. Similarly, the terms "percent by volume", "volume percent," "vol %," and "vol. %," which can be used interchangeably, indicate the percent by volume of a given component based on the total volume of the composition or article, unless otherwise specified. That is, unless otherwise specified, all volume percent values are based on the total volume of the composition or article. It should be understood that the sum of volume percent values for all components in a disclosed composition or formulation or article are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

As used herein, the term "effective amount" refers to an amount that is sufficient to achieve the desired modification of a physical property of the composition or material. For example, an "effective amount" of a thermoplastic polymer refers to an amount that is sufficient to achieve the desired improvement in the property modulated by the formulation component, e.g. achieving the desired level of modulus. The specific level in terms of wt % in a composition required as an effective amount will depend upon a variety of factors including the amount and type of thermoplastic polymer, amount and type of foaming of the polymer during manufacture of a component or article, and end use of the article made using the composition.

As used herein, the terms "optional" or "optionally" means that the subsequently described event or circumstance can or cannot occur, and that the description includes instances where said event or circumstance occurs and instances where it does not.

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of polyethylene; "units of polypropylene" refers to block units of polypropylene; "units of polybutylene" refers to block units of polybutylene, and so on. Such use will be clear from the context.

The term "copolymer" refers to a polymer having two or more monomer species, and includes terpolymers (i.e., copolymers having three monomer species).

Unless otherwise specified, temperatures referred to herein are determined at standard a atmospheric pressure (i.e., 1 atm).

Disclosed are the components to be used to prepare the polymeric materials of the disclosure as well as the polymeric materials themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the polymeric materials of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent" indicates the percent by weight of a given component based on the total weight of the composition, unless otherwise specified. That is, unless otherwise specified, all weight percent values are based on the total weight of the composition. It should be understood that the sum of weight percent values for all components in a disclosed composition or formulation are equal to 100.

ASPECTS

The following listing of exemplary aspects supports and is supported by the disclosure provided herein.

Aspect 1. A sole structure for an article of footwear, comprising: a first foam component having a first side and a second side opposite the first side; a second foam component having a first side and a second side opposite the first side, wherein the first foam component and the second foam component form a stack in the sole structure; and a mesh component positioned in the stack between and bonded to the second side of the first foam component and the first side of the second foam component.

Aspect 2. The sole structure of Aspect 1, wherein: the first foam component comprises a cavity; the second side of the first foam component is defined within the cavity; the second foam component is positioned at least in part within the cavity; the interface between the second side of the first foam component and the first side of the second foam component is within the cavity; and the mesh component is positioned between and bonded to the second side of the first foam component and the first side of the second foam component.

Aspect 3. The sole structure of Aspect 1 or Aspect 2, wherein: the sole structure comprises a forefoot region, a midfoot region, and a heel region; and the mesh component is bonded between the second side of the first foam component and the first side of the second foam component in at least one of the forefoot region, the midfoot region, and the heel region.

Aspect 4. The sole structure of any one of Aspect 1-Aspect 3, wherein the mesh component extends between the second side of the first foam component and the first side of the second foam component from a medial side of the first foam component and the second foam component across to a lateral side of the first foam component and the second foam component.

Aspect 5. The sole structure of any one of Aspect 1-Aspect 3, wherein the mesh component extends between the second side of the first foam component and the first side of the second foam component to within about 1-5 millimeter of an edge of the second side of the first foam component and to within about 1-5 millimeter an edge of the first side of the second foam component; and the sole structure comprises an interface between the second side of the first foam component and the first side of the second foam component along at least a portion of the edge of the second side of the first foam component and the edge of the first side of the second foam component.

Aspect 6. The sole structure of any one of Aspect 1-Aspect 5, wherein the second side of the first foam component comprises an undulating region, or the first side of the second foam component comprises an undulating region, or both.

Aspect 7. The sole structure of Aspect 6, wherein the second side of the first foam component comprises the undulating region.

Aspect 8. The sole structure of Aspect 6, wherein the first side of the second foam component comprises the undulating region.

Aspect 9. The sole structure of Aspect 6, wherein the undulating region comprises a pattern selected from at least one of a sawtooth pattern and a wave pattern.

Aspect 10. The sole structure of Aspect 9, wherein the pattern varies according to a dimensional aspect of the pattern.

Aspect 11. The sole structure of Aspect 10, wherein the dimensional aspect of the pattern comprises at least one of amplitude and wavelength.

Aspect 12. The sole structure of any one of Aspect 6-Aspect 11, wherein: the mesh component is bonded to the second side of the first foam component and the first side of the second foam component in the undulating region; and a relative position of the mesh component varies within the stack in the sole structure within the undulating region.

Aspect 13. The sole structure of Aspect 6, wherein the first side of the second foam component comprises a first undulating region; the second side of the second foam component comprises a second undulating region; and the first undulating region and the second undulating region are complimentary to each other.

Aspect 14. The sole structure of any one of Aspect 1-Aspect 13, wherein the mesh component has a first concentration of fibers in a first region and a second concentration of fibers in a second region, wherein the first concentration is at least 10 weight percent greater than the second concentration.

Aspect 15. The sole structure of any one of Aspect 1-Aspect 14, wherein: the mesh component comprises at least two mesh components; and the at least two mesh components overlap each other between the second side of the first foam component and the first side of the second foam component.

Aspect 16. The sole structure of any one of Aspect 1-Aspect 14, wherein: the mesh component comprises at least two mesh components; and the at least two mesh components are spaced apart from each other in the stack between the second side of the first foam component and the first side of the second foam component.

Aspect 17. The sole structure of any one of Aspect 1-Aspect 16, wherein: the mesh component comprises at least two mesh components; at least one of the at least two mesh components is bonded at a first position between the second side of the first foam component and the first side of the second foam component; and at least another one of the at least two mesh components is bonded at a second position between the second side of the first foam component and the first side of the second foam component.

Aspect 18. The sole structure of any one of Aspect 1-Aspect 17, wherein: the mesh component comprises at least two mesh components; at least one of the at least two mesh components comprises a first density of fibers and at least another one of the at least two mesh components comprises a second density of fibers.

Aspect 19. The sole structure of any one of Aspect 1-Aspect 18, wherein the mesh component comprises a mesh textile.

Aspect 20. The sole structure of Aspect 19, wherein the mesh textile is a knit, crochet, braided, or woven textile comprising one or more yarns, wherein each of the one or more yarns is formed of one or more individual fibers.

Aspect 21. The sole structure of Aspect 19, wherein the mesh textile is a non-woven textile comprising a plurality of fibers.

Aspect 22. The sole structure of any one of Aspect 19-Aspect 21, wherein the mesh textile comprises one or more fibers or yarns comprising a fiber/yarn polymeric material comprising the polymeric material of any one of Aspect 44-Aspect 188.

Aspect 23. The sole structure of any one of Aspect 1-Aspect 22, wherein: the mesh component comprises a mesh textile; and the mesh textile has a first density of fibers in a first region and a second density of fibers in a second region.

Aspect 24. The sole structure of any one of Aspect 1-Aspect 23, wherein: the mesh component comprises a mesh textile; and the mesh textile has an elongation of at least 20 percent along at least one of the 0°, 45°, or 90° axes of a test sample as defined herein.

Aspect 25. The sole structure of any one of Aspect 1-Aspect 23, wherein the mesh component comprises a mesh textile; and the mesh textile has an elongation of at least 20 percent along at least two of the 0°, 45°, or 90° axes of a test sample as defined herein.

Aspect 26. The sole structure of any one of Aspect 1-Aspect 23, wherein the mesh component comprises a mesh textile; and the mesh textile has an elongation of at least 20 percent along each of the 0°, 45°, or 90° axes of a test sample as defined herein.

Aspect 27. The sole structure of any one of Aspect 24-Aspect 26, wherein the elongation is at least 35 percent.

Aspect 28. The sole structure of any one of Aspect 24-Aspect 26, wherein the elongation is at least 50 percent.

Aspect 29. The sole structure of any one of Aspect 24-Aspect 26, wherein the elongation is at least 75 percent.

Aspect 30. The sole structure of any one of Aspect 24-Aspect 26, wherein the elongation is at least 100 percent.

Aspect 31. The sole structure of any one of Aspect 24-Aspect 26, wherein the elongation is at least 150 percent.

Aspect 32. The sole structure of Aspect 26 or Aspect 27, wherein the first stretch percentage is at least 5 percent greater than the second stretch percentage.

Aspect 33. The sole structure of any one of Aspect 1-Aspect 32, wherein the mesh component comprises a mesh textile having a plurality of apertures, at least one of the plurality of apertures being at least 0.5 millimeter in at least one dimension.

Aspect 34. The sole structure of any one of Aspect 1-Aspect 33, wherein the mesh component comprises a mesh textile including a plurality of apertures, at least one of the plurality of apertures being at least 1.0 millimeter in at least one dimension.

Aspect 35. The sole structure of any one of Aspect 1-Aspect 34, wherein the mesh component comprises a mesh textile including a plurality of apertures, at least one of the plurality of apertures being less than 5 millimeter in at least one dimension.

Aspect 36. The sole structure of any one of Aspect 1-Aspect 35, wherein the mesh component comprises a mesh textile including a plurality of apertures, at least one of the plurality of apertures being less than 10 millimeter in at least one dimension.

Aspect 37. The sole structure of any one of Aspect 1-Aspect 36, wherein the mesh component comprises a mesh textile including a plurality of apertures, at least one of the plurality of apertures having at least one dimension from about 0.5 millimeter to about 3.0 millimeter.

Aspect 38. The sole of any one of Aspect 1-Aspect 37, wherein the mesh component comprises a mesh component polymeric material comprising the polymeric material of any one of Aspect 45-Aspect 188.

Aspect 39. Aspect 188 The sole structure of any one of Aspect 1-Aspect 38, further comprising an adhesive applied between the second side of the first foam component and the first side of the second foam component.

Aspect 40. The sole structure of any one of Aspect 1-Aspect 38, wherein at least one of a compression strength and a shear strength in the sole structure in which the mesh component is positioned and bonded is at least 5 percent greater than in any region in the sole structure in which the mesh component is not positioned and bonded.

Aspect 41. The sole structure of any one of Aspect 1-Aspect 40, wherein: the mesh component is positioned and bonded between the second side of the first foam component and the first side of the second foam component in a first region of the sole structure; the mesh component is not positioned and bonded between the second side of the first foam component and the first side of the second foam component in a second region of the sole structure; and the first region in the sole structure has at least one of a compression strength and a shear strength that is at least 5 percent greater than in the second region of the sole structure.

Aspect 42. The sole structure of any one of Aspect 1-Aspect 41, wherein at least one of the first foam component and the second foam component comprises a foam composition having an Asker C hardness of about 30 C to 65 C.

Aspect 43. The sole structure of any one of Aspect 1-Aspect 42, wherein at least one of the first foam component and the second foam component comprises a foam composition having an energy return of about 60 percent to 90 percent.

Aspect 44. The sole structure of any one of Aspect 1-Aspect 43, wherein the first foam component comprises a first foam component polymeric material comprising a polymeric material; and wherein the second foam component comprises a second foam component polymeric material independently comprising a polymeric material.

Aspect 45. The sole structure of Aspect 44, wherein the polymeric material comprises an olefinic polymer or copolymer, a thermoplastic polymer or copolymer, a thermoset polymer or copolymer, an ionomeric polymer or copolymer, or combinations thereof.

Aspect 46. The sole structure of Aspect 44, wherein the polymeric material comprises one or more aliphatic polymers, aromatic polymers, or mixture of both.

Aspect 47. The sole structure of Aspect 44, wherein the polymeric material comprises a homopolymer, a copolymer, a terpolymer, or mixtures of thereof.

Aspect 48. The sole structure of Aspect 44, wherein the polymeric material comprises a random copolymer, a block copolymers, an alternating copolymer, a periodic copolymer, or a graft copolymer.

Aspect 49. The sole structure of Aspect 44, wherein the polymeric material comprises an ionomeric polymer.

Aspect 50. The sole structure of Aspect 49, wherein the ionomeric polymer comprises a polycarboxylic acid or a derivative of a polycarboxylic acid.

Aspect 51. The sole structure of Aspect 49 or Aspect 50, wherein the ionomeric polymer is a sodium salt, a magnesium salt, a potassium salt, or a salt of another metallic ion.

Aspect 52. The sole structure of Aspect 49-Aspect 51, wherein the ionomeric polymer comprises a fatty acid modified ionomeric polymer.

Aspect 53. The sole structure of Aspect 49, wherein the ionomeric polymer comprises a polystyrene sulfonate, an ethylene-methacrylic acid copolymer, or mixtures thereof.

Aspect 54. The sole structure of Aspect 44, wherein the polymeric material comprises an olefinic polymer or copolymer.

Aspect 55. The sole structure of Aspect 54, wherein the olefinic polymer or copolymer is a cross-linked polyolefin.

Aspect 56. The sole structure of Aspect 54 or Aspect 55, wherein the olefinic polymer or copolymer comprises an ethylene vinyl acetate polymer or copolymer, a butane-based polymer or copolymer, an octane-based polymer or copolymer.

Aspect 57. The sole structure of Aspect 56, where the polymer is a copolymer.

Aspect 58. The sole structure of Aspect 57, wherein the copolymer is a block copolymer.

Aspect 59. The sole structure of Aspect 54, wherein the olefinic polymer or copolymer is an olefinic homopolymer, an olefinic copolymer, or mixtures thereof.

Aspect 60. The sole structure of any one of Aspect 44-Aspect 48 or Aspect 54, wherein the olefinic polymer comprises a polyethylene, a polypropylene, or combinations thereof.

Aspect 61. The sole structure of any one of Aspect 54 or Aspect 60, wherein the olefinic polymer comprises a polyethylene polymer.

Aspect 62. The sole structure of Aspect 61, wherein the polyethylene polymer is a polyethylene homopolymer Aspect 63. The sole structure of any one of Aspect 60-Aspect 62, wherein the polyethylene comprises a low density polyethylene, a high density polyethylene, a low molecular weight polyethylene, an ultra-high molecular weight polyethylene, a linear polyethylene, a branched chain polyethylene, or combinations thereof.

Aspect 64. The sole structure of Aspect 60 or Aspect 61, wherein the polyethylene comprises an ethylene copolymer.

Aspect 65. The sole structure of Aspect 64, wherein the polyethylene comprises an ethylene-vinyl acetate (EVA) copolymer, an ethylene-vinyl alcohol (EVOH) copolymer, an ethylene-ethyl acrylate copolymer, an ethylene-unsaturated mono-fatty acid copolymer, or combinations thereof.

Aspect 66. The sole structure of any one of Aspect 54-Aspect 65, wherein the olefinic polymer or copolymer comprises a polyacrylate.

Aspect 67. The sole structure of Aspect 66, wherein the polyacrylate comprises a polyacrylic acid, an ester of a polyacrylic acid, a polyacrylonitrile, a polyacrylic acetate, a polymethyl acrylate, a polyethyl acrylate, a polybutyl acrylate, a polymethyl methacrylate, a polyvinyl acetate, derivatives thereof, copolymers thereof, or any mixture thereof.

Aspect 68. The sole structure of Aspect 44, wherein the polymeric material comprises a thermoplastic polymer or copolymer.

Aspect 69. The sole structure of Aspect 68, wherein the thermoplastic polymer or copolymer is a thermoplastic elastomer.

Aspect 70. The sole structure of Aspect 68 or Aspect 69, wherein the thermoplastic polymer or copolymer is selected from a thermoplastic polyurethane, a thermoplastic polyurea, a thermoplastic polyether, a thermoplastic polyester, a thermoplastic copolyetherester, a thermoplastic copolyester, a thermoplastic polyamide, a thermoplastic polystyrene, a thermoplastic polyolefin, a thermoplastic copolyetheramide, a thermoplastic styrene diene copolymer, a thermoplastic styrene block copolymer, a thermoplastic polyamide, a thermoplastic polyimide, any copolymer thereof, and any blend thereof.

Aspect 71. The sole structure of Aspect 69 or Aspect 70, wherein the thermoplastic elastomer comprises a thermoplastic polyamide elastomer.

Aspect 72. The sole structure of Aspect 71, wherein the thermoplastic polyamide elastomer comprises nylon 6, nylon 12, or combinations thereof.

Aspect 73. The sole structure of Aspect 69 or Aspect 70, where the thermoplastic elastomer comprises a thermoplastic copolyester elastomer.

Aspect 74. The sole structure of Aspect 73, wherein the thermoplastic copolyester elastomer comprises: a thermoplastic copolyester elastomer comprising, (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid.

Aspect 75. The sole structure of Aspect 74, wherein the thermoplastic copolyester elastomer is a block copolymer; a segmented copolymer; a random copolymer; or a condensation copolymer.

Aspect 76. The sole structure of Aspect 74 or Aspect 75, wherein the thermoplastic copolyester elastomer has a weight average molecular weight of about 50,000 Daltons to about 1,000,000 Daltons.

Aspect 77. The sole structure of Aspect 76, wherein the thermoplastic copolyester elastomer has a weight average molecular weight of about 50,000 Daltons to about 500,000 Daltons; about 75,000 Daltons to about 300,000 Daltons; or about 100,000 Daltons to about 200,000 Daltons.

Aspect 78. The sole structure of any one of Aspect 74-Aspect 77, wherein the thermoplastic copolyester elastomer has a ratio of first segments to third segments from about 1:1 to about 1:5 based on the weight of each of the first segments and the third segments.

Aspect 79. The sole structure of Aspect 78, wherein the thermoplastic copolyester elastomer has a ratio of first segments to third segments from about 1:1 to about 1:3 or about 1:1 to about 1:2 based on the weight of each of the first segments and the third segments.

Aspect 80. The sole structure of any one of Aspect 74-Aspect 79, wherein the thermoplastic copolyester elastomer has a ratio of second segments to third segments from about 1:1 to about 1:3 based on the weight of each of the first segments and the third segments.

Aspect 81. The sole structure of Aspect 80, wherein the thermoplastic copolyester elastomer has a ratio of second segments to third segments from about 1:1 to about 1:2 or about 1:1 to about 1:1.52 based on the weight of each of the first segments and the third segments.

Aspect 82. The sole structure of any one of Aspect 74-Aspect 81, wherein the first segments derived from a dihydroxy-terminated polydiol comprise segments derived from a poly(alkylene oxide)diol having a number-average molecular weight of about 250 Daltons to about 6000 Daltons.

Aspect 83. The sole structure of Aspect 82, wherein the number-average molecular weight is about 400 Daltons to about 6,000 Daltons; about 350 Daltons to about 5,000 Daltons; or about 500 Daltons to about 3,000 Daltons.

Aspect 84. The sole structure of any one of Aspect 82-Aspect 83, wherein the poly(alkylene oxide)diol is poly(ethylene ether)diol; poly(propylene ether)diol; poly(tetramethylene ether)diol; poly(pentamethylene ether)diol; poly(hexamethylene ether)diol; poly(heptamethylene ether)diol; poly(octamethylene ether)diol; poly(nonamethylene ether)diol; poly(decamethylene ether)diol; or mixtures thereof.

Aspect 85. The sole structure of Aspect 84, wherein the poly(alkylene oxide)diol is poly(ethylene ether)diol; poly(propylene ether)diol; poly(tetramethylene ether)diol; poly(pentamethylene ether)diol; or poly(hexamethylene ether)diol.

Aspect 86. The sole structure of Aspect 84, wherein the poly(alkylene oxide)diol is poly(tetramethylene ether)diol.

Aspect 87. The sole structure of any one of Aspect 74-Aspect 86, wherein the second segments derived from a diol comprise a diol having a molecular weight of less than about 250.

Aspect 88. The sole structure of Aspect 87, wherein the diol is a C2-C8 diol.

Aspect 89. The sole structure of Aspect 88, wherein the second segments derived from a diol comprise a diol selected from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof.

Aspect 90. The sole structure of Aspect 89, wherein the diol is selected from 1,2-ethanediol, 1,3-propanediol, 1,4-butanediol, 1,6-hexanediol, and mixtures thereof.

Aspect 91. The sole structure of any one of Aspect 74-Aspect 90, wherein the third segments derived from an aromatic dicarboxylic acid comprise an aromatic C5-C16 dicarboxylic acid.

Aspect 92. The sole structure of Aspect 91, wherein the aromatic C5-C16 dicarboxylic acid has a molecular weight less than about 300 Daltons or about 120 Daltons to about 200 Daltons.

Aspect 93. The sole structure of Aspect 91, wherein the aromatic C5-C16 dicarboxylic acid is terephthalic acid, phthalic acid, isophthalic acid, or a derivative thereof.

Aspect 94. The sole structure of Aspect 93, wherein the aromatic C5-C16 dicarboxylic acid is terephthalic acid or the dimethyl ester derivative thereof.

Aspect 95. The sole structure of any one of Aspect 74-Aspect 94, wherein the thermoplastic copolyester elastomer comprises, (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

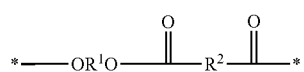

(1)

wherein $R^1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R^2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein the second copolyester unit has a structure represented by a formula 2:

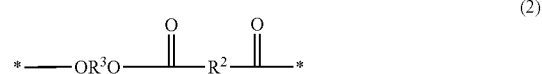

(2)

wherein $R^3$ is a group remaining after removal of hydroxyl groups from the diol of the second segment derived from a diol, wherein the diol is a diol having a molecular weight of less than about 250; and wherein $R^2$ is the group remaining after removal of carboxyl groups from the aromatic dicarboxylic acid of the third segment.

Aspect 96. The sole structure of Aspect 95, wherein the first copolyester unit has a structure represented by a formula 3:

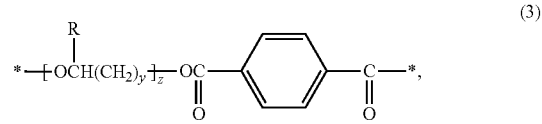

(3)

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons.

Aspect 97. The sole structure of Aspect 96, wherein y is an integer having a value of Aspect 1, 2, 3, 4, or 5.

Aspect 98. The sole structure of Aspect 96 or Aspect 97, wherein R is hydrogen; wherein R is methyl; wherein R is hydrogen and y is an integer having a value of Aspect 1, 2, or 3; or wherein R is methyl and y is an integer having a value of Aspect 1.

Aspect 99. The sole structure of Aspect 95, wherein the first copolyester unit has a structure represented by a formula 4:

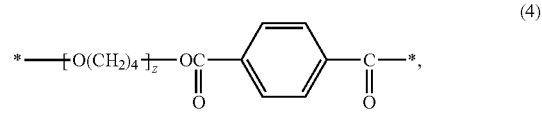

(4)

wherein z is an integer having a value from 2 to 60; and wherein a weight average molecular weight of each of the plurality of first copolyester units is from about 300 Daltons to about 7,000 Daltons.

Aspect 100. The sole structure of any one of Aspect 96-Aspect 99, wherein z is an integer having a value from 5 to 60; from 5 to 50; from 5 to 40; from 4 to 30; from 4 to 20; or from 2 to 10.

Aspect 101. The sole structure of any one of Aspect 96-Aspect 100, wherein the weight average molecular weight of each of the plurality of first copolyester units is from about 400 Daltons to about 6,000 Daltons; from about 400 Daltons to about 5,000 Daltons; from about 400 Daltons to about 4,000 Daltons; from about 400 Daltons to about 3,000 Daltons; from about 500 Daltons to about 6,000

Daltons; from about 500 Daltons to about 5,000 Daltons; from about 500 Daltons to about 4,000 Daltons; from about 500 Daltons to about 3,000 Daltons; from about 600 Daltons to about 6,000 Daltons; from about 600 Daltons to about 5,000 Daltons; from about 600 Daltons to about 4,000 Daltons; from about 600 Daltons to about 3,000 Daltons.

Aspect 102. The sole structure of any one of Aspect 95-Aspect 101, wherein the second copolyester unit has a structure represented by a formula 5:

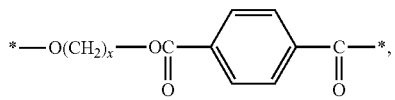

(5)

wherein x is an integer having a value from 1 to 20.

Aspect 103. The sole structure of Aspect 102, wherein x is an integer having a value from 2 to 18; a value from 2 to 17; a value from 2 to 16; a value from 2 to 15; a value from 2 to 14; a value from 2 to 13; a value from 2 to 12; a value from 2 to 11; a value from 2 to 10; a value from 2 to 9; a value from 2 to 8; a value from 2 to 7; a value from 2 to 6; or a value of 2, 3, or 4.

Aspect 104. The thermoplastic copolyester elastomer composition of Aspect 102, wherein the second copolyester unit has a structure represented by a formula 6:

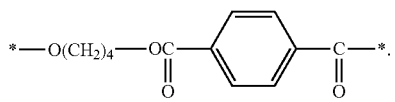

(6)

Aspect 105. The sole structure of any one of Aspect 95-Aspect 104, wherein the thermoplastic copolyester elastomer comprises a weight percent of the plurality of first copolyester units based on total weight of the thermoplastic copolyester elastomer of about 30 weight percent to about 80 weight; about 40 weight percent to about 80 weight percent; about 50 weight percent to about 80 weight percent; about 30 weight percent to about 70 weight percent; about 40 weight percent to about 70 weight percent; or about 50 weight percent to about 70 weight percent.

Aspect 106. The sole structure of any one of Aspect 95-Aspect 105, wherein the thermoplastic copolyester elastomer comprises a weight percent of the plurality of second copolyester units based on total weight of the thermoplastic copolyester elastomer of about 40 weight percent to about 65 weight percent; about 45 weight percent to about 65 weight percent; about 50 weight percent to about 65 weight percent; about 55 weight percent to about 65 weight percent; about 40 weight percent to about 60 weight percent; about 45 weight percent to about 60 weight percent; about 50 weight percent to about 60 weight percent; or about 55 weight percent to about 60 weight percent.

Aspect 107. The sole structure of any one of Aspect 74-Aspect 106, wherein the thermoplastic copolyester elastomer composition further comprises an additive.

Aspect 108. The sole structure of Aspect 107, wherein the additive is present in an amount from about 0.1 weight percent to about 10 weight percent based on the total weight of the foamed polymeric material.

Aspect 109. The sole structure of Aspect 107 or Aspect 108, wherein the additive is a wax, an anti-oxidant, a UV-absorbing agent, a coloring agent, or combinations thereof.

Aspect 110. The sole structure of any one of Aspect 74-Aspect 109, further comprising at least one ionomer.

Aspect 111. The sole structure of any one of Aspect 74-Aspect 109, further comprising at least one thermoplastic polyurethane.

Aspect 112. The sole structure of any one of Aspect 74-Aspect 111, wherein the thermoplastic copolyester elastomer composition is substantially free of a thermoplastic polyamide polymer, include polyamide copolymers such as polyether block amide copolymers.

Aspect 113. The sole structure of any one of Aspect 74-Aspect 111, wherein the thermoplastic copolyester elastomer composition is substantially free of a thermoplastic polyolefin polymers, including polyethylene and polypropylene and/or polyolefin copolymers such as ethylene-vinyl acetate copolymers.

Aspect 114. The sole structure of any one of Aspect 74-Aspect 113, wherein the thermoplastic copolyester elastomer has a maximum load when determined using a cyclic tensile test as described herein of about 10 N to about 100 N; about 15 N to about 50 N; or about 20 N to about 40 N.

Aspect 115. The sole structure of any one of Aspect 74-Aspect 114, wherein the thermoplastic copolyester elastomer has an energy efficiency when determined using a cyclic tensile test as described herein of greater than or equal to about 50 percent; greater than or equal to about 60 percent; or greater than or equal to about 70 percent.

Aspect 116. The sole structure of any one of Aspect 74-Aspect 115, wherein the thermoplastic copolyester elastomer has an energy return when determined using a cyclic tensile test as described herein of about 1 J to 15 J; about 2 J to 12 J; or about 4 J to 10 J.

Aspect 117. The sole structure of any one of Aspect 74-Aspect 116, wherein the thermoplastic copolyester elastomer has tensile modulus of about 1 MPa to 15 MPa when determined using a cyclic tensile test as described herein.

Aspect 118. The sole structure of any one of Aspect 74-Aspect 117, wherein the thermoplastic copolyester elastomer has a zero shear viscosity when determined using a cyclic tensile test as described herein of about 10 to about 10,000 pascal-second; about 100 to about 7,000 pascal-second; or about 1,000 to about 5,000 pascal-second.

Aspect 119. The sole structure of Aspect 69 or Aspect 70, wherein the thermoplastic elastomer material comprises a thermoplastic styrene block copolymer elastomer.

Aspect 120. The sole structure of Aspect 75, wherein thermoplastic styrene block copolymer elastomer is a styrene ethylene butylene styrene block copolymer.

Aspect 121. The sole structure of Aspect 69 or Aspect 70, wherein the thermoplastic elastomer material comprises a thermoplastic copolyetherester elastomer.

Aspect 122. The sole structure of Aspect 121, wherein the thermoplastic copolyetherester elastomer is a block copolymer.

Aspect 123. The sole structure of any one of Aspect 121-Aspect 122, wherein the block copolymer is a segmented block copolymer.

Aspect 124. The sole structure of any one of Aspect 121-Aspect 123, wherein the thermoplastic copolyetherester elastomer comprises long-chain ester units of formula 7:

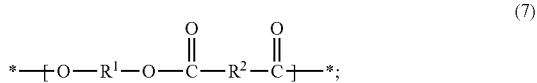

(7)

and short-chain ester units of formula 8:

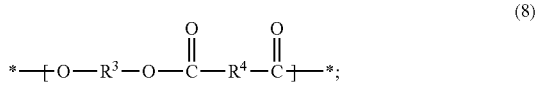

(8)

wherein R1 comprises a divalent radical remaining after removal of terminal hydroxyl groups from poly(alkylene ether) having a carbon-to-oxygen ratio from about 2.0 to about 4.3 and a number average molecular weight from about 400 to about 6000; wherein R2 comprises a divalent radical remaining after removal of carboxyl groups from a dicarboxylic acid having a molecular weight less than about 300; wherein R3 comprises a divalent radical remaining after removal of hydroxyl groups from a low molecular weight diol having a molecular weight less than about 250; wherein R4 comprises a divalent radical remaining after removal of carboxyl groups from a dicarboxylic acid having a molecular weight less than about 300; wherein the long-chain ester units represented by formula 7 comprise about 5 weight percent to about 95 weight percent of the thermoplastic copolyetherester elastomer; and wherein the short-chain ester units represented by formula 8 comprise about 95 weight percent to about 5 weight percent of the thermoplastic copolyetherester elastomer.

Aspect 125. The sole structure of Aspect 124, wherein R1 comprises a divalent radical remaining after removal of terminal hydroxyl groups from poly(tetramethylene ether).

Aspect 126. The sole structure of any one of Aspect 124-Aspect 125, wherein R1 has a number average molecular weight from about 500 to about 3500.

Aspect 127. The sole structure of any one of Aspect 124-Aspect 125, wherein R1 has a number average molecular weight from about 600 to about 3000.

Aspect 128. The sole structure of any one of Aspect 124-Aspect 125, wherein R1 has a number average molecular weight from about 800 to about 1200.

Aspect 129. The sole structure of any one of Aspect 124-Aspect 125, wherein R1 has a number average molecular weight from about 800 to about 2000.

Aspect 130. The sole structure of any one of Aspect 124-Aspect 125, wherein R1 has a number average molecular weight from about 800 to about 2500.

Aspect 131. The sole structure of any one of Aspect 124-Aspect 125, wherein R1 has a number average molecular weight from about 800 to about 3000.

Aspect 132. The sole structure of any one of Aspect 124-Aspect 125, wherein R1 has a number average molecular weight from about 800 to about 3500.

Aspect 133. The sole structure of any one of Aspect 124-Aspect 125, wherein R1 has a number average molecular weight from about 800 to about 4000.

Aspect 134. The sole structure of any one of Aspect 124-Aspect 125, wherein R1 has a number average molecular weight from about 1000 to about 3000.

Aspect 135. The sole structure of any one of Aspect 124-Aspect 125, wherein R1 has a number average molecular weight from about 1500 to about 2500.

Aspect 136. The sole structure of any one of Aspect 124-Aspect 135, wherein R2 comprises a divalent radical remaining after removal of carboxyl groups from an aromatic dicarboxylic acid.

Aspect 137. The sole structure of Aspect 136, wherein the aromatic dicarboxylic acid is 1,4-benzenedicarboxylic acid.

Aspect 138. The sole structure of any one of Aspect 124-Aspect 136, wherein R3 is comprises a divalent radical remaining after removal of hydroxyl groups from a C2-C6 alkyl diol.

Aspect 139. The sole structure of Aspect 138, wherein the C2-C6 alkyl diol is 1,4-butanediol.

Aspect 140. The sole structure of any one of Aspect 124-Aspect 139, wherein R4 is a divalent radical remaining after removal of carboxyl groups from an aromatic dicarboxylic acid.

Aspect 141. The sole structure of Aspect 140, wherein the aromatic dicarboxylic acid is 1,4-benzenedicarboxylic acid.

Aspect 142. The sole structure of any one of Aspect 124-Aspect 141, wherein the long-chain ester units represented by formula 7 comprise about 10 weight percent to about 60 weight percent of the thermoplastic copolyetherester elastomer.

Aspect 143. The sole structure of any one of Aspect 124-Aspect 141, wherein the long-chain ester units represented by formula 7 comprise about 20 weight percent to about 60 weight percent of the thermoplastic copolyetherester elastomer.

Aspect 144. The sole structure of any one of Aspect 124-Aspect 141, wherein the long-chain ester units represented by formula 7 comprise about 30 weight percent to about 60 weight percent of the thermoplastic copolyetherester elastomer.

Aspect 145. The sole structure of any one of Aspect 124-Aspect 141, wherein the long-chain ester units represented by formula 7 comprise about 10 weight percent to about 70 weight percent of the thermoplastic copolyetherester elastomer.

Aspect 146. The sole structure of any one of Aspect 124-Aspect 141, wherein the long-chain ester units represented by formula 7 comprise about 20 weight percent to about 70 weight percent of the thermoplastic copolyetherester elastomer.

Aspect 147. The sole structure of any one of Aspect 124-Aspect 141, wherein the long-chain ester units represented by formula 7 comprise about 30 weight percent to about 70 weight percent of the thermoplastic copolyetherester elastomer.

Aspect 148. The sole structure of any one of Aspect 124-Aspect 141, wherein the long-chain ester units represented by formula 7 comprise about 10 weight percent to about 80 weight percent of the thermoplastic copolyetherester elastomer.

Aspect 149. The sole structure of any one of Aspect 124-Aspect 141, wherein the long-chain ester units represented by formula 7 comprise about 20 weight percent to about 80 weight percent of the thermoplastic copolyetherester elastomer.

Aspect 150. The sole structure of any one of Aspect 124-Aspect 141, wherein the long-chain ester units represented by formula 7 comprise about 30 weight percent to about 80 weight percent of the thermoplastic copolyetherester elastomer.

Aspect 151. The sole structure of any one of Aspect 124-Aspect 150, wherein the short-chain ester units represented by formula 8 comprise about 20 weight percent to about 90 weight percent of the thermoplastic copolyetherester elastomer.

Aspect 152. The sole structure of any one of Aspect 124-Aspect 150, wherein the short-chain ester units represented by formula 8 comprise about 40 weight percent to about 90 weight percent of the thermoplastic copolyetherester elastomer.

Aspect 153. The sole structure of any one of Aspect 124-Aspect 150, wherein the short-chain ester units represented by formula 8 comprise about 20 weight percent to about 80 weight percent of the thermoplastic copolyetherester elastomer.

Aspect 154. The sole structure of any one of Aspect 124-Aspect 150, wherein the short-chain ester units represented by formula 8 comprise about 40 weight percent to about 80 weight percent of the thermoplastic copolyetherester elastomer.

Aspect 155. The sole structure of any one of Aspect 124-Aspect 150, wherein the short-chain ester units represented by formula 8 comprise about 20 weight percent to about 70 weight percent of the thermoplastic copolyetherester elastomer.

Aspect 156. The sole structure of any one of Aspect 124-Aspect 150, wherein the short-chain ester units represented by formula 8 comprise about 40 weight percent to about 70 weight percent of the thermoplastic copolyetherester elastomer.

Aspect 157. The sole structure of any one of Aspect 124-Aspect 150, wherein the short-chain ester units represented by formula 8 comprise about 40 weight percent to about 60 weight percent of the thermoplastic copolyetherester elastomer.

Aspect 158. The sole structure of one of Aspect 124-Aspect 150, wherein the short-chain ester units represented by formula 8 comprise about 20 weight percent to about 60 weight percent of the thermoplastic copolyetherester elastomer.

Aspect 159. The sole structure of any one of Aspect 124-Aspect 158, wherein at least about 50 weight percent of the short-chain ester units represented by formula 8 are identical.

Aspect 160. The sole structure of one of Aspect 121-Aspect 123, wherein the thermoplastic copolyetherester elastomer comprises polybutylene terephthalate blocks and poly(tetramethylene ether) terephthalate blocks, wherein the polybutylene terephthalate blocks comprise from about 95 weight percent to about 5 weight percent of the thermoplastic copolyetherester elastomer, wherein the poly(tetramethylene ether) terephthalate blocks comprise from about 5 weight percent to about 95 weight percent of the thermoplastic copolyetherester elastomer, and wherein the poly(tetramethylene ether) terephthalate blocks have a number average molecular weight from about 200 Daltons to about 6000 Daltons.

Aspect 161. The sole structure of Aspect 160, wherein the polybutylene terephthalate blocks comprise from about 20 weight percent to about 70 weight percent of the thermoplastic copolyetherester elastomer.

Aspect 162. The sole structure of any one of Aspect 160-Aspect 161, wherein the poly(tetramethylene ether) terephthalate blocks comprise from about 30 weight percent to about 80 weight percent of the thermoplastic copolyetherester elastomer.

Aspect 163. The sole structure of Aspect 160, wherein the polybutylene terephthalate blocks comprise from about 70 weight percent to about 20 weight percent of the thermoplastic copolyetherester elastomer, wherein the poly(tetramethylene ether) terephthalate blocks comprise from about 30 weight percent to about 80 weight percent of the thermoplastic copolyetherester elastomer.

Aspect 164. The sole structure of any one of Aspect 160-Aspect 163, wherein the poly(tetramethylene ether) terephthalate blocks have a number average molecular weight from about 800 Daltons to about 1200 Daltons.

Aspect 165. The sole structure of any one of Aspect 160-Aspect 163, wherein the poly(tetramethylene ether) terephthalate blocks have a number average molecular weight from about 1500 Daltons to about 2500 Daltons.

Aspect 166. The sole structure of one of Aspect 160-Aspect 163, wherein the poly(tetramethylene ether) terephthalate blocks have a number average molecular weight from about 1000 Daltons to about 3000 Daltons.

Aspect 167. The sole structure of Aspect 69 or Aspect 70, wherein the thermoplastic elastomer material comprises a thermoplastic polyurethane elastomer.

Aspect 168. The sole structure of Aspect 167, wherein the thermoplastic polyurethane elastomer is selected from a thermoplastic polyester-polyurethane elastomer, a thermoplastic polyether-polyurethane elastomer, a thermoplastic polycarbonate-polyurethane elastomer, a thermoplastic polyolefin-polyurethane elastomer, any copolymer thereof, and any blend thereof.

Aspect 169. The sole structure of Aspect 168, wherein the thermoplastic polyurethane elastomer is a thermoplastic polyester-polyurethane elastomer.

Aspect 170. The sole structure of Aspect 168, wherein the thermoplastic polyurethane elastomer is a thermoplastic polyether-polyurethane elastomer Aspect 171. The sole structure of Aspect 168, wherein the thermoplastic polyurethane elastomer is a thermoplastic polycarbonate-polyurethane elastomer.

Aspect 172. The sole structure of Aspect 168, wherein the thermoplastic polyurethane elastomer comprises a long-chain polyol.

Aspect 173. The sole structure of Aspect 172, wherein the long-chain polyol is selected from a polyether polyol, a polyester polyol, a polycarbonate polyol, a polyolefin polyol, a polyacryl polyol, and any copolymer thereof.

Aspect 174. The sole structure of Aspect 172, wherein the long-chain polyol is a polyether polyol, a polyester polyol, and any copolymer thereof.

Aspect 175. The sole structure of Aspect 172, wherein the long-chain polyol is a polyether polyol.

Aspect 176. The sole structure of Aspect 172, wherein the long-chain polyol is a polyester polyol.

Aspect 177. The sole structure of any one of Aspect 172-Aspect 176, wherein the long-chain polyol has a number-average molecular weight of not less than about 500 Daltons.

Aspect 178. The sole structure of any one of Aspect 172-Aspect 176, wherein the long-chain polyol has a number-average molecular weight of about 500 Daltons to about 10,000 Daltons.

Aspect 179. The sole structure of any one of Aspect 172-Aspect 176, wherein the long-chain polyol has a number-average molecular weight of about 600 Daltons to about 6,000 Daltons.

Aspect 180. The sole structure of any one of Aspect 172-Aspect 176, wherein the long-chain polyol has a number-average molecular weight of about 800 Daltons to about 4,000 Daltons.

Aspect 181. The sole structure of Aspect 69 or Aspect 70, wherein the thermoplastic elastomer comprises at least one thermoplastic polystyrene elastomer.

Aspect 182. The sole structure of Aspect 181, wherein thermoplastic styrene elastomer is a styrene block copolymer elastomer.

Aspect 183. The sole structure of Aspect 182, where the styrene block copolymer elastomer is a poly(styrene-butadiene-styrene), a poly(styrene-ethylene-co-butylene-styrene), a poly(styrene-isoprene-styrene), any copolymer thereof, and any blend thereof.

Aspect 184. The sole structure of Aspect 44, wherein the polymeric material comprises a thermoset polymer or copolymer.

Aspect 185. The sole structure of Aspect 184, wherein the thermoset polymer or copolymer is a thermoset polyurethane.

Aspect 186. The sole structure of Aspect 185, wherein the thermoset polyurethane is a polyester, a polyether, a polycaprolactone, Aspect 187. The sole structure of any one of Aspect 1-Aspect 186, wherein the first foam component, the second foam component, or both the first foam component and the second foam component comprises a polymer selected from the group consisting of an ethylene-vinyl acetate (EVA) copolymer, a styrene-butadiene copolymer, a polyurethane homopolymer or copolymer, and blends thereof.

Aspect 188. The sole structure of any one of Aspect 44-Aspect 187, wherein the polymeric material further comprises cross-links.

Aspect 189. An article of footwear comprising the sole structure of any one of Aspect 1-Aspect 188 and an upper attached to the sole structure.

Aspect 190. A method of making an article of footwear, the method comprising attaching an upper to the sole structure of any one of Aspect 1-Aspect 188, thereby forming the article of footwear.

Aspect 191. A method of forming a sole structure for an article of footwear, comprising:
  providing a first foam component, the first foam component having a first side and a second side opposite the first side;
  providing a second foam component, the second foam component having a first side and a second side opposite the first side;
  providing a mesh component; and
  bonding the mesh component, the second side of the first foam component, and the first side of the second foam component to each other.

Aspect 192. The method of Aspect 191, wherein the first foam component comprises a first foam component polymeric material comprising the polymeric material of any one of Aspect 45-Aspect 188.

Aspect 193. The method of Aspect 191 or Aspect 192, wherein the second foam component comprises a second foam component polymeric material independently comprising the polymeric material of any one of Aspect 45-Aspect 188.

Aspect 194. The method of any one Aspect 191-Aspect 193, wherein the mesh component comprises a mesh component polymeric material comprising the polymeric material of any one of Aspect 45-Aspect 188.

Aspect 195. The method of any one Aspect 191-Aspect 194, wherein the first side of the first foam component forms a first side of the sole structure, the second side of the second foam component forms a second side of the sole structure opposing the first side of the sole structure, and the mesh component is positioned and bonded between the second side of the first foam component and the first side of the second foam component.

Aspect 196. The method of any one Aspect 191-Aspect 195, wherein forming the first foam component comprises injection molding the first foam component in a mold.

Aspect 197. The method of Aspect 196, wherein injection molding the first foam component comprises injection molding the first foam component in a mold comprising an undulating molding surface; thereby forming an undulating region on the second side of the first foam component.

Aspect 198. The method of any one of Aspect 191-Aspect 197, wherein providing the first foam component comprises cutting the first foam component from a sheet of foam using at least one of a knife, a wire, a laser, and jetted water for the cutting.

Aspect 199. The method of Aspect 198, wherein the cutting the first foam component from the sheet of foam using at least one of the knife, the wire, the laser, and the jetted water further comprises forming undulations in the second side of the first foam component through the cutting.

Aspect 200. The method of any one Aspect 191-Aspect 194, wherein providing the second foam component comprises injection molding the second foam component in a mold.

Aspect 201. The method of Aspect 200, wherein: the mold comprises an undulating surface; and the first side of the second foam component, when formed through the injection molding in the mold, comprises undulations.

Aspect 202. The method of any one Aspect 191-Aspect 194, wherein forming the second foam component comprises cutting the second foam component from a sheet of foam using at least one of a knife, a wire, a laser, and jetted water for the cutting.

Aspect 203. The method of Aspect 202, wherein forming the second foam component from the sheet of foam using at least one of the knife, the wire, the laser, and the jetted water further comprises forming undulations in the first side of the second foam component through the cutting.

Aspect 204. The method of any one of Aspect 191-Aspect 203, wherein providing the mesh component comprises cutting the mesh component from a sheet of mesh textile.

Aspect 205. The method of any one of Aspect 191-Aspect 204, wherein the bonding comprises: applying an adhesive to the mesh component; adhering the mesh component to the second side of the first foam component; and adhering the second side of the first foam component with the mesh component to the first side of the second foam component.

Aspect 206. The method of Aspect 205, wherein adhering the mesh component to the second side of the first foam component comprises: placing the first foam component and the mesh component into a mold with the second side of the first foam component contacting the mesh component; and compression molding the first foam component and the mesh component together, thereby bonding the mesh component to the second side of the first foam component.

Aspect 207. The method of Aspect 206, wherein the first foam component comprises a first foam component polymeric material having first foam component polymeric material melting temperature; wherein the mesh component comprises a mesh component polymeric material having mesh component polymeric material melting temperature;

and wherein the mesh component polymeric material melting temperature is at least about 10 degrees Celsius less than the first foam component polymeric material melting temperature.

Aspect 208. The method of Aspect 206, wherein the first foam component comprises a first foam component polymeric material having first foam component polymeric material melting temperature; wherein the mesh component comprises a mesh component polymeric material having mesh component polymeric material melting temperature; and wherein the mesh component polymeric material melting temperature is at least about 10 degrees Celsius greater than the first foam component polymeric material melting temperature.

Aspect 209. The method of Aspect 207 or Aspect 208, wherein the first foam component polymeric material comprises the polymeric material of any one of Aspect 45-Aspect 188.

Aspect 210. The method of any one of Aspect 207-Aspect 209, wherein the mesh component polymeric material comprises the polymeric material of any one of Aspect 45-Aspect 188.

Aspect 211. The method of any one of Aspect 191-Aspect 204, wherein the bonding comprises: adhering the mesh component to the first side of the second foam component; and adhering the first side of the second foam component with the mesh component to the second side of the first foam component.

Aspect 212. The method of Aspect 211, wherein adhering the mesh component to the first side of the second foam component comprises: placing the second foam component and the mesh component into a mold with the first side of the second foam component contacting the mesh component; and compression molding the second foam component and the mesh component together in the mold to adhere the mesh component to the first side of the second foam component.

Aspect 213. The method of Aspect 212, wherein the second foam component comprises a second foam component polymeric material having second foam component polymeric material melting temperature; wherein the mesh component comprises a mesh component polymeric material having mesh component polymeric material melting temperature; and wherein the mesh component polymeric material melting temperature is at least about 10 degrees Celsius less than the second foam component polymeric material melting temperature.

Aspect 214. The method of Aspect 212, wherein the second foam component comprises a second foam component polymeric material having second foam component polymeric material melting temperature; wherein the mesh component comprises a mesh component polymeric material having mesh component polymeric material melting temperature; and wherein the mesh component polymeric material melting temperature is at least about 10 degrees Celsius greater than the second foam component polymeric material melting temperature.

Aspect 215. The method of Aspect 213 or Aspect 214, wherein the first foam component polymeric material comprises the polymeric material of any one of Aspect 45-Aspect 188.

Aspect 216. The method of any one of Aspect 213-Aspect 215, wherein the mesh component polymeric material comprises the polymeric material of any one of Aspect 45-Aspect 188.

Aspect 217. The method of any one of Aspect 191-Aspect 204, wherein the bonding comprises: placing the first foam component, the mesh component, and the second foam component into a mold with the second side of the first foam component and the first side of the second component contacting the mesh component; and compression molding the first foam component, the mesh component, and the second foam component together in the mold such that the mesh component is positioned and bonded between the second side of the first foam component and the first side of the second foam component.

Aspect 218. The method of Aspect 217, wherein the first foam component comprises a first foam component polymeric material having first foam component polymeric material melting temperature; wherein the mesh component comprises a mesh component polymeric material having mesh component polymeric material melting temperature; and wherein the mesh component polymeric material melting temperature is at least about 10 degrees Celsius less than the first foam component polymeric material melting temperature.

Aspect 219. The method of Aspect 217, wherein the first foam component comprises a first foam component polymeric material having first foam component polymeric material melting temperature; wherein the mesh component comprises a mesh component polymeric material having mesh component polymeric material melting temperature; and wherein the mesh component polymeric material melting temperature is at least about 10 degrees Celsius greater than the first foam component polymeric material melting temperature.

Aspect 220. The method of Aspect 217, wherein the second foam component comprises a second foam component polymeric material having second foam component polymeric material melting temperature; wherein the mesh component comprises a mesh component polymeric material having mesh component polymeric material melting temperature; and wherein the mesh component polymeric material melting temperature is at least about 10 degrees Celsius less than the second foam component polymeric material melting temperature.

Aspect 221. The method of Aspect 217, wherein the second foam component comprises a second foam component polymeric material having second foam component polymeric material melting temperature; wherein the mesh component comprises a mesh component polymeric material having mesh component polymeric material melting temperature; and wherein the mesh component polymeric material melting temperature is at least about 10 degrees Celsius greater than the second foam component polymeric material melting temperature.

Aspect 222. The method of Aspect 217, wherein the first foam component comprises a first foam component polymeric material having first foam component polymeric material melting temperature; wherein the second foam component comprises a second foam component polymeric material having second foam component polymeric material melting temperature; wherein the mesh component comprises a mesh component polymeric material having mesh component polymeric material melting temperature; and wherein the mesh component polymeric material melting temperature is at least about 10 degrees Celsius less than each of the first foam component polymeric material melting temperature and the second foam component polymeric material melting temperature.

Aspect 223. The method of Aspect 217, wherein the first foam component comprises a first foam component polymeric material having first foam component polymeric material melting temperature; wherein the second foam component comprises a second foam component polymeric material having second foam component polymeric material melting temperature; wherein the mesh component comprises a mesh component polymeric material having mesh component polymeric material melting temperature; and wherein the mesh component polymeric material melting temperature is at least about 10 degrees Celsius greater than each of the first foam component polymeric material melting temperature and the second foam component polymeric material melting temperature.

Aspect 224. The method of any one of Aspect 218-Aspect 223, wherein the first foam component polymeric material comprises the polymeric material of any one of Aspect 45-Aspect 188.

Aspect 225. The method of any one of Aspect 218-Aspect 223, wherein the second foam component polymeric material comprises the polymeric material of any one of Aspect 45-Aspect 188.

Aspect 226. The method of any one of Aspect 218-Aspect 223, wherein the mesh component polymeric material comprises the polymeric material of any one of Aspect 45-Aspect 188.

Aspect 227. A method of making an article of footwear, comprising: the method of forming a sole structure for an article of footwear of any of Aspect 191-Aspect 226; and attaching an upper to the sole structure, thereby forming the article of footwear.

Aspect 228. A method of forming a sole structure for an article of footwear, comprising: providing a first foam component, the first foam component having a first side and a second side opposite the first side; providing a second foam component, the second foam component having a first side and a second side opposite the first side; providing a mesh textile; and bonding the mesh textile, the second side of the first foam component, and the first side of the second foam component to each other.

Aspect 229. The method of Aspect 228, wherein the first foam component comprises a first foam component polymeric material comprising the polymeric material of any one of Aspect 45-Aspect 188.

Aspect 230. The method of Aspect 228 or Aspect 229, wherein the second foam component comprises a second foam component polymeric material independently comprising the polymeric material of any one of Aspect 45-Aspect 188.

Aspect 231. The method of any one Aspect 228-Aspect 230, wherein the mesh textile is a knit, crochet, braided, or woven textile comprising one or more yarns, wherein each of the one or more yarns is formed of one or more individual fibers.

Aspect 232. The method of any one Aspect 228-Aspect 230, wherein the mesh textile is a non-woven textile comprising a plurality of fibers.

Aspect 233. The method of any one Aspect 228-Aspect 232, wherein the mesh textile comprises one or more fibers or yarns comprising a fiber/yarn polymeric material comprising the polymeric material of any one of Aspect 44-Aspect 189.

Aspect 234. The method of any one Aspect 228-Aspect 233, wherein the first side of the first foam component forms a first side of the sole structure, the second side of the second foam component forms a second side of the sole structure opposing the first side of the sole structure, and the mesh textile is positioned and bonded between the second side of the first foam component and the first side of the second foam component.

Aspect 235. The method of any one Aspect 228-Aspect 234, wherein forming the first foam component comprises injection molding the first foam component in a mold.

Aspect 236. The method of Aspect 235, wherein injection molding the first foam component comprises injection molding the first foam component in a mold comprising an undulating molding surface; thereby forming an undulating region on the second side of the first foam component.

Aspect 237. The method of any one Aspect 228-Aspect 236, wherein providing the first foam component comprises cutting the first foam component from a sheet of foam using at least one of a knife, a wire, a laser, and jetted water for the cutting.

Aspect 238. The method of Aspect 237, wherein the cutting the first foam component from the sheet of foam using at least one of the knife, the wire, the laser, and the jetted water further comprises forming undulations in the second side of the first foam component through the cutting.

Aspect 239. The method of any one Aspect 228-Aspect 233, wherein providing the second foam component comprises injection molding the second foam component in a mold.

Aspect 240. The method of Aspect 239, wherein: the mold comprises an undulating surface; and the first side of the second foam component, when formed through the injection molding in the mold, comprises undulations.

Aspect 241. The method of any one Aspect 228-Aspect 233, wherein forming the second foam component comprises cutting the second foam component from a sheet of foam using at least one of a knife, a wire, a laser, and jetted water for the cutting.

Aspect 242. The method of Aspect 241, wherein forming the second foam component from the sheet of foam using at least one of the knife, the wire, the laser, and the jetted water further comprises forming undulations in the first side of the second foam component through the cutting.

Aspect 243. The method of any one Aspect 228-Aspect 242, wherein providing the mesh textile comprises cutting the mesh textile from a sheet of mesh textile.

Aspect 244. The method of any one Aspect 228-Aspect 243, wherein the bonding comprises: applying an adhesive to the mesh textile; adhering the mesh textile to the second side of the first foam component; and adhering the second side of the first foam component with the mesh textile to the first side of the second foam component.

Aspect 245. The method of Aspect 244, wherein adhering the mesh textile to the second side of the first foam component comprises: placing the first foam component and the mesh textile into a mold with the second side of the first foam component contacting the mesh textile; and compression molding the first foam component and the mesh textile together, thereby bonding the mesh textile to the second side of the first foam component.

Aspect 246. The method of Aspect 245, wherein the first foam component comprises a first foam component polymeric material having first foam component polymeric material melting temperature; wherein the mesh textile comprises a mesh textile polymeric material having mesh textile polymeric material melting temperature; and wherein the mesh textile polymeric material melting temperature is at least about 10 degrees Celsius less than the first foam component polymeric material melting temperature.

Aspect 247. The method of Aspect 245, wherein the first foam component comprises a first foam component polymeric material having first foam component polymeric material melting temperature; wherein the mesh textile comprises a mesh textile polymeric material having mesh textile polymeric material melting temperature; and wherein the mesh textile polymeric material melting temperature is at least about 10 degrees Celsius greater than the first foam component polymeric material melting temperature.

Aspect 248. The method of Aspect 246 or Aspect 247, wherein the first foam component polymeric material comprises the polymeric material of any one of Aspect 45-Aspect 188.

Aspect 249. The method of any one of Aspect 246-Aspect 248, wherein the mesh textile polymeric material comprises the polymeric material of any one of Aspect 45-Aspect 188.

Aspect 250. The method of any one Aspect 228-Aspect 243, wherein the bonding comprises: adhering the mesh textile to the first side of the second foam component; and adhering the first side of the second foam component with the mesh textile to the second side of the first foam component.

Aspect 251. The method of Aspect 250, wherein adhering the mesh textile to the first side of the second foam component comprises: placing the second foam component and the mesh textile into a mold with the first side of the second foam component contacting the mesh textile; and compression molding the second foam component and the mesh textile together in the mold to adhere the mesh textile to the first side of the second foam component.

Aspect 252. The method of Aspect 251, wherein the second foam component comprises a second foam component polymeric material having second foam component polymeric material melting temperature; wherein the mesh textile comprises a mesh textile polymeric material having mesh textile polymeric material melting temperature; and wherein the mesh textile polymeric material melting temperature is at least about 10 degrees Celsius less than the second foam component polymeric material melting temperature.

Aspect 253. The method of Aspect 251, wherein the second foam component comprises a second foam component polymeric material having second foam component polymeric material melting temperature; wherein the mesh textile comprises a mesh textile polymeric material having mesh textile polymeric material melting temperature; and wherein the mesh textile polymeric material melting temperature is at least about 10 degrees Celsius greater than the second foam component polymeric material melting temperature.

Aspect 254. The method of Aspect 252 or Aspect 253, wherein the first foam component polymeric material comprises the polymeric material of any one of Aspect 45-Aspect 188.

Aspect 255. The method of any one of Aspect 252-Aspect 254, wherein the mesh textile polymeric material comprises the polymeric material of any one of Aspect 45-Aspect 188.

Aspect 256. The method of any one Aspect 228-Aspect 243, wherein the bonding comprises:
placing the first foam component, the mesh textile, and the second foam component into a mold with the second side of the first foam component and the first side of the second component contacting the mesh textile; and
compression molding the first foam component, the mesh textile, and the second foam component together in the mold such that the mesh textile is positioned and bonded between the second side of the first foam component and the first side of the second foam component.

Aspect 257. The method of Aspect 256, wherein the first foam component comprises a first foam component polymeric material having first foam component polymeric material melting temperature; wherein the mesh textile comprises a mesh textile polymeric material having mesh textile polymeric material melting temperature; and wherein the mesh textile polymeric material melting temperature is at least about 10 degrees Celsius less than the first foam component polymeric material melting temperature.

Aspect 258. The method of Aspect 256, wherein the first foam component comprises a first foam component polymeric material having first foam component polymeric material melting temperature; wherein the mesh textile comprises a mesh textile polymeric material having mesh textile polymeric material melting temperature; and wherein the mesh textile polymeric material melting temperature is at least about 10 degrees Celsius greater than the first foam component polymeric material melting temperature.

Aspect 259. The method of Aspect 256, wherein the second foam component comprises a second foam component polymeric material having second foam component polymeric material melting temperature; wherein the mesh textile comprises a mesh textile polymeric material having mesh textile polymeric material melting temperature; and wherein the mesh textile polymeric material melting temperature is at least about 10 degrees Celsius less than the second foam component polymeric material melting temperature.

Aspect 260. The method of Aspect 256, wherein the second foam component comprises a second foam component polymeric material having second foam component polymeric material melting temperature; wherein the mesh textile comprises a mesh textile polymeric material having mesh textile polymeric material melting temperature; and wherein the mesh textile polymeric material melting temperature is at least about 10 degrees Celsius greater than the second foam component polymeric material melting temperature.

Aspect 261. The method of Aspect 256, wherein the first foam component comprises a first foam component polymeric material having first foam component polymeric material melting temperature; wherein the second foam component comprises a second foam component polymeric material having second foam component polymeric material melting temperature; wherein the mesh textile comprises a mesh textile polymeric material having mesh textile polymeric material melting temperature; and wherein the mesh textile polymeric material melting temperature is at least about 10 degrees Celsius less than each of the first foam component polymeric material melting temperature and the second foam component polymeric material melting temperature.

Aspect 262. The method of Aspect 256, wherein the first foam component comprises a first foam component polymeric material having first foam component polymeric material melting temperature; wherein the second foam component comprises a second foam component polymeric material having second foam component polymeric material melting temperature; wherein the mesh textile comprises a mesh textile polymeric material having mesh textile polymeric material melting temperature; and wherein the mesh textile polymeric material melting temperature is at least about 10 degrees Celsius greater than each of the first foam component polymeric material melting temperature and the second foam component polymeric material melting temperature.

Aspect 263. The method of any one of Aspect 257-Aspect 263, wherein the first foam component polymeric material comprises the polymeric material of any one of Aspect 45-Aspect 188.

Aspect 264. The method of any one of Aspect 257-Aspect 263, wherein the second foam component polymeric material comprises the polymeric material of any one of Aspect 45-Aspect 188.

Aspect 265. The method of any one of Aspect 257-Aspect 263, wherein the mesh textile polymeric material comprises the polymeric material of any one of Aspect 45-Aspect 188.

Aspect 266. A method of making an article of footwear, comprising: the method of forming a sole structure for an article of footwear of any one Aspect 228-Aspect 265; and attaching an upper to the sole structure, thereby forming the article of footwear.

From the foregoing, it will be seen that aspects herein are well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings is to be interpreted as illustrative and not in a limiting sense.

While specific elements and steps are discussed in connection to one another, it is understood that any element and/or steps provided herein is contemplated as being combinable with any other elements and/or steps regardless of explicit provision of the same while still being within the scope provided herein. Since many possible aspects may be made of the disclosure without departing from the scope thereof, it is to be understood that all matter herein set forth or shown in the accompanying drawings is to be interpreted as illustrative and not in a limiting sense.

It is to be understood that this disclosure is not limited to particular aspects described, and as such may, of course, vary. Other systems, methods, features, and advantages of sole structures and methods of making same thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included herein within the scope of this disclosure and to be encompassed by the claims herein.

What is claimed:

1. A sole structure for an article of footwear, comprising:
   a first foam component having a first side and a second side opposite the first side;
   a second foam component having a first side and a second side opposite the first side, the first side of the first foam component opposing the first side of the second foam component; and
   a mesh textile disposed between the first side of the first foam component and the first side of the second foam component and including a first mesh component, a second mesh component, a third mesh component, and a fourth mesh component, the second mesh component overlapping and contacting the first mesh component in a first direction extending along a longitudinal axis of the sole structure to define a first overlapping region, the third mesh component overlapping and contacting the fourth mesh component in the first direction to define a second overlapping region, the first overlapping region beginning and terminating in one of a forefoot region of the sole structure and a heel region of the sole structure and the second overlapping region beginning and terminating in a midfoot region of the sole structure.

2. The sole structure of claim 1, wherein the first overlapping region extends from a medial side of the sole structure to a lateral side of the sole structure.

3. The sole structure of claim 1, wherein the mesh textile is bonded to the first side of the first foam component and to the first side of the second foam component.

4. The sole structure of claim 1, wherein the third mesh component and the fourth mesh component are spaced apart from the first mesh component and the second mesh component.

5. An article of footwear incorporating the sole structure of claim 1.

6. A sole structure for an article of footwear, comprising:
   a first foam component having a first side and a second side opposite the first side;
   a second foam component having a first side and a second side opposite the first side, the first side of the first foam component opposing the first side of the second foam component; and
   a mesh textile disposed between the first side of the first foam component and the first side of the second foam component and including a first mesh component, a second mesh component, a third mesh component, and a fourth mesh component, the second mesh component overlapping and contacting the first mesh component to define a first overlapping region extending from a medial side edge of the sole structure to a lateral side edge of the sole structure, the third mesh component overlapping and contacting the fourth mesh component to define a second overlapping region extending from the medial side edge of the sole structure to the lateral side edge of the sole structure, the first overlapping region beginning and terminating in one of a forefoot region, a midfoot region, and a heel region of the sole structure, and the second overlapping region beginning and terminating in one of the other of the forefoot region, the midfoot region, and the heel region of the sole structure.

7. The sole structure of claim 6, wherein the first mesh component overlaps the second mesh component in a direction extending along a longitudinal axis of the sole structure.

8. The sole structure of claim 6, wherein the mesh textile is bonded to the first side of the first foam component and to the first side of the second foam component.

9. The sole structure of claim 6, wherein the third mesh component and the fourth mesh component are spaced apart from the first mesh component and the second mesh component.

10. The sole structure of claim 6, wherein the first overlapping region is disposed in one of the forefoot region of the sole structure and the heel region of the sole structure and the second overlapping region is disposed in the midfoot region of the sole structure.

11. An article of footwear incorporating the sole structure of claim 6.

\* \* \* \* \*